US012762812B2

(12) United States Patent
Li et al.

(10) Patent No.: US 12,762,812 B2
(45) Date of Patent: Oct. 13, 2026

(54) DEVICES, METHODS, AND GRAPHICAL USER INTERFACES FOR DISPLAYING A REPRESENTATION OF A USER IN AN EXTENDED REALITY ENVIRONMENT

(71) Applicant: Apple Inc., Cupertino, CA (US)

(72) Inventors: Jiabao Li, Austin, TX (US); Marisa R. Lu, San Francisco, CA (US); Kristi E. Bauerly, Los Altos, CA (US); Ji Hyoun Lim, Santa Clara, CA (US); Chia-Ling Li, San Jose, CA (US); Julian K. Missig, Burlingame, CA (US); Fiona P. O'Leary, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 81 days.

(21) Appl. No.: 18/909,780

(22) Filed: Oct. 8, 2024

(65) Prior Publication Data

US 2025/0029344 A1 Jan. 23, 2025

Related U.S. Application Data

(63) Continuation of application No. 17/944,911, filed on Sep. 14, 2022, now Pat. No. 12,131,429.

(60) Provisional application No. 63/248,036, filed on Sep. 24, 2021.

(51) Int. Cl.

| | |
|---|---|
| ***G06T 19/00*** | (2011.01) |
| ***G06F 3/01*** | (2006.01) |
| ***G06F 3/04815*** | (2022.01) |

(52) U.S. Cl.
CPC ............ *G06T 19/006* (2013.01); *G06F 3/011* (2013.01); *G06F 3/04815* (2013.01)

(58) Field of Classification Search
CPC ....... G06T 19/006; G06T 13/40; G06F 3/011; G06F 3/04815; A63F 13/213
See application file for complete search history.

(56) References Cited

U.S. PATENT DOCUMENTS

| | | | |
|---|---|---|---|
| 7,894,638 | B2 | 2/2011 | Nakada et al. |
| 9,035,999 | B2 | 5/2015 | Carpenter et al. |
| 9,298,257 | B2 | 3/2016 | Hwang et al. |
| 9,547,763 | B1 | 1/2017 | Avital |
| 9,686,466 | B1 | 6/2017 | Billinghurst et al. |
| 10,235,408 | B1 | 3/2019 | Lao et al. |

(Continued)

FOREIGN PATENT DOCUMENTS

| | | | |
|---|---|---|---|
| AU | 2020269590 | A1 | 12/2021 |
| CN | 109948511 | A * | 6/2019 |

(Continued)

OTHER PUBLICATIONS

Office Action received for European Patent Application No. 22706486.2, mailed on Oct. 15, 2025, 8 pages.

(Continued)

*Primary Examiner* — Maurice L. McDowell, Jr.
(74) *Attorney, Agent, or Firm* — YHE Law LLP

(57) ABSTRACT

A computer system displays one or more portions of a representation of a user with different appearances based on whether the computer system receives information that the one or more portions of the representation are positioned with predefined regions of a physical environment in which the user is located.

33 Claims, 21 Drawing Sheets

(56) References Cited

U.S. PATENT DOCUMENTS

| | | | | |
|---|---|---|---|---|
| 10,811,055 | B1 | 10/2020 | Kimber et al. | |
| 10,861,248 | B2 | 12/2020 | Scapel et al. | |
| 11,282,174 | B1 | 3/2022 | Demaio | |
| 11,900,013 | B2 | 2/2024 | Tokuchi et al. | |
| 2002/0135581 | A1 | 9/2002 | Russell et al. | |
| 2007/0003915 | A1 | 1/2007 | Templeman | |
| 2009/0079813 | A1 | 3/2009 | Hildreth | |
| 2009/0254843 | A1 | 10/2009 | Van et al. | |
| 2010/0035682 | A1 | 2/2010 | Gentile et al. | |
| 2010/0277411 | A1* | 11/2010 | Yee | G06F 3/017 382/103 |
| 2011/0009241 | A1 | 1/2011 | Lane et al. | |
| 2011/0025689 | A1 | 2/2011 | Perez et al. | |
| 2011/0175809 | A1 | 7/2011 | Markovic et al. | |
| 2011/0248992 | A1 | 10/2011 | Van et al. | |
| 2012/0162065 | A1* | 6/2012 | Tossell | G06V 40/23 345/156 |
| 2013/0015946 | A1 | 1/2013 | Lau et al. | |
| 2013/0227651 | A1 | 8/2013 | Schultz et al. | |
| 2013/0321412 | A1 | 12/2013 | Coon et al. | |
| 2014/0168217 | A1 | 6/2014 | Kim et al. | |
| 2014/0267311 | A1 | 9/2014 | Evertt et al. | |
| 2014/0270351 | A1 | 9/2014 | Hoof et al. | |
| 2014/0320408 | A1* | 10/2014 | Zagorsek | G06F 3/017 345/158 |
| 2015/0052462 | A1 | 2/2015 | Kulkarni | |
| 2015/0334292 | A1 | 11/2015 | Tartz et al. | |
| 2016/0062444 | A1* | 3/2016 | Hamilton | G06F 1/3231 345/670 |
| 2016/0110593 | A1 | 4/2016 | Hoof et al. | |
| 2017/0004440 | A1* | 1/2017 | Barker | G06Q 10/0631 |
| 2017/0007183 | A1 | 1/2017 | Dusan et al. | |
| 2017/0160819 | A1 | 6/2017 | Yi et al. | |
| 2018/0144746 | A1 | 5/2018 | Mishra et al. | |
| 2018/0365904 | A1 | 12/2018 | Holmes | |
| 2019/0080066 | A1 | 3/2019 | Van Os et al. | |
| 2019/0088018 | A1 | 3/2019 | Shenton et al. | |
| 2019/0094981 | A1 | 3/2019 | Bradski et al. | |
| 2019/0096106 | A1 | 3/2019 | Shapiro et al. | |
| 2019/0160378 | A1 | 5/2019 | Fajt et al. | |
| 2019/0278894 | A1 | 9/2019 | Andalo et al. | |
| 2019/0340419 | A1 | 11/2019 | Milman et al. | |
| 2020/0051304 | A1 | 2/2020 | Choi et al. | |
| 2020/0053262 | A1 | 2/2020 | Wexler et al. | |
| 2020/0082135 | A1 | 3/2020 | Tagawa et al. | |
| 2020/0104620 | A1 | 4/2020 | Cohen et al. | |
| 2020/0110864 | A1 | 4/2020 | Casado et al. | |
| 2020/0117270 | A1 | 4/2020 | Gibson et al. | |
| 2020/0134383 | A1 | 4/2020 | Rhee et al. | |
| 2020/0175772 | A1 | 6/2020 | Hariton | |
| 2020/0193669 | A1 | 6/2020 | Churchill et al. | |
| 2020/0202625 | A1 | 6/2020 | Jones et al. | |
| 2021/0019541 | A1 | 1/2021 | Wang et al. | |
| 2021/0056747 | A1 | 2/2021 | Hefny et al. | |
| 2021/0089136 | A1 | 3/2021 | Hossain et al. | |
| 2021/0097766 | A1 | 4/2021 | Palangie et al. | |
| 2021/0110015 | A1 | 4/2021 | Mccarty et al. | |
| 2021/0294427 | A1* | 9/2021 | Zhou | G06F 3/017 |
| 2021/0312167 | A1 | 10/2021 | Shirai | |
| 2021/0382544 | A1 | 12/2021 | Butcher et al. | |
| 2021/0407215 | A1 | 12/2021 | Evangelista et al. | |
| 2022/0012922 | A1 | 1/2022 | Ishikawa | |
| 2022/0020220 | A1 | 1/2022 | Lehman | |
| 2022/0083636 | A1 | 3/2022 | Sarkis et al. | |
| 2022/0084279 | A1 | 3/2022 | Lindmeier et al. | |
| 2022/0105389 | A1 | 4/2022 | Lianides et al. | |
| 2022/0134234 | A1 | 5/2022 | Sachson et al. | |
| 2022/0147148 | A1 | 5/2022 | Begley | |
| 2022/0253126 | A1* | 8/2022 | Holland | G06F 3/011 |
| 2022/0262080 | A1 | 8/2022 | Burton et al. | |
| 2022/0343934 | A1 | 10/2022 | Lynch et al. | |
| 2022/0366626 | A1 | 11/2022 | Miller et al. | |
| 2023/0103161 | A1 | 3/2023 | Li et al. | |
| 2023/0171484 | A1 | 6/2023 | Dedonato et al. | |
| 2023/0229283 | A1 | 7/2023 | Long et al. | |
| 2023/0316674 | A1 | 10/2023 | Boesel et al. | |
| 2024/0077937 | A1 | 3/2024 | Rickwald et al. | |
| 2024/0372968 | A1 | 11/2024 | Rickwald et al. | |
| 2025/0022237 | A1 | 1/2025 | Burton et al. | |
| 2025/0103132 | A1 | 3/2025 | Rickwald et al. | |
| 2025/0245942 | A1 | 7/2025 | Boesel et al. | |
| 2025/0378654 | A1 | 12/2025 | Burton et al. | |

FOREIGN PATENT DOCUMENTS

| | | | | |
|---|---|---|---|---|
| EP | 2492873 | B1 | 9/2013 | |
| EP | 3531377 | A1 | 8/2019 | |
| EP | 3627450 | A1 | 3/2020 | |
| EP | 3537378 | B1 | 11/2021 | |
| JP | 2012-223357 | A | 11/2012 | |
| JP | 5219184 | B2 | 6/2013 | |
| JP | 6535699 | B2 | 6/2019 | |
| JP | 2020-525868 | A | 8/2020 | |
| JP | 2021-527998 | A | 10/2021 | |
| JP | 2008-27086 | A | 8/2024 | |
| JP | 2016-528571 | A | 8/2024 | |
| JP | 2020-156919 | A | 8/2024 | |
| KR | 10-2017-0007285 | A | 1/2017 | |
| KR | 10-2017-0067077 | A | 6/2017 | |
| KR | 10-2020-0117685 | | 10/2020 | |
| WO | 2015/064144 | A1 | 5/2015 | |
| WO | 2017/043314 | A1 | 3/2017 | |
| WO | 2018/226265 | A1 | 12/2018 | |
| WO | 2019/220742 | A1 | 11/2019 | |
| WO | 2020/075308 | A1 | 4/2020 | |
| WO | 2020/129959 | A1 | 6/2020 | |
| WO | WO-2020166837 | A1 * | 8/2020 | G06V 20/647 |
| WO | 2021/145067 | A1 | 7/2021 | |

OTHER PUBLICATIONS

Office Action received for Japanese Patent Application No. 2024-531175, mailed on Feb. 3, 2025, 4 pages (2 pages of English Translation and 2 pages of Official Copy).

Applicant-Initiated Interview Summary received for U.S. Appl. No. 18/241,802, mailed on Jul. 17, 2024, 6 pages.

Corrected Notice of Allowance received for U.S. Appl. No. 18/241,802, mailed on Oct. 22, 2024, 9 pages.

International Preliminary Report on Patentability received for PCT Patent Application No. PCT/US2022/050799, mailed on Jun. 13, 2024, 10 pages.

International Preliminary Report on Patentability received for PCT Patent Application No. PCT/US2023/017484, mailed on Oct. 17, 2024, 21 pages.

Non-Final Office Action received for U.S. Appl. No. 17/988,532, mailed on Jun. 21, 2024, 32 pages.

Notice of Allowance received for U.S. Appl. No. 17/667,350, mailed on Jul. 8, 2024, 10 pages.

Notice of Allowance received for U.S. Appl. No. 18/241,802, mailed on Oct. 8, 2024, 11 pages.

Office Action received for Japanese Patent Application No. 2023-548256, mailed on Aug. 5, 2024, 8 pages (4 pages of English Translation and 4 pages of Official Copy).

International Search Report and Written Opinion received for PCT Patent Application No. PCT/US2024/025380, mailed on Sep. 23, 2024, 23 pages.

Invitation to Pay Additional Fees and Partial International Search Report received for PCT Patent Application No. PCT/US2024/025380, mailed on Aug. 1, 2024, 15 pages.

Notice of Allowance received for U.S. Appl. No. 18/241,802, mailed on Dec. 4, 2024, 12 pages.

Office Action received for Japanese Patent Application No. 2023-548256, mailed on Nov. 11, 2024, 6 pages (3 pages of English Translation and 3 pages of Official Copy).

Final Office Action received for U.S. Appl. No. 17/988,532, mailed on Dec. 9, 2024, 35 pages.

Alldieck et al., “Learning to Reconstruct People in Clothing from a Single RGB Camera”, Arxiv.Org, Cornell University Library, 201 Olin Library Cornell University Ithaca, NY 14853, V1, Mar. 14, 2019, 12 pages.

(56) References Cited

OTHER PUBLICATIONS

Office Action received for European Patent Application No. 22843465.0, mailed on Dec. 15, 2025, 6 pages.
Decision to Grant received for Japanese Patent Application No. 2023-548256, mailed on Feb. 17, 2025, 3 pages (1 page of English Translation and 2 pages of Official Copy).
Applicant-Initiated Interview Summary received for U.S. Appl. No. 17/988,532. mailed on Mar. 7, 2025, 5 pages.
Non-Final Office Action received for U.S. Appl. No. 17/988,532, mailed on Mar. 26, 2025, 39 pages.
Applicant-Initiated Interview Summary received for U.S. Appl. No. 17/667,350, mailed on Jan. 18, 2024, 4 pages.
Alldieck et al., "Learning to Reconstruct People in Clothing from a Single RGB Camera", Rxiv.Org, Cornell University Library, 201 Olin Library Cornell University Ithaca, Ny 14853, 2019, 12 pages.
Applicant-Initiated Interview Summary received for U.S. Appl. No. 17/667,350, mailed on May 24, 2024, 4 pages.
Applicant-Initiated Interview Summary received for U.S. Appl. No. 17/667,350, mailed on May 31, 2023, 4 pages.
Applicant-Initiated Interview Summary received for U.S. Appl. No. 17/667,350, mailed on Sep. 20, 2023, 4 pages.
Chan et al., "FrontFace", Facilitating Communication Between HMD Users and Outsiders Using Front-Facing-Screen HMDs, Sep. 4-7, 2017, 5 pages.
Final Office Action received for U.S. Appl. No. 17/667,350, mailed on Jul. 26, 2023, 19 pages.
Final Office Action received for U.S. Appl. No. 17/667,350, mailed on Mar. 21, 2024, 19 pages.
International Preliminary Report on Patentability received for PCT Patent Application No. PCT/US2022/016451, mailed on Aug. 31, 2023, 13 pages.
International Preliminary Report on Patentability received for PCT Patent Application No. PCT/US2022/044194, mailed on Apr. 4, 2024, 12 pages.
International Search Report and Written Opinion received for PCT Patent Application No. PCT/US2022/016451, mailed on Jun. 24, 2022, 18 pages.
International Search Report and Written Opinion received for PCT Patent Application No. PCT/US2022/044194, mailed on Feb. 13, 2023, 18 pages.
International Search Report and Written Opinion received for PCT Patent Application No. PCT/US2022/050799, mailed on Apr. 3, 2023, 18 pages.
International Search Report and Written Opinion received for PCT Patent Application No. PCT/US2023/017484, mailed on Aug. 28, 2023, 28 pages.
International Search Report and Written Opinion received for PCT Patent Application No. PCT/US2023/031979, mailed on Mar. 12, 2024, 16 pages.
Invitation to Pay Additional Fees and Partial International Search Report received for PCT Patent Application No. PCT/US2022/044194, mailed on Dec. 15, 2022, 10 pages.
Invitation to Pay Additional Fees and Partial International Search Report received for PCT Patent Application No. PCT/US2023/017484, mailed on Jul. 7, 2023, 20 pages.
Invitation to Pay Additional Fees and Partial International Search Report received for PCT Patent Application No. PCT/US2023/031979, mailed on Jan. 19, 2024, 9 pages.
Invitation to Pay Additional Fees received for PCT Patent Application No. PCT/US2022/016451, mailed on Apr. 28, 2022, 11 pages.
Mai et al., "Frontal Screens on Head-Mounted Displays to Increase Awareness of the HMD Users' State in Mixed Presence Collaboration", May 15, 2019, 10 pages.
Mai et al., "TransparentHMD", Revealing the HMD User's Face to Bystanders, Nov. 26-29, 2017, 6 pages.
Non-Final Office Action received for U.S. Appl. No. 17/667,350, mailed on Apr. 21, 2023, 16 pages.
Non-Final Office Action received for U.S. Appl. No. 17/667,350, mailed on Oct. 12, 2023, 21 pages.
Non-Final Office Action received for U.S. Appl. No. 17/944,911, mailed on Dec. 26, 2023, 21 pages.
Non-Final Office Action received for U.S. Appl. No. 17/944,911, mailed on Mar. 26, 2024, 11 pages.
Non-Final Office Action received for U.S. Appl. No. 18/241,802, mailed on May 17, 2024, 57 pages.
Notice of Allowance received for U.S. Appl. No. 17/944,911, mailed on Jul. 9, 2024, 10 pages.
Rekimoto et al., "Behind-the-Mask", A Face-Through Head-Mounted Display, 18, May 29-Jun. 1, 2018, 5 pages.
Notice of Allowance received for U.S. Appl. No. 18/125,600, mailed on Jan. 23, 2025, 13 pages.
Ex Parte Quayle Action received for U.S. Appl. No. 18/972,738, mailed on Nov. 18, 2025, 8 pages.
International Preliminary Report on Patentability received for PCT Patent Application No. PCT/US2024/025380, mailed on Nov. 13, 2025, 17 pages.
Office Action received for Australian Patent Application No. 2022398468, mailed on May 30, 2025, 4 pages.
Invitation to Pay Search Fees received for European Patent Application No. 22706486.2, mailed on Jun. 11, 2025, 3 pages.
Final Office Action received for U.S. Appl. No. 17/988,532, mailed on Sep. 4, 2025, 42 pages.
Notice of Acceptance received for Australian Patent Application No. 2022398468, mailed on Sep. 10, 2025, 3 pages.
Notice of Allowance received for Korean Patent Application No. 10-2024-7018090, mailed on Aug. 21, 2025, 7 pages (2 pages of English Translation and 5 pages of Official Copy).
Office Action received for European Patent Application No. 22787099.5, mailed on Sep. 1, 2025, 7 pages.
Corrected Notice of Allowance received for U.S. Appl. No. 18/241,802, mailed on Mar. 28, 2025, 9 pages.
International Preliminary Report on Patentability received for PCT Patent Application No. PCT/US2023/031979, mailed on Mar. 20, 2025, 11 pages.
Notice of Allowance received for Japanese Patent Application No. 2024-531175, mailed on Mar. 31, 2025, 4 pages (1 page of English Translation and 3 pages of Official Copy).
International Search Report and Written Opinion received for PCT Patent Application No. PCT/US2025/031036, mailed on Oct. 31, 2025, 16 pages.
Invitation to Pay Additional Fees and Partial International Search Report received for PCT Patent Application No. PCT/US2025/031036, mailed on Sep. 10, 2025, 10 pages.
Non-Final Office Action received for U.S. Appl. No. 18/582,474, mailed on Dec. 11, 2025, 11 pages.
Corrected Notice of Allowance received for U.S. Appl. No. 18/125,600, mailed on Apr. 17, 2025, 5 pages.

* cited by examiner

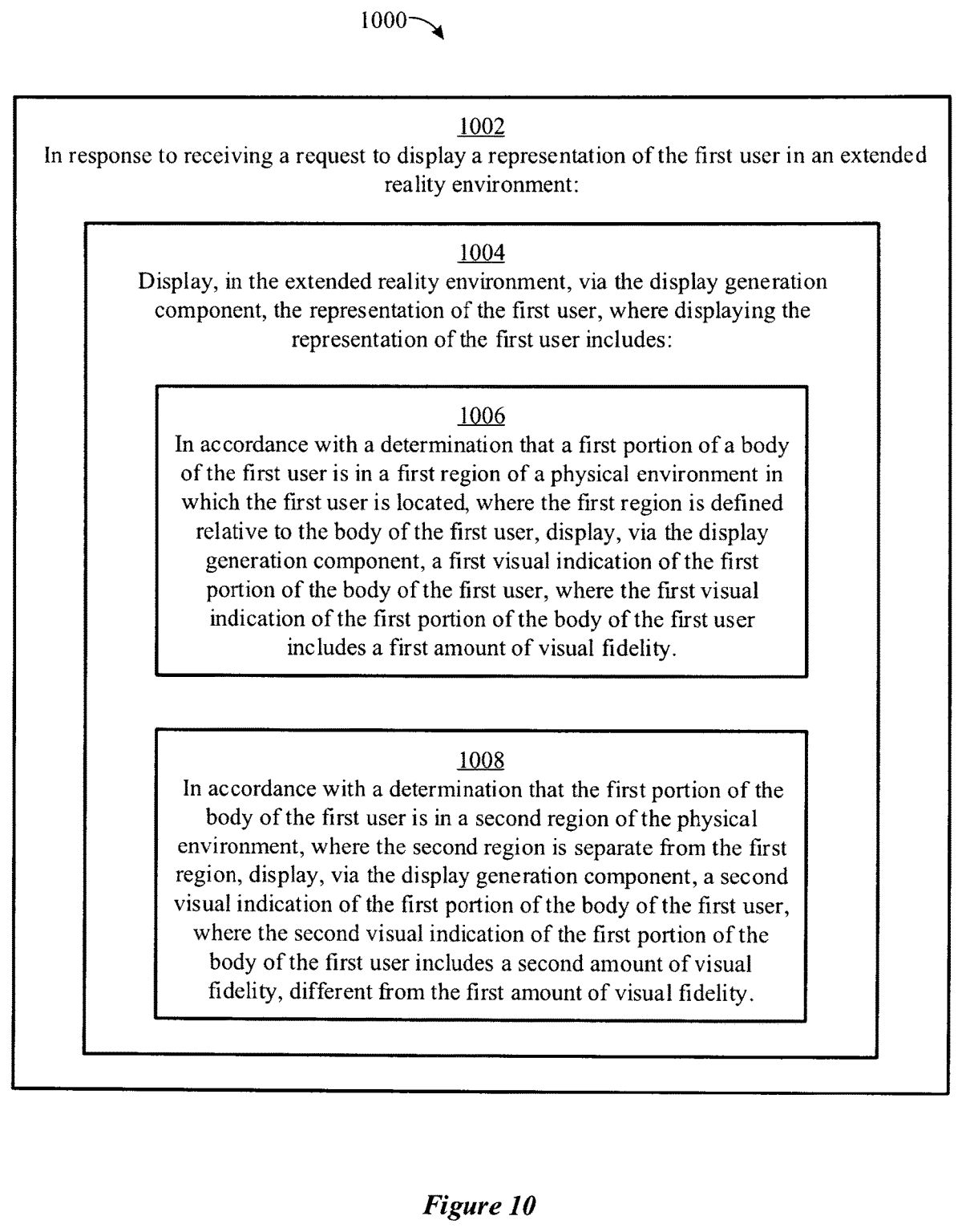

1000

1002
In response to receiving a request to display a representation of the first user in an extended reality environment:

1004
Display, in the extended reality environment, via the display generation component, the representation of the first user, where displaying the representation of the first user includes:

1006
In accordance with a determination that a first portion of a body of the first user is in a first region of a physical environment in which the first user is located, where the first region is defined relative to the body of the first user, display, via the display generation component, a first visual indication of the first portion of the body of the first user, where the first visual indication of the first portion of the body of the first user includes a first amount of visual fidelity.

1008
In accordance with a determination that the first portion of the body of the first user is in a second region of the physical environment, where the second region is separate from the first region, display, via the display generation component, a second visual indication of the first portion of the body of the first user, where the second visual indication of the first portion of the body of the first user includes a second amount of visual fidelity, different from the first amount of visual fidelity.

*Figure 10*

DEVICES, METHODS, AND GRAPHICAL USER INTERFACES FOR DISPLAYING A REPRESENTATION OF A USER IN AN EXTENDED REALITY ENVIRONMENT

CROSS-REFERENCE TO RELATED APPLICATIONS

This application is a continuation of U.S. Nonprovisional patent application Ser. No. 17/944,911, entitled "DEVICES, METHODS, AND GRAPHICAL USER INTERFACES FOR DISPLAYING A REPRESENTATION OF A USER IN AN EXTENDED REALITY ENVIRONMENT," filed on Sep. 14, 2022, which claims priority to U.S. Provisional Patent Application Ser. No. 63/248,036, entitled "DEVICES, METHODS, AND GRAPHICAL USER INTERFACES FOR TRACKING MITIGATION IN THREE-DIMENSIONAL ENVIRONMENTS," filed on Sep. 24, 2021, the contents of each of which are hereby incorporated by reference in their entirety.

TECHNICAL FIELD

The present disclosure relates generally to computer systems that are in communication with a display generation component and, optionally, an external computer system that is associated with a first user that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for displaying representations of users in environments that include at least some virtual elements (e.g., applications, augmented reality environments, mixed reality environments, and virtual reality environments) are cumbersome, inefficient, and limited. For example, systems that provide insufficient feedback for tracking portions of users in a physical environment and displaying representations based on the insufficient feedback are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that display continuous and comprehensible representations of users when insufficient feedback is received make interacting with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for displaying representations of users when insufficient feedback related to a state of the users is received. Such methods and interfaces may complement or replace conventional methods for communicating with other users in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and in communication with an external computer system that is associated with a first user. The method comprises: in response to receiving a request to display a representation of the first user in an extended reality environment: displaying in the extended reality environment, via the display generation component, the representation of the first user, where the representation of the first user includes: a visual indication of a portion of the body of the first user in the extended reality environment, where: the visual indication of the portion of the body of the first user has an appearance that is determined based at least in part on one or more objects in the extended reality environment; and the visual indication of the portion of the body of the first user represents an estimated state of the portion of the body that is estimated based on indirect information about a state of the portion of the body when direct information about the state of the portion of the body is not available to the computer system.

In accordance with some embodiments, a non-transitory computer-readable storage medium is described. The non-transitory computer-readable storage medium stores one or more programs configured to be executed by one or more processors of a computer system that is in communication with a display generation component and in communication with an external computer system that is associated with a first user, the one or more programs including instructions for: in response to receiving a request to display a representation of the first user in an extended reality environment: displaying in the extended reality environment, via the display generation component, the representation of the first user, where the representation of the first user includes: a visual indication of a portion of the body of the first user in the extended reality environment, where: the visual indication of the portion of the body of the first user has an appearance that is determined based at least in part on one or more objects in the extended reality environment; and the visual indication of the portion of the body of the first user represents an estimated state of the portion of the body that is estimated based on indirect information about a state of the portion of the body when direct information about the state of the portion of the body is not available to the computer system.

In accordance with some embodiments, a transitory computer-readable storage medium is described. The transitory computer readable storage medium stores one or more programs configured to be executed by one or more processors of a computer system that is in communication with a display generation component and in communication with an external computer system that is associated with a first user, the one or more programs including instructions for: in response to receiving a request to display a representation of the first user in an extended reality environment: displaying in the extended reality environment, via the display generation component, the representation of the first user, where the representation of the first user includes: a visual indication of a portion of the body of the first user in the extended reality environment, where: the visual indication of the portion of the body of the first user has an appearance that is determined based at least in part on one or more objects in the extended reality environment; and the visual indication of the portion of the body of the first user represents an estimated state of the portion of the body that is estimated based on indirect information about a state of the portion of the body when direct information about the state of the portion of the body is not available to the computer system.

In accordance with some embodiments, a computer system is described. The computer system is in communication with a display generation component and in communication with an external computer system that is associated with a first user. The computer system comprises: one or more processors; and memory storing one or more programs configured to be executed by the one or more processors, the one or more programs including instructions for: in response to receiving a request to display a representation of the first user in an extended reality environment: displaying in the extended reality environment, via the display generation component, the representation of the first user, where the representation of the first user includes: a visual indication of a portion of the body of the first user in the extended reality environment, where: the visual indication of the portion of the body of the first user has an appearance that is determined based at least in part on one or more objects in the extended reality environment; and the visual indication of the portion of the body of the first user represents an estimated state of the portion of the body that is estimated based on indirect information about a state of the portion of the body when direct information about the state of the portion of the body is not available to the computer system.

In accordance with some embodiments, a computer system is described. The computer system is in communication with a display generation component and in communication with an external computer system that is associated with a first user. The computer system comprises: in response to receiving a request to display a representation of the first user in an extended reality environment: means for displaying in the extended reality environment, via the display generation component, the representation of the first user, where the representation of the first user includes: a visual indication of a portion of the body of the first user in the extended reality environment, where: the visual indication of the portion of the body of the first user has an appearance that is determined based at least in part on one or more objects in the extended reality environment; and the visual indication of the portion of the body of the first user represents an estimated state of the portion of the body that is estimated based on indirect information about a state of the portion of the body when direct information about the state of the portion of the body is not available to the computer system.

In accordance with some embodiments, a method is described. The method is performed at a computer system that is in communication with a display generation component and in communication with an external computer system that is associated with a first user. The method comprises: in response to receiving a request to display a representation of the first user in an extended reality environment: displaying in the extended reality environment, via the display generation component, the representation of the first user, where displaying the representation of the first user includes: in accordance with a determination that a first portion of a body of the first user is in a first region of a physical environment in which the first user is located, where the first region is defined relative to the body of the first user, displaying, via the display generation component, a first visual indication of the first portion of the body of the first user, where the first visual indication of the first portion of the body of the first user includes a first amount of visual fidelity; and in accordance with a determination that the first portion of the body of the first user is in a second region of the physical environment, where the second region is separate from the first region, displaying, via the display generation component, a second visual indication of the first portion of the body of the first user, where the second visual indication of the first portion of the body of the first user includes a second amount of visual fidelity, different from the first amount of visual fidelity.

In accordance with some embodiments, a non-transitory computer-readable storage medium is described. The non-transitory computer-readable storage medium stores one or more programs configured to be executed by one or more processors of a computer system that is in communication with a display generation component and in communication with an external computer system that is associated with a first user, the one or more programs including instructions for: in response to receiving a request to display a representation of the first user in an extended reality environment: displaying in the extended reality environment, via the display generation component, the representation of the first user, where displaying the representation of the first user includes: in accordance with a determination that a first portion of a body of the first user is in a first region of a physical environment in which the first user is located, where the first region is defined relative to the body of the first user, displaying, via the display generation component, a first visual indication of the first portion of the body of the first user, where the first visual indication of the first portion of the body of the first user includes a first amount of visual fidelity; and in accordance with a determination that the first portion of the body of the first user is in a second region of the physical environment, where the second region is separate from the first region, displaying, via the display generation component, a second visual indication of the first portion of the body of the first user, where the second visual indication of the first portion of the body of the first user includes a second amount of visual fidelity, different from the first amount of visual fidelity.

In accordance with some embodiments, a transitory computer-readable storage medium is described. The transitory computer readable storage medium stores one or more programs configured to be executed by one or more processors of a computer system that is in communication with a display generation component and in communication with an external computer system that is associated with a first user, the one or more programs including instructions for: in response to receiving a request to display a representation of the first user in an extended reality environment: displaying in the extended reality environment, via the display generation component, the representation of the first user, where displaying the representation of the first user includes: in accordance with a determination that a first portion of a body of the first user is in a first region of a physical environment in which the first user is located, where the first region is defined relative to the body of the first user, displaying, via the display generation component, a first visual indication of the first portion of the body of the first user, where the first visual indication of the first portion of the body of the first user includes a first amount of visual fidelity; and in accordance with a determination that the first portion of the body of the first user is in a second region of the physical environment, where the second region is separate from the first region, displaying, via the display generation component, a second visual indication of the first portion of the body of the first user, where the second visual indication of the first portion of the body of the first user includes a second amount of visual fidelity, different from the first amount of visual fidelity.

In accordance with some embodiments, a computer system is described. The computer system is in communication with a display generation component and in communication with an external computer system that is associated with a first user. The computer system comprises: one or more processors; and memory storing one or more programs configured to be executed by the one or more processors, the one or more programs including instructions for: in response to receiving a request to display a representation of the first user in an extended reality environment: displaying in the extended reality environment, via the display generation component, the representation of the first user, where displaying the representation of the first user includes: in accordance with a determination that a first portion of a body of the first user is in a first region of a physical environment in which the first user is located, where the first region is defined relative to the body of the first user, displaying, via the display generation component, a first visual indication of the first portion of the body of the first user, where the first visual indication of the first portion of the body of the first user includes a first amount of visual fidelity; and in accordance with a determination that the first portion of the body of the first user is in a second region of the physical environment, where the second region is separate from the first region, displaying, via the display generation component, a second visual indication of the first portion of the body of the first user, where the second visual indication of the first portion of the body of the first user includes a second amount of visual fidelity, different from the first amount of visual fidelity.

In accordance with some embodiments, a computer system is described. The computer system is in communication with a display generation component and in communication with an external computer system that is associated with a first user. The computer system comprises: in response to receiving a request to display a representation of the first user in an extended reality environment: means for displaying in the extended reality environment, via the display generation component, the representation of the first user, where displaying the representation of the first user includes: in accordance with a determination that a first portion of a body of the first user is in a first region of a physical environment in which the first user is located, where the first region is defined relative to the body of the first user, displaying, via the display generation component, a first visual indication of the first portion of the body of the first user, where the first visual indication of the first portion of the body of the first user includes a first amount of visual fidelity; and in accordance with a determination that the first portion of the body of the first user is in a second region of the physical environment, where the second region is separate from the first region, displaying, via the display generation component, a second visual indication of the first portion of the body of the first user, where the second visual indication of the first portion of the body of the first user includes a second amount of visual fidelity, different from the first amount of visual fidelity.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 10 is a flow diagram of methods of displaying representations of different portions of a user with different amounts of visual fidelity, in accordance with various embodiments.

DESCRIPTION OF EMBODIMENTS

Figure 1:
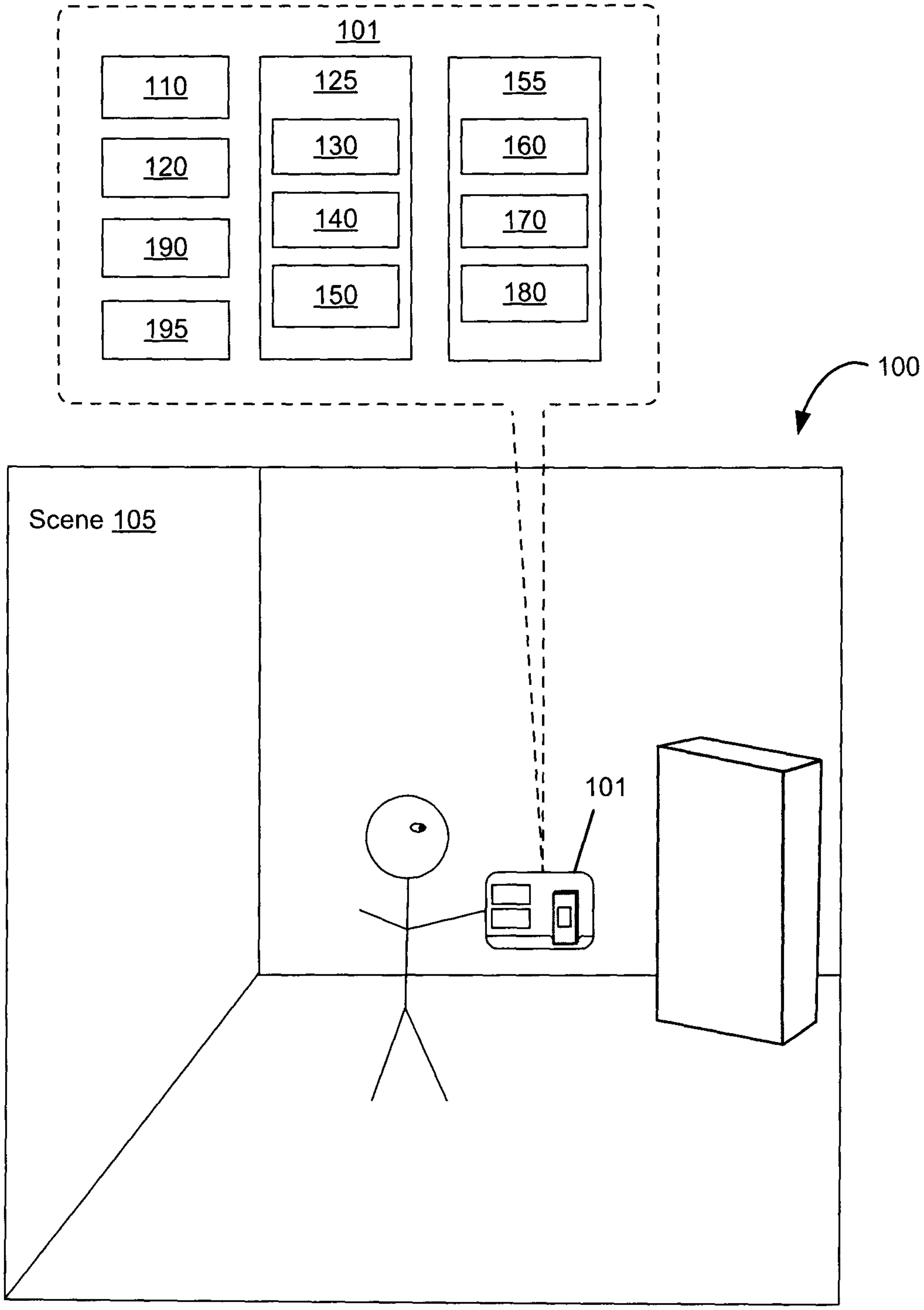
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays a representation of a user within an extended reality environment, but the computer system does not receive direct information and/or data indicative of a state one or more portions of a body of the user. Accordingly, the computer system displays the representation with a visual indication of the one or more portions of the body of the user that are not anatomically accurate depictions of the one or more portions of the body of the user. The computer system estimates a state of the one or more body portions of the body of the user and displays the visual indication to enable another user viewing the representation to gain a better understanding of a state of the user's full body within the extended reality environment. The visual indication is optionally a shadow indicative of an estimated position of a lower portion of the body of the user. The visual indication is optionally displayed concurrently with a blurred extension that provides an additional visual indication of portions of the body of the user for which the computer system does not receive direct information and/or data of the state of the portions of the body.

In some embodiments, the computer system displays a representation of a user within an extended reality environment and displays a visual indication of a portion of a body of the user differently based on a position of the portion of the body of the user within a physical environment in which the user is located. For instance, the computer system determines a position of the portion of the body of the user based on indirect and/or direct information about a state of the portion of the body of the user within the physical environment in which the user is located. The computer system determines whether the position of the portion of the body of the user is inside or outside of a predefined region of the physical environment that is defined with respect to the body of the user. For example, the predefined region corresponds to an area near pockets of the user when the portion of the body of the user is the user's hands. The predefined region corresponds to an area near a waist and/or hips of the user when the portion of the body is the user's elbows. The computer system applies a different amount of visual fidelity to the visual indication based on whether the portion of the body of the user is determined to be inside or outside of the predefined region. The computer system optionally defines more than one predefined region and associated each predefined region with a particular portion of the body of the user. For example, the computer system can associate a first predefined region with the hands of the user and a second predefined region with the elbows of the user. The predefined regions optionally move as the user physically moves within the physical environment so that the predefined regions remain substantially stationary with respect to the body of the user.

FIGS. 1-6 provide a description of example computer systems for providing XR experiences to users. FIGS. 7A-7I illustrate example techniques for displaying a visual indication of a portion of a user, in accordance with some embodiments. FIG. 8 is a flow diagram of methods of displaying a visual indication of a portion of a user, in accordance with various embodiments. The user interfaces in FIGS. 7A-7I are used to illustrate the processes in FIG. 8. FIGS. 9A-9H illustrate example techniques for displaying representations of different portions of a user with different amounts of visual fidelity, in accordance with some embodiments. FIG. 10 is a flow diagram of methods of displaying representations of different portions of a user with different amounts of visual fidelity, in accordance with various embodiments. The user interfaces in FIGS. 9A-9H are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
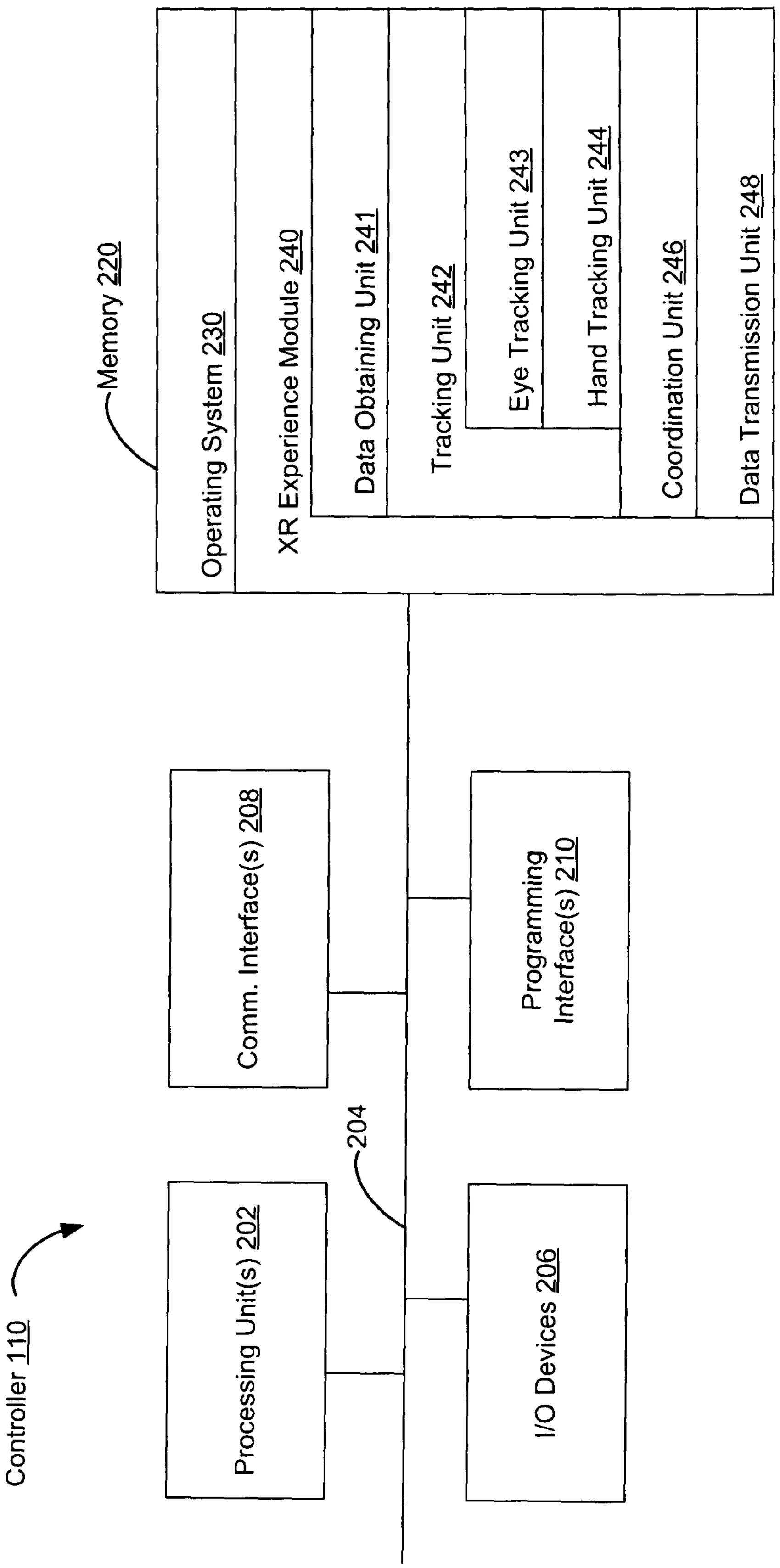
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
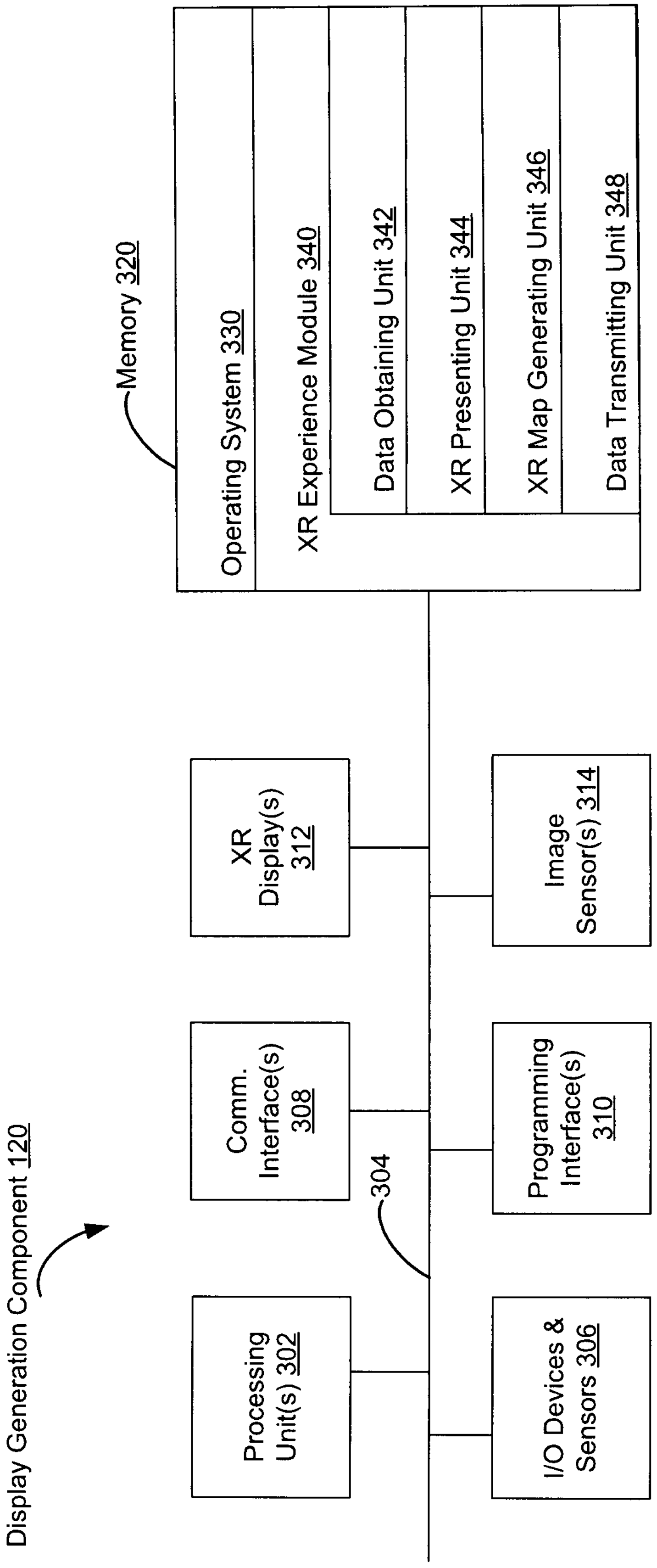
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
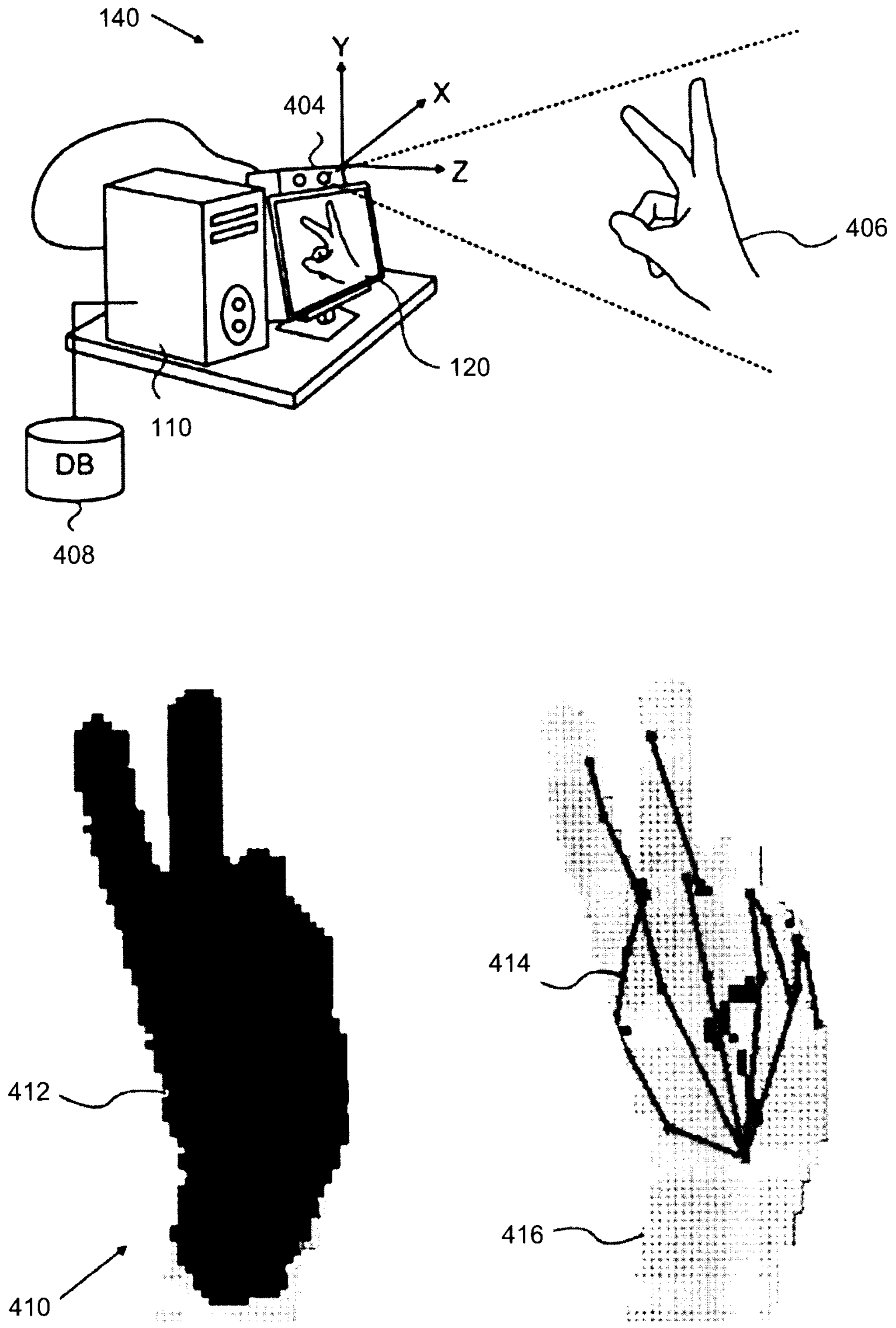
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head)), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
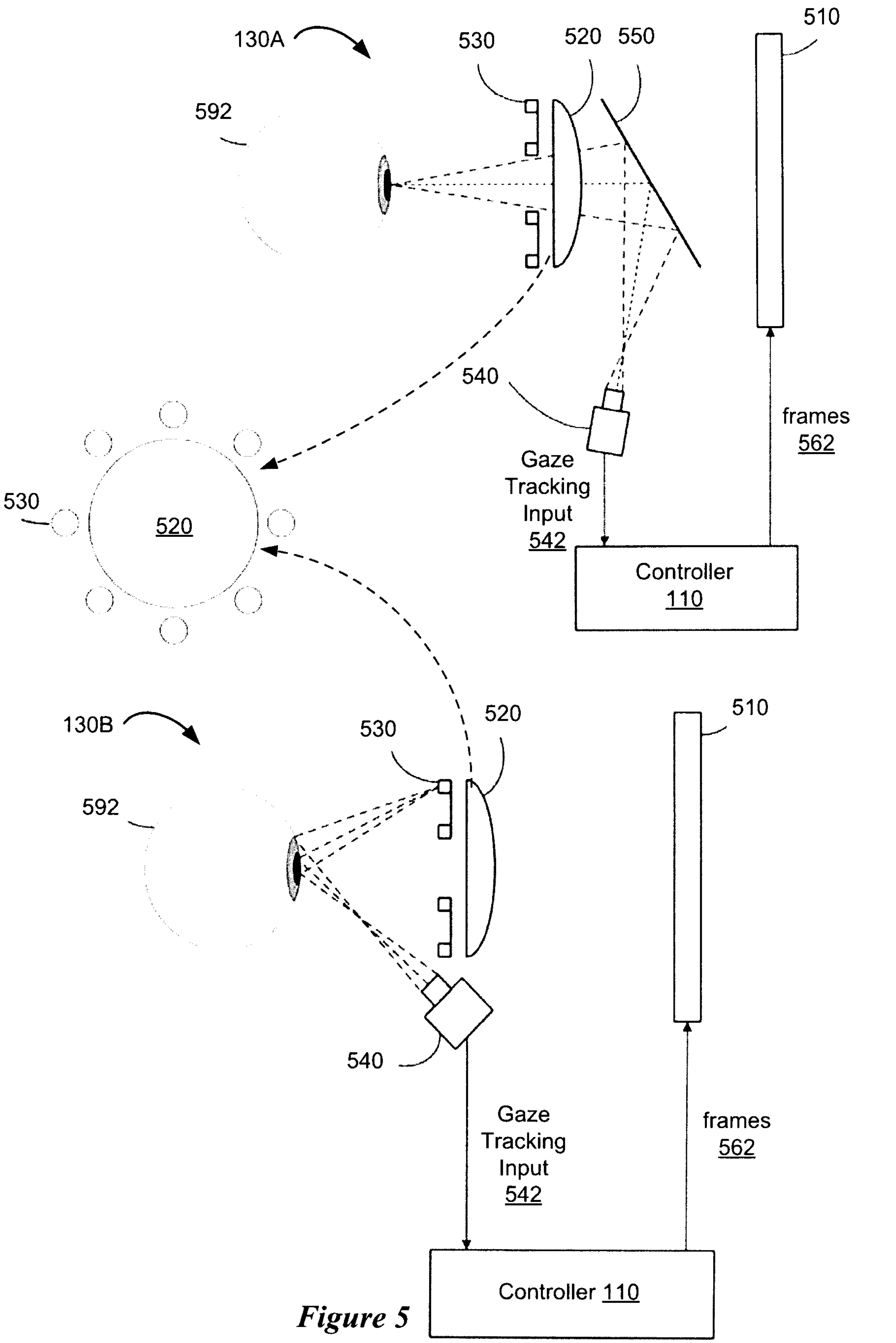
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
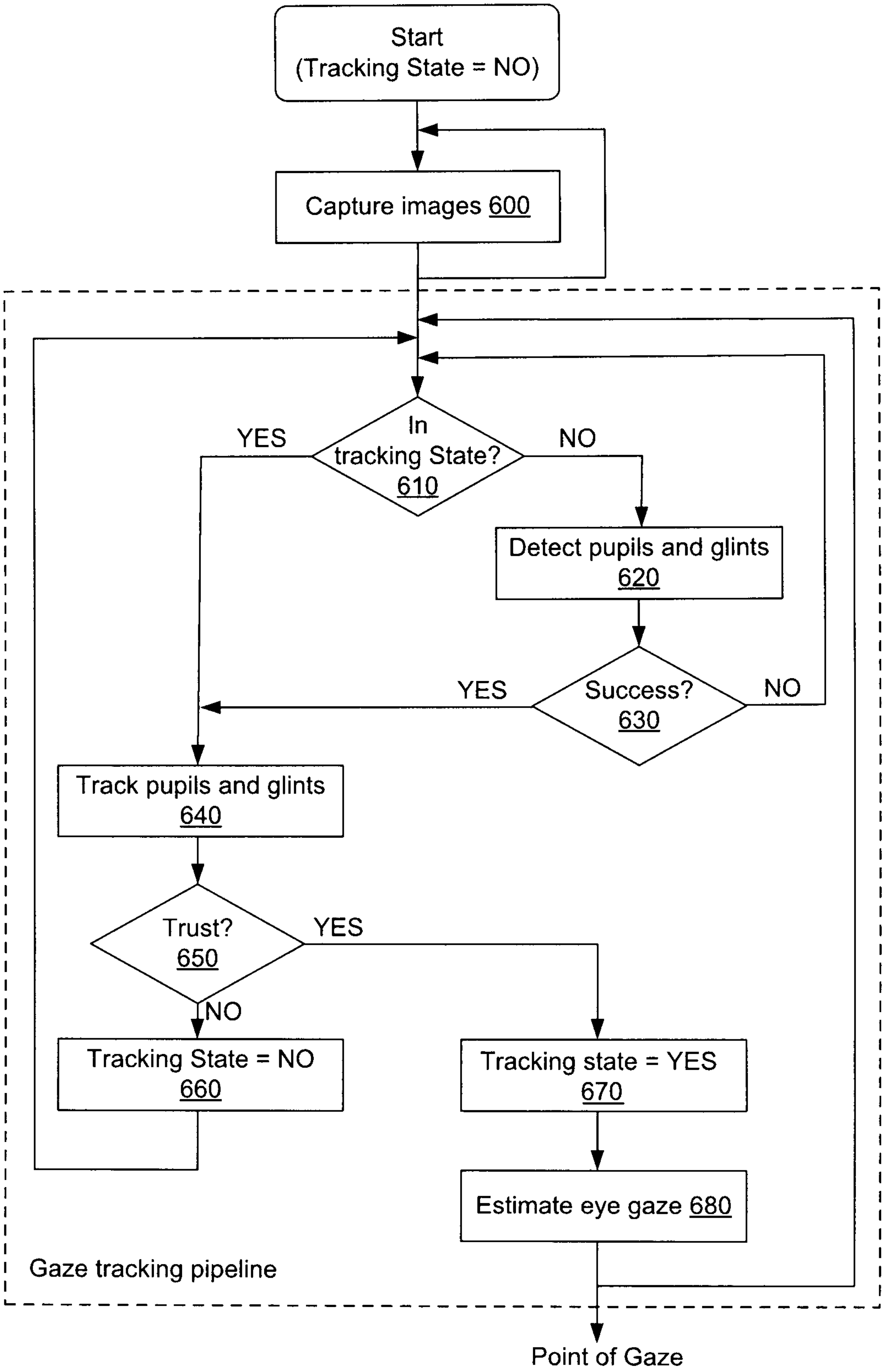
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and an external computer system that is associated with a first user.

FIGS. 7A-7I illustrate examples of displaying a visual indication of a portion of a user. FIG. 8 is a flow diagram of an exemplary method 800 for displaying a visual indication of a portion of a user. The user interfaces in FIGS. 7A-7I are used to illustrate the processes described below, including the processes in FIG. 8.

Figure 7A:
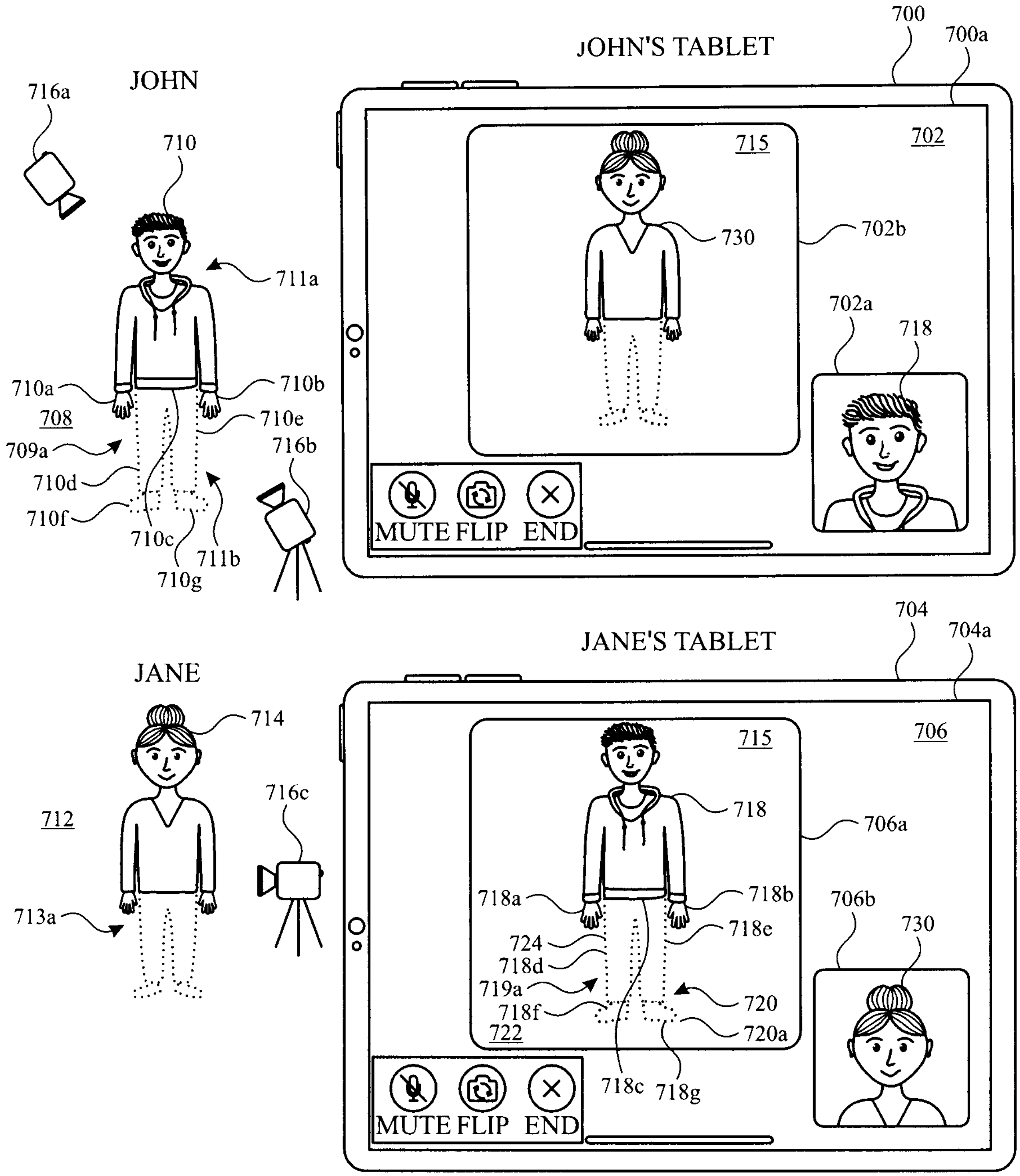
FIGS. 7A-7I illustrate example techniques for displaying a visual indication of a portion of a user, in accordance with some embodiments.
Figure 8:
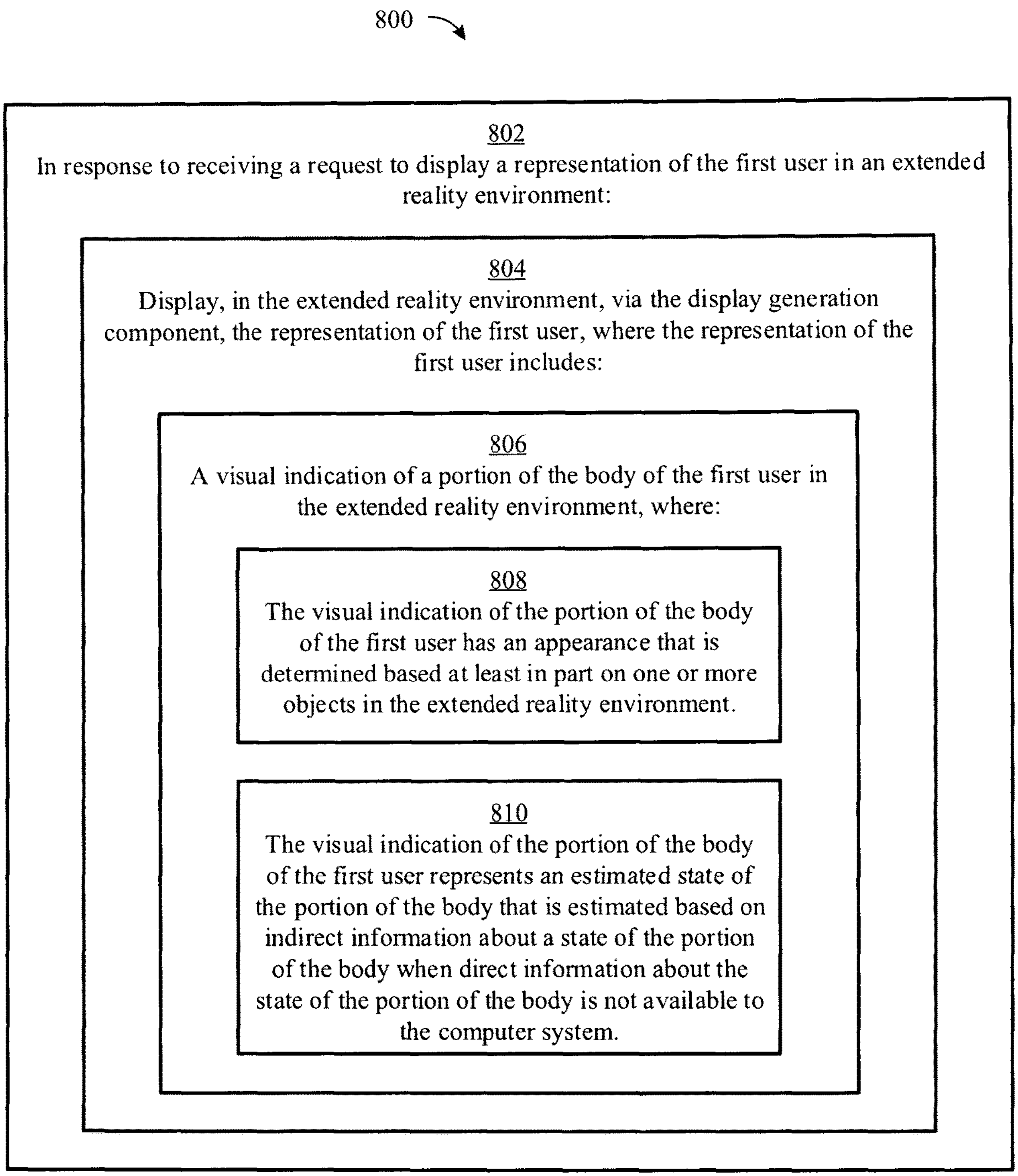
FIG. 8 is a flow diagram of methods of displaying a visual indication of a portion of a user, in accordance with various embodiments.

FIG. 7A illustrates first electronic device 700 (e.g., "John's Tablet") displaying communication user interface 702 on display 700*a* and second electronic device 704 (e.g., "Jane's Tablet") displaying communication user interface 706 on display 704*a*. In addition, FIG. 7A shows first physical environment 708 of first user 710 (e.g., "John") who is using and/or associated with first electronic device 700 and second physical environment 712 of second user 714 (e.g., "Jane") who is using and/or associated with second electronic device 704. first user 710 is at first position 709*a* within first physical environment 708 and second user 714 is at first position 713*a* in second physical environment 712. In addition, at FIG. 7A, first electronic device 700 and second electronic device 704 are in communication with one another. In particular, first user 710 and second user 714 are participating in a real-time communication session (e.g., a video call, a virtual video call, a video conference, and/or a virtual video conference) via first electronic device 700 and second electronic device 704. In some embodiments, the real-time communication session includes actual image and/or video data transferred between electronic devices 700 and 704. In some embodiments, the real-time communication session includes a virtual representation of users 710 and 714 (e.g., avatars of users 710 and 714) that are generated and displayed based on data captured via one or more sensors (e.g., sensors 716*a*-716*c*) in communication with electronic devices 700 and 704.

At FIG. 7A, communication user interface 702 includes first participant region 702*a* including first representation 718 corresponding to first user 710 and second participant region 702*b* including extended reality environment 715 (e.g., a virtual reality environment, an augmented reality environment, and/or a mixed reality environment) and second representation 730 corresponding to second user 714. Similarly, communication user interface 706 includes third participant region 706*a* including extended reality environment 715 and first representation 718 corresponding to first user 710 and fourth participant region 706*b* including second representation 730 corresponding to second user 714. First electronic device 700 and second electronic device 704 are configured to direct (e.g., transmit) sensor data, audio data, image data, and/or video data between one another, such that first user 710 and second user 714 can communicate with one another via first electronic device 700 and second electronic device 704, respectively (e.g., first physical environment 708 in which first user 710 is located is remote from second physical environment 712 in which second user 714 is located). As set forth below, first electronic device 700 and second electronic device 704 display representations of first user 710 and second user 714 on communication user interfaces 702 and 706, respectively. The representations of first user 710 and second user 714 that are displayed can include virtual avatars of first user 710 and second user 714 that are generated by first electronic device 700 and/or second electronic device 704. In other words, the representations of first user 710 and second user 714 displayed by first electronic device 700 and second electronic device 704 are not actual images of first user 710 and second user 714 that are captured via a camera. Instead, the representations are virtual avatars that are generated based on data captured via one or more sensors (e.g., sensors 716*a*-716*c*) in communication with first electronic device 700 and/or second electronic device 704. Accordingly, the representations of the users in the extended reality environment optionally look different from the appearance of the users in the physical environments.

At FIG. 7A, first physical environment 708 includes first sensor 716*a* and second sensor 716*b* and second physical environment 712 includes third sensor 716*c*. Sensors 716*a* and 716*b* are in communication with first electronic device 700 (e.g., wired communication and/or wireless communication) and third sensor 716*c* is in communication with second electronic device 704 (e.g., wired communication and/or wireless communication). In some embodiments, sensors 716*a*-716*c* include cameras, image sensors, light sensors, depth sensors, tactile sensors, orientation sensors, proximity sensors, temperature sensors, location sensors, motion sensors, and/or velocity sensors. Sensors 716*a* and 716*b* are configured to capture data related to a state (e.g., a position, a location, an orientation, a posture, and/or a pose) of first user 710 (e.g., a body of first user 710) within first physical environment 708 and sensor 716*c* is configured to capture data related to a state (e.g., a position, a location, an orientation, a posture, and/or a pose) of second user 714 (e.g., a body of second user 714) within second physical environment 712. For example, sensors 716*a*-716*c* are configured to detect and capture data related to a positon and/or movement of various body parts of users 710 and 714 within their respective physical environments. While FIG. 7A illustrates first electronic device 700 being in communication with two sensors (e.g., sensors 716*a* and 716*b*) and second electronic device 704 being in communication with one sensor (e.g., third sensor 716*c*), in some embodiments, first electronic device 700 and second electronic device 704 are in communication with any suitable number of sensors.

FIGS. 7A-7I illustrate exemplary user interfaces displayed on electronic devices 700 and 704 during the real-time communication session. While both of electronic devices 700 and 704 are illustrated, described examples are largely directed to sensors 716*a* and 716*b* capturing data indicative of a state of first user 710 and second electronic device 704 displaying and/or updating first representation 718 of first user 710 on communication user interface 706 based on received information that is based on the data. It should be understood that, in some examples, first electronic device 700 operates in an analogous manner as second electronic device 704 based on received information that is based on data captured via sensor 716*c* during the real-time communication session. Accordingly, in some examples, first electronic device 700 displays similar representations of second user 714 on communication user interface 702 as those described below with reference to second electronic device 704.

At FIG. 7A, first electronic device 700 receives data from sensors 716*a* and 716*b* and directs (e.g., transmits) information based on the data to second electronic device 704. Second electronic device 704 receives the information and generates first representation 718 of first user 710 that is displayed, via display 704*a*, in extended reality environment 715 on communication user interface 706. Second electronic device 704 generates first representation 718 based on the received information. The data captured by sensors 716*a* and 716*b* includes data related to a state of one or more body parts of first user 710 within first physical environment 708. In some embodiments, the data captured by sensors 716*a* and 716*b* further includes data related to features and/or physical characteristics (e.g., facial features, hair color, eye color, clothing, size of body parts, and/or positions of one or more body parts with respect to one another) of one or more body parts of first user 710. Second electronic device 704 uses the received information (that is based on the data) and generates first representation 718 to at least partially include an appearance that imitates an actual state of first user 710 within first physical environment 708. Similarly, first electronic device 700 receives information that is based on data captured via sensor 716*c* (e.g., from second electronic device 704 and/or via an external device, such as a server) and generates second representation 730 corresponding to second user 714 based on the received information.

At FIG. 7A, first user 710 is located at first position 709*a* in first physical environment 708 with first hand 710*a* and second hand 710*b* adjacent to waist 710*c* of a body of first user 710. Accordingly, second electronic device 704 receives the information indicative of the state of first user 710 and generates and displays, based on the information, first representation 718 at first position 719*a* in extended reality environment 715 In some embodiments, first position 719*a* corresponds to first position 709*a*. At FIG. 7A, first representation 718 includes first hand 718*a* (e.g., a representation of first hand 710*a*) and second hand 718*b* (e.g., a representation of second hand 710*b*) adjacent to waist 718*c* (e.g., a representation of waist 710*c*). Thus, second electronic device 704 displays first representation 718 in extended reality environment 715 to imitate a state of first user 710 in first physical environment 708.

In some instances, the information received by second electronic device 704 is based on indirect data indicative of a state of one or more body parts of first user 710 (e.g., data that does not correspond to an actual and/or exact state of the one or more body parts of first user 710). For example, in some embodiments, sensors 716*a* and 716*b* capture direct data indicative of a state of upper portion 711*a* of the body of first user 710, but captures indirect data indicative of a state of lower portion 711*b* of the body of first user 710 (e.g., when sensors 716*a* and/or 716*b* are not directed toward and/or otherwise configured to capture data about lower portion 711*b*). In some embodiments, indirect data includes an extrapolated and/or inferred state of one or more portions of the body of first user 710 and direct data includes a captured and/or sensed state of one or more portions of the body of first user 710 (e.g., direct data does not include an extrapolated and/or inferred state of one or more portions of the body of first user 710). When the information received by second electronic device 704 is based on indirect data, second electronic device 704 displays first visual indication 720 as part of first representation 718 as an indication of lower portion 711*b* of the body of first user 710. At FIG. 7A, first visual indication 720 includes shadow 720*a* displayed on ground 722 of extended reality environment 715. In some embodiments, second electronic device 704 estimates (e.g., predicts based on the received information, extrapolates the received information, and/or approximates based on the received information) a state of lower portion 711*b* and displays visual indication 720 in a location of extended reality environment 715 based on the estimate. In some embodiments, first electronic device 700 estimates the state of lower portion 711*b* based on the data captured via sensor 716*a* and/or sensor 716*b* and directs (e.g., transmits) the information including the estimated state of lower portion 711*b* to second electronic device 704. Thus, second electronic device 704 displays visual indication 720 at an estimated position that is based on the indirect data indicative of the state of upper portion 711*b* of the body of first user 710 and/or based on the direct data indicative of the state of upper portion 711*a* of the body of first user 710.

At FIG. 7A, first user 710 has first leg 710*d*, second leg 710*e*, first foot 710*f*, and second foot 710*g* that are included in lower portion 711*b* of the body of first user 710. In some embodiments, when the information received by second electronic device 704 is based indirect data indicative of a state of first leg 710*d*, second leg 710*e*, first foot 710*f*, and second foot 710*g*, second electronic device 704 displays visual indication 720 to represent these body parts of first user 710 in extended reality environment 715. In some embodiments, the indirect data of the state of first leg 710*d*, second leg 710*e*, first foot 710*f*, and second foot 710*g* includes an estimate, approximation, and/or inference as to a position and/or orientation of first leg 710*d*, second leg 710*e*, first foot 710*f*, and second foot 710*g* within physical environment 708. In some such embodiments, the indirect data of the state of first leg 710*d*, second leg 710*e*, first foot 710*f*, and second foot 710*g* does not include direct sensor data that captures the actual position and/or orientation of first leg 710*d*, second leg 710*e*, first foot 710*f*, and second foot 710*g* within physical environment 708. Accordingly, second user 714 can view communication user interface 706 and obtain an understanding of where these body parts may be positioned with respect to the other portions of first representation 718 (e.g., first hand 718*a*, second hand 718*b*, and/or waist 718*c*) based on a location of visual indication 720. In some embodiments, visual indication 720 represents portions of first representation 718 that are not clearly displayed via second electronic device 704. In some embodiments, visual indication 720 represents portions of first representation 718 that are not displayed via second electronic device 704.

In some embodiments, second electronic device 704 displays (e.g., concurrently with visual indication 720 and/or in lieu of visual indication 720) second visual indication 724 of one or more portions of the body of first user 710 as part of first representation 718 when second electronic device 704 receives the information based on indirect data indicative of a state of one or more body parts of first user 710. For instance, at FIG. 7A, second electronic device 704 displays second visual indication 724 (e.g., indicated by dashed lines at FIG. 7A) representing first leg 710*d*, second leg 710*e*, first foot 710*f*, and second foot 710*g*. As illustrated in FIG. 7A, second visual indication 724 includes dashed lines to represent first leg 718*d*, second leg 718*e*, first foot 718*f*, and second foot 718*g* of first representation 718. In some embodiments, second visual indication 724 does not include an anatomically accurate depiction of one or more portions of the body of first user 710 (e.g., second visual indication 724 does not include a clear representation of first leg 718*d*, second leg 718*e*, first foot 718*f*, and second foot 718*g*). In some embodiments, second visual indication 724 includes a blurred extension of first representation 718. For example, second visual indication 724 can include an orb-like object that includes a non-zero amount of blur, which represents one or more of first leg 710*d*, second leg 710*e*, first foot 710*f*, and/or second foot 710*g* of first user 710. In some embodiments, second electronic device 704 estimates (e.g., predicts based on the received information, extrapolates the received information, and/or approximates based on the received information) a position of second visual indication 724 to display second visual indication 724 at a location in extended reality environment 715. In some embodiments, first electronic device 700 estimates the state of lower portion 711*b* based on the data captured via sensor 716*a* and/or sensor 716*b* and directs (e.g., transmits) the information including the estimated state of lower portion 711*b* to second electronic device 704. Accordingly, second user 714 can view communication user interface 706 and obtain an understanding of where one or more body parts of first user 710 may be positioned with respect to the remainder of first representation 718 based on a location of second visual indication 724.

In some embodiments, extended reality environment 715 is a virtual environment that is different from and/or not based on captured data indicative of features of first physical environment 708. In some such embodiments, ground 722 is a virtual ground that is different from and/or not based on captured data indicative of features of a ground of first physical environment 708. In some embodiments, extended reality environment 715 includes one or more objects (e.g., virtual objects, representations of physical objects in first physical environment 708, and/or images of physical objects in first physical environment 708). Second electronic device 704 is configured to display visual indication 720 and/or second visual indication 724 within extended reality environment 715 in relation to the one or more objects. In other words, second electronic device 704 can adjust sizes, shapes, and/or positions of visual indication 720 and/or second visual indication 724 based on respective positions of the one or more objects displayed in extended reality environment 715.

In addition, second electronic device 704 is configured to adjust and/or modify display of first representation 718, which includes visual indication 720 and/or second visual indication 724, based on information indicative of a status of first user 710 (e.g., information received from first electronic device 700 based on data captured via sensors 716*a* and 716*b*). For example, in response to detecting movement of first user 710, first electronic device 700 directs (e.g., transmits) information to second electronic device 704 indicating the movement and/or new position of first user 710 within first physical environment 708. In response to receiving the information, second electronic device 704 displays first representation 718, visual indication 720, and/or second visual indication 724 at a second position 719*b* on third participant region 706*a*, as shown at FIG. 7B.

Figure 7B:
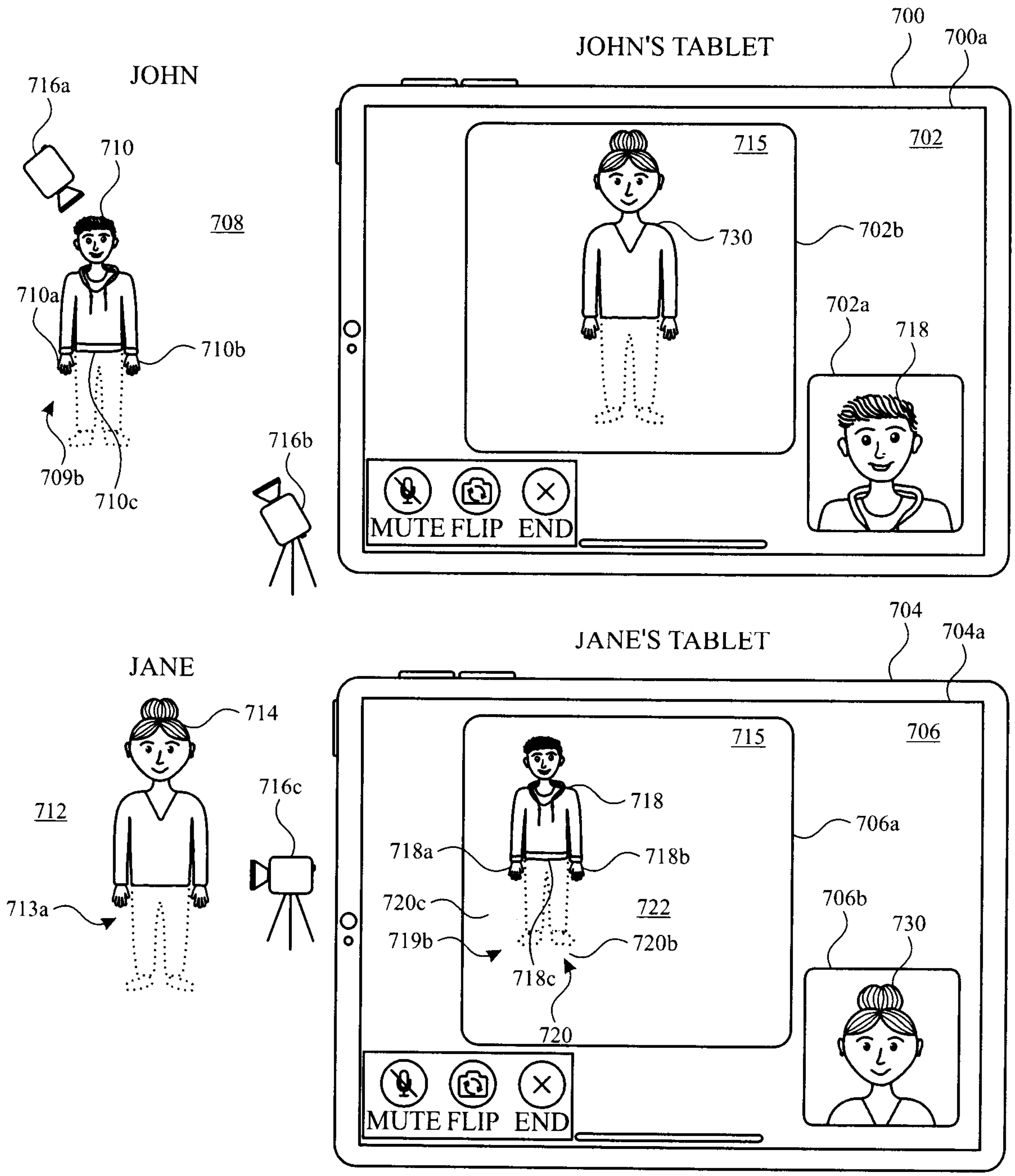

At FIG. 7B, first user 710 has moved (e.g., walked) to second position 709*b* within first physical environment 708, where second position 709*b* is different from first position 709*a*. In response to receiving the information (e.g., from first electronic device 700 and/or via an external device, such as a server) indicating the movement, second electronic device 704 displays first representation 718 at second position 719*b* within extended reality environment 715 to reflect the actual movement of first user 710 within first physical environment 708. In addition, at FIG. 7B, second electronic device 704 displays visual indication 720 to also reflect the movement of first user 710. For instance, at FIG. 7B, visual indication 720 is positioned partially between waist 718*c* of first representation 718 and ground 722 of extended reality environment 715. Accordingly, second electronic device 704 displays visual indication 720 at an updated position within extended reality environment 715 in response to receiving information indicative of first user 710 moving and/or having changed positions within first physical environment 708.

Further, as shown at FIGS. 7A and 7B, second user 714 does not move within second physical environment 712, but remains at position 713*a*. As such, first electronic device 700 receives information indicative of a state of second user 714 (e.g., from second electronic device 704 and/or via an external device, such as a server), and in response to receiving the information, maintains display of second representation 730 with a same state (e.g., the same state shown in FIG. 7A).

At FIG. 7B, first portion 720*b* of visual indication 720 is located between waist 718*c* of first representation 718 and ground 722 of extended reality environment 715. Second portion 720*c* of visual indication 720 extends beyond second position 709*b* (e.g., appearing to be behind second position 709*b*) in extended reality environment 715 to reflect the movement of first user 710. For example, second electronic device 704 displays second portion 720*c* to appear as a shadow of first representation 718 within third participant region 706*a*.

As set forth below, in some embodiments, second electronic device 704 displays second portion 720*c* as extending beyond second position 709*b* based on lighting (e.g., virtual lighting and/or a representation of actual lighting in first physical environment 708 and/or second physical environment 712) that is included and/or displayed in extended reality environment 715. For instance, returning to FIG. 7A, the lighting of extended reality environment 715 is emitted from a source that is at a position located above first representation 718 with respect to ground 722. As such, visual indication 720 includes an oval shape beneath first representation 718 when first representation 718 is displayed at first position 709*a*. When second electronic device 704 displays first representation 718 at second position 709*b*, second electronic device 704 displays visual indication 720 as having second portion 720*c* to reflect that first representation 718 is now displayed at second position 709*b*, which is no longer underneath the light source of extended reality environment 715 (e.g., the light source emits light that is blocked by at least a portion of first representation 718, thereby causing second portion 720*c* of visual indication 720 to extend beyond second position 709*b*).

At FIG. 7B, second portion 720*c* includes a shape and/or appearance that imitates a state of first representation 718. For example, second portion 720*c* includes a generally linear projection 720*c* extending from first portion 720*b*, which reflects that first hand 718*a* (e.g., a representation of first hand 710*a*) and second hand 718*b* (e.g., a representation of second hand 710*b*) are positioned adjacent to waist 718*c* (e.g., a representation of waist 710*c*) of first representation 718. In response to receiving information indicative of movement of body parts of first user 710, second electronic device 704 is configured to display visual indication 720 and/or portions 720*b* and 720*c* of visual indication 720 to include an appearance (e.g., a shape) that is determined based on the information.

Figure 7C:
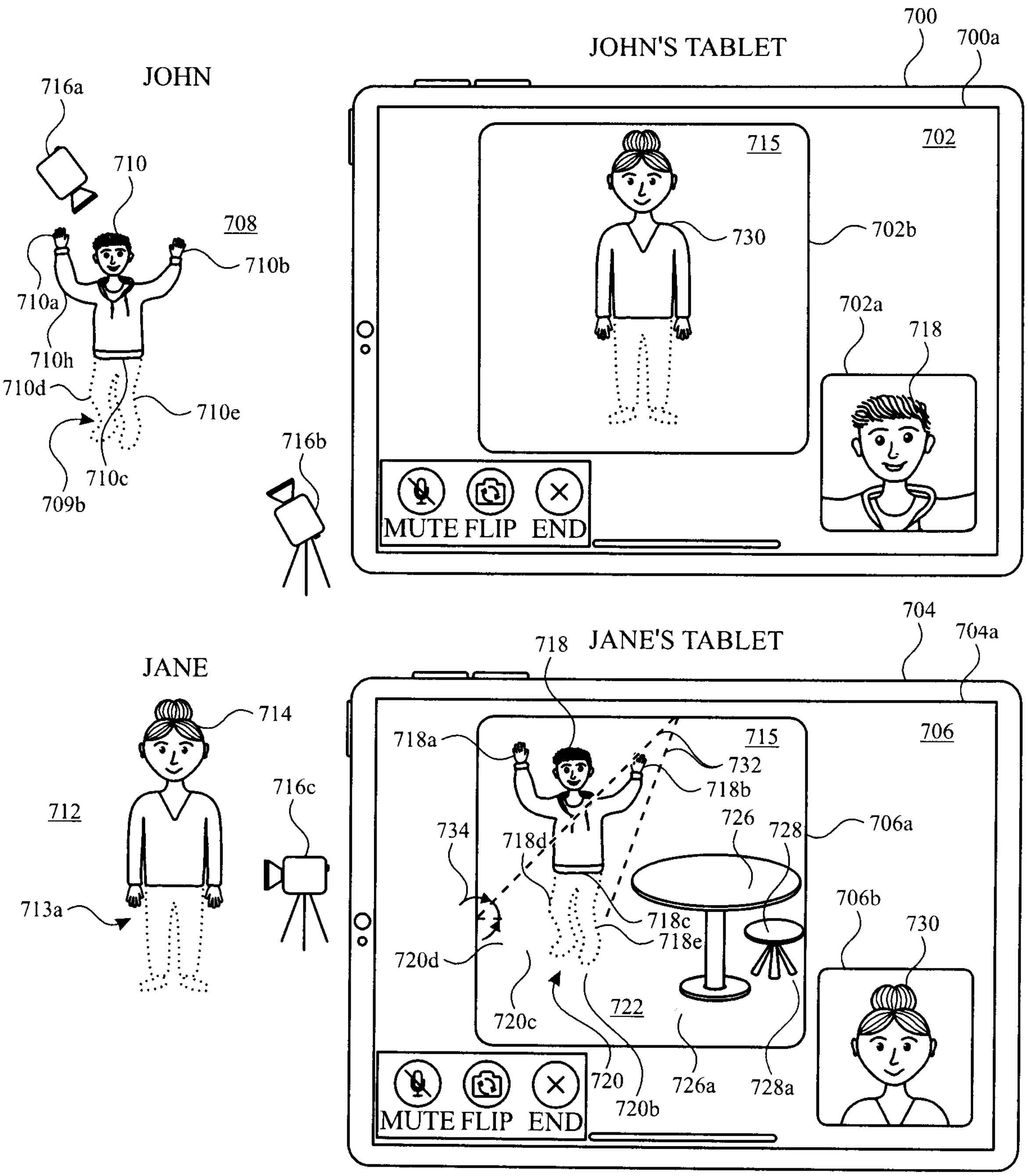

At FIG. 7C, second electronic device 704 receives information indicative of a change in position of one or more body parts of first user 710 within first physical environment 708. For example, at FIG. 7C, first user has moved first hand 710*a* and second hand 710*b* to be positioned away from and above waist 710*c* of first user 710 (e.g., with respect to a ground of first physical environment 708). In addition, first user 710 has bent first leg 710*d* and second leg 710*e* to slightly crouch down (e.g., as compared to the position and/or posture of first user 710 shown in FIG. 7B). Second electronic device 704 receives information indicative of movement of first hand 710*a*, second hand 710*b*, first leg 710*d*, and second leg 710*e* and displays first representation 718 having the appearance shown in FIG. 7C. At FIG. 7C, first representation 718 includes first hand 718*a* and second hand 718*b* positioned away from and above waist 718*c*. In addition, first representation 718 includes first leg 718*d* and second leg 718*e* as being bent and in a slightly crouching position. In some embodiments, second electronic device 704 does not display first leg 718*d* and/or second leg 718*e* of first representation 718, but instead, displays visual indication 720 and/or second visual indication 724 to indicate first leg 718*d* and/or second leg 718*e*. In addition, a position, orientation, and/or posture of first leg 718*d* and/or second leg 718*e* can be inferred based on a position, orientation, and/or posture of the remainder of first representation 718. Accordingly, second electronic device 704 is configured to display first representation 718 to imitate movement of portions of the body of first user 710 even when first user 710 remains substantially stationary with respect to a ground of first physical environment 708 (e.g., first user 710 remains located at position 709*b*).

At FIG. 7C, second electronic device 704 also displays visual indication 720 to include an updated appearance based on the information indicative of movement of first hand 710*a*, second hand 710*b*, first leg 710*d*, and second leg 710*e* of first user 710. As shown at FIG. 7C, visual indication 720 includes third portion 720*d* to represent the change in position of first hand 710*a*, which has moved away from and above waist 710*c*. Third portion 720*d* includes an appearance and shape that reflect a shape and appearance of first hand 710*a* (and arm 710*h*). In addition, second electronic device 704 enlarges second portion 720*c* of visual representation 720 to indicate and/or infer that first leg 710*d* and second leg 710*e* are bent (e.g., when compared to second portion 720*b* shown in FIG. 7B when first leg 710*d* and second leg 710*e* are substantially straight).

At FIG. 7C, second electronic device 704 also displays table 726 (e.g., a first object) and chair 728 (e.g., a second object) in extended reality environment 715. In some embodiments, second electronic device 704 displays table 726 and chair 728 in response to receiving information indicating that first user 710 has approached (e.g., moved toward) physical objects within first physical environment 708. In some embodiments, second electronic device 704 displays table 726 and chair 728 in response to one or more user inputs requesting that second electronic device 704 display one or more objects (e.g., virtual objects that are not based on physical objects in first physical environment 708) in extended reality environment 715. In some embodiments, table 726 and/or chair 728 are representations (e.g., representations that are based on actual image and/or video data) of physical objects in first physical environment 708. In some embodiments, table 726 and/or chair 728 are virtual representations (e.g., virtual representations that are not based on actual image and/or video data) of physical objects in first physical environment 708. In some embodiments, table 726 and/or chair 728 are virtual objects that are not based on physical objects in first physical environment 708, but instead only part of extended reality environment 715.

At FIG. 7C, second electronic device 704 displays table 726 including visual indication 726*a* (e.g., a shadow) and chair 728 including visual indication 728*a* (e.g., a shadow). In some embodiments, second electronic device 704 does not display visual indication 726*a* and/or visual indication 728*a*.

As set forth above, second electronic device 704 determines a shape and/or an appearance of visual indication 720 based on lighting of extended reality environment 715, which can include a representation of physical lighting (e.g., a representation of light emitted from an actual light source located in first physical environment 708 and/or second physical environment 712) and/or virtual lighting (e.g., light that is not representative of light emitted from an actual light source located in first physical environment 708 and/or second physical environment 712). At FIG. 7C, extended reality environment 715 includes an indication of light 732, which is directed from a light source at angle 734 with respect to ground 722 of extended reality environment 715. Second electronic device 704 determines a shape and/or an appearance of visual indication 720, visual indication 726*a*, and/or visual indication 728*a* based on light 732 and/or angle 734 of light 732. Thus, second electronic device 704 displays visual indication 720, visual indication 726*a*, and/or visual indication 728*a* to appear as shadows of first representation 718, table 726, and chair 728, respectively, that are caused by and/or would be caused by light 732.

Figure 7D:
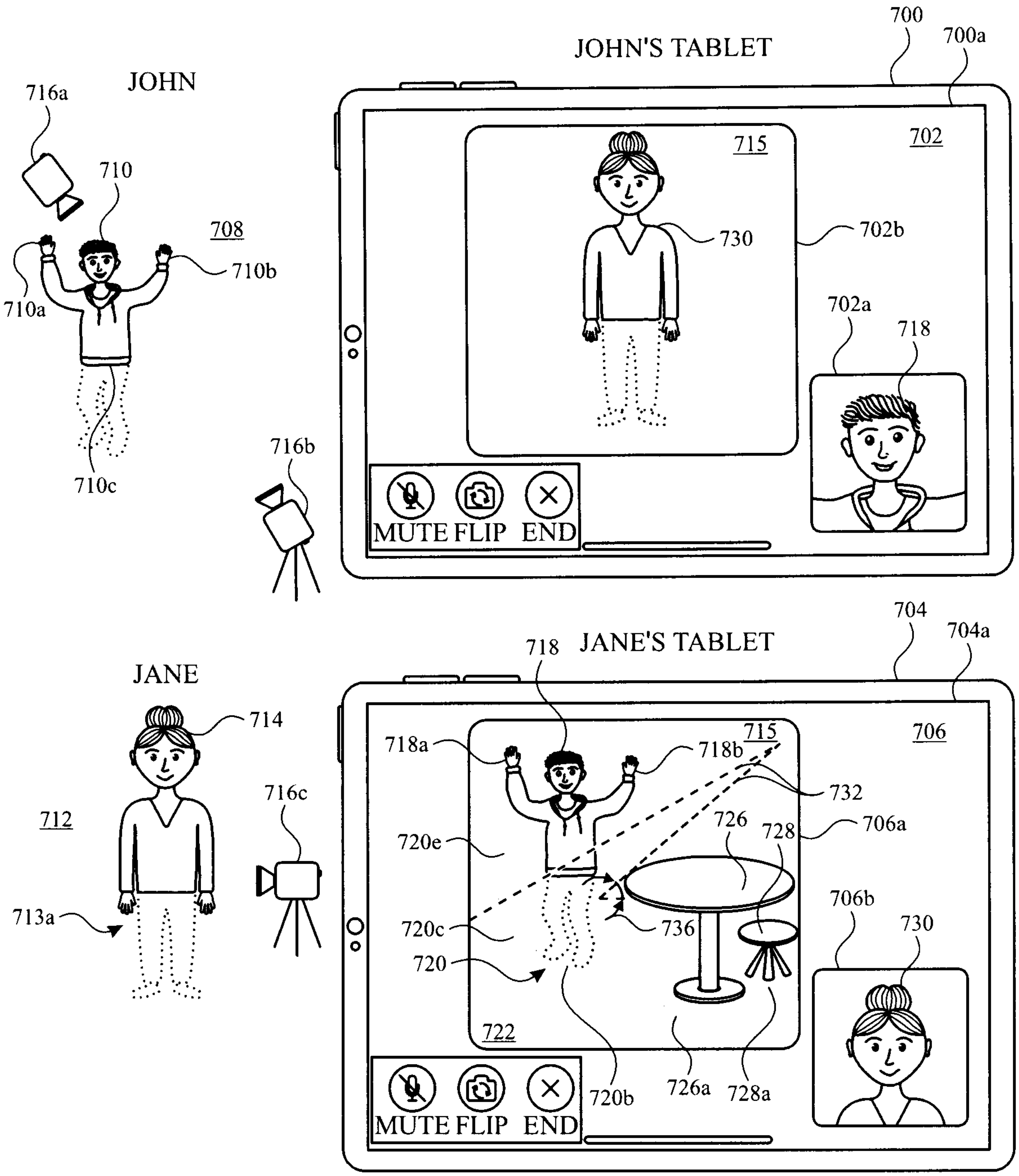

At FIG. 7D, second electronic device 704 determines an angle at which light 732 is emitted from the light source in extended reality environment 715 has changed. As shown in FIG. 7D, light 732 is emitted at angle 736 with respect to ground 722 of extended reality environment 715, and angle 736 is different from angle 734. In some embodiments, second electronic device 704 determines that the angle has changed based on information received from first electronic device 700 indicative of light emitted by a physical light source within first physical environment 708. In some embodiments, second electronic device 704 determines that the angle has changed based on the passage of time (e.g., second electronic device 704 displays light 732 as virtual light, which changes over time during the real-time communication session).

At FIG. 7D, second electronic device 704 adjusts an appearance of visual indication 720 based on the determination that the angle at which light 732 is emitted has changed (e.g., changed from angle 734 to angle 736). For instance, visual indication 720 includes a longer second portion 720*c* extending from first portion 720*b* based on a determination that angle 736 is less than angle 734 (e.g., with respect to ground 722 of extended reality environment 715). In addition, second electronic device 704 does not display third portion 720*d* of visual indication 720 because third portion 720*d* extends beyond a boundary (e.g., edge and/or frame) of third participant region 706*a*. Second electronic device 704 also displays fourth portion 720*e* of visual indication 720 representative of second hand 718*b* of first representation 718 (and/or second hand 710*b* of first user 710). At FIG. 7C, second electronic device 704 does not display fourth portion 720*e* of visual indication 720 because fourth portion 720*e* is positioned behind first representation 718 and therefore is not visible within extended reality environment 715 (e.g., from a perspective of second user 714 viewing second electronic device 704). At FIG. 7D, second electronic device 704 displays fourth portion 720*e* of visual indication 720 based at least partially on the determination of angle 736. Accordingly, second electronic device 704 is configured to adjust an appearance, shape, and/or position of visual indication 720 based on light 732 that is included and/or displayed in extended reality environment 715.

At FIG. 7D, second electronic device 704 also adjusts an appearance of visual indication 726*a* of table 726 and visual indication 728*a* of chair 728 based on angle 736 of light 732. Visual indication 726*a* extends further to the left of table 726 (e.g., with respect to ground 722 of extended reality environment 715) and visual indication 728*a* extends further to the left of chair 728 (e.g., with respect to ground 722 of extended reality environment 715). Thus, in some embodiments, second electronic device 704 also adjusts an appearance of visual indication 726*a* and visual indication 728*a* based on light 732 that is included and/or displayed in extended reality environment 715.

Figure 7E:
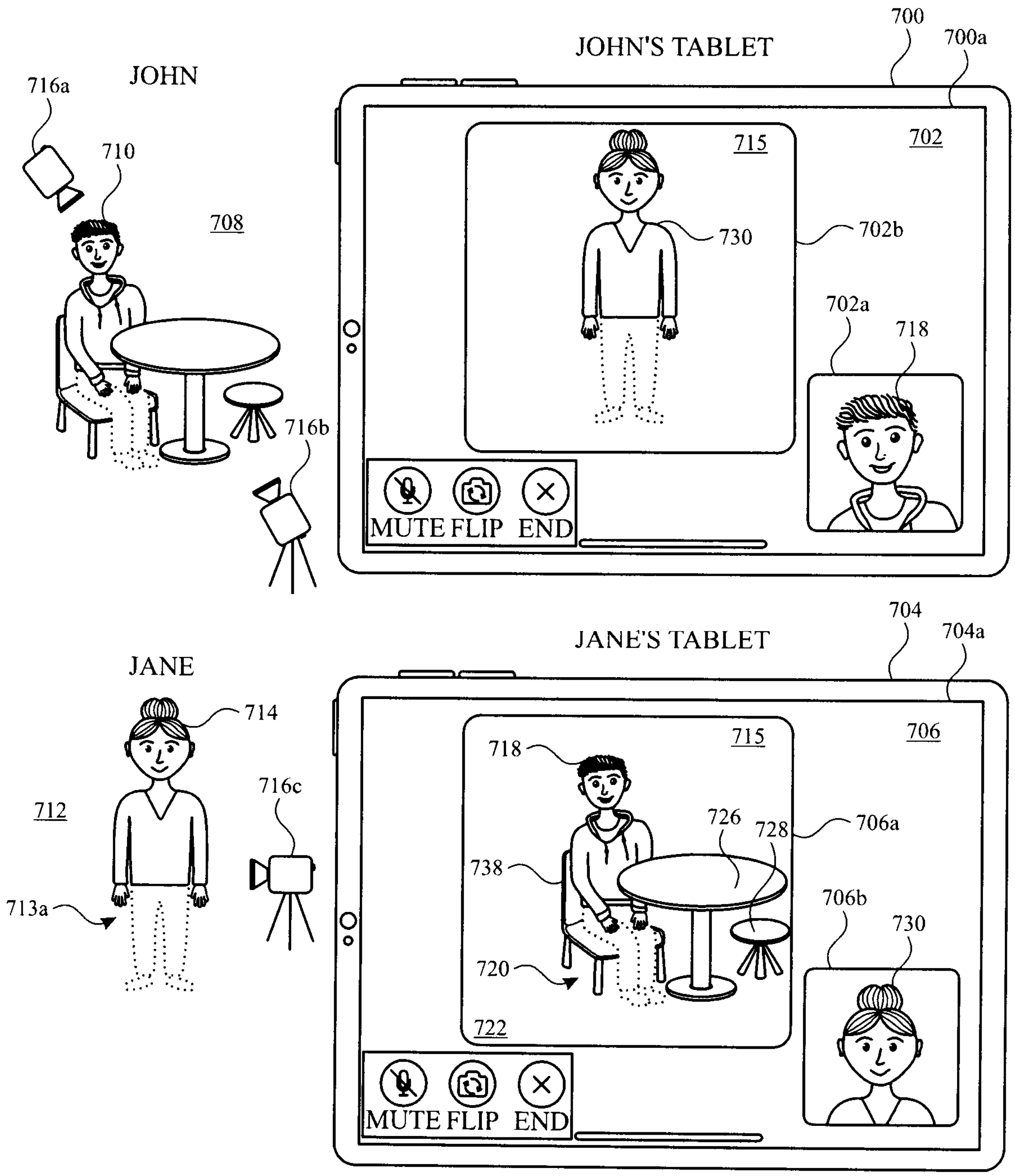

Second electronic device 704 is also configured to adjust an appearance of visual indication 720 and/or display additional visual indications in response to receiving an indication that first user 710 interacts with one or more objects in first physical environment 708. For instance, at FIG. 7E, second electronic device 704 receives an indication that first user 710 is in a sitting position (e.g., receives information from first electronic device 700 that is based on data captured via sensors 716*a* and/or 716*b*). In response to receiving the indication that first user 710 is in the sitting position, second electronic device 704 adjusts an appearance of visual indication 720 to include chair 738, as shown at FIG. 7E. At FIG. 7E, visual indication 720 includes chair 738 and does not include shadow 720*a* displayed in FIGS. 7A-7D. In some embodiments, visual indication 720 includes both chair 738 and shadow 720*a*.

In some embodiments, chair 738 includes a representation (e.g., a representation that is based on actual image and/or video data) of a physical chair and/or other object supporting first user 710 in the sitting position in first physical environment 708. In some embodiments, chair 738 includes a virtual representation (e.g., a virtual representation that is not based on actual image and/or video data) of a physical chair and/or other object supporting first user 710 in the sitting position in first physical environment 708. In some embodiments, chair 738 is a virtual object that is not based on a physical chair and/or other object supporting first user 710 in the sitting position in first physical environment 708, but instead part of extended reality environment 715 and not part of physical environment 708. In some embodiments, chair 738 is a parametric chair that second electronic device 704 displays as a two-dimensional virtual object having a chair-like appearance, where the parametric chair is not based on a physical chair and/or other object in first physical environment 708.

Figure 7F:
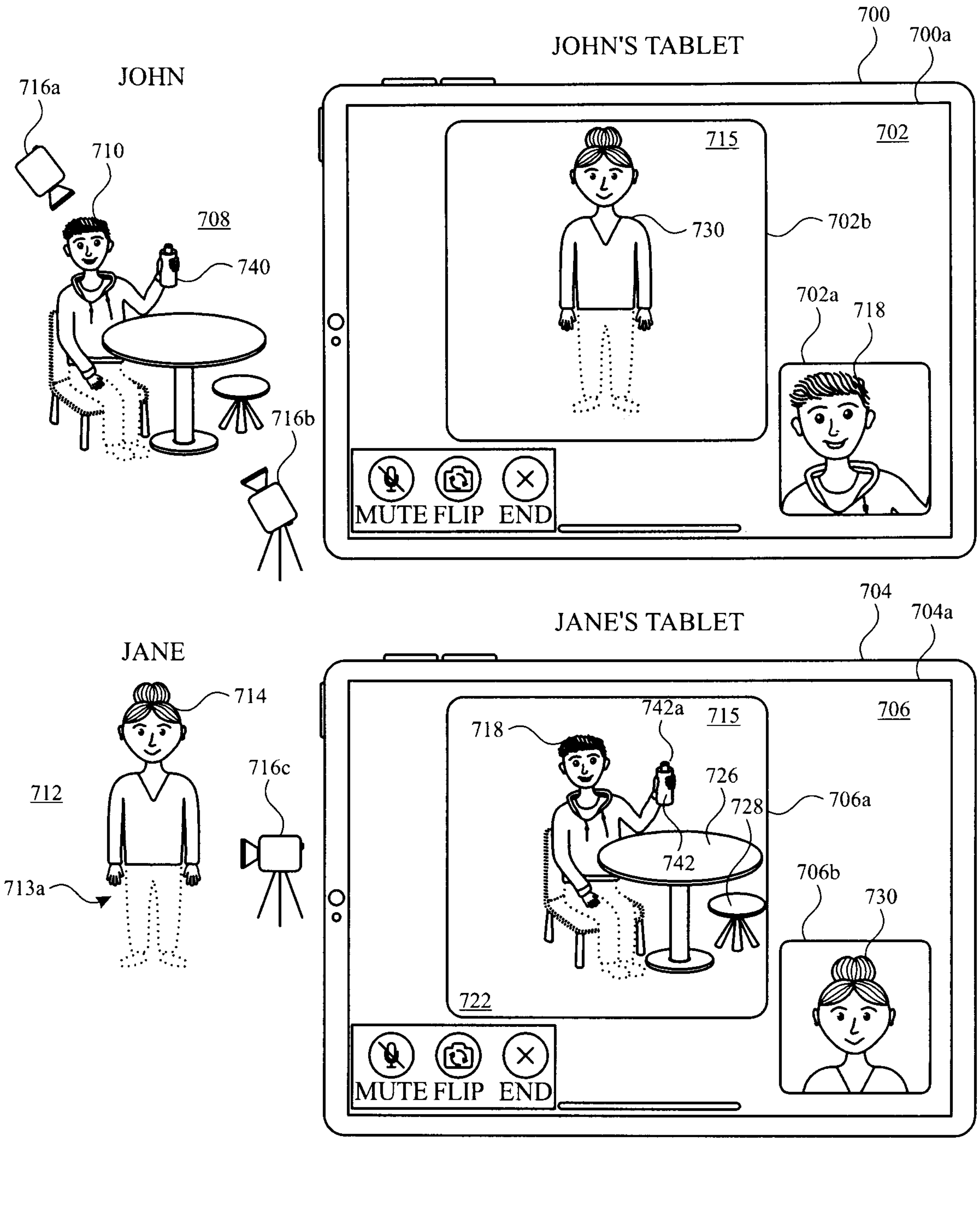

At FIG. 7F, second electronic device 704 receives an indication that first user 710 has contacted (e.g., touched and/or picked up in second hand 710*b*) water bottle 740 (e.g., a physical water bottle) that is located in first physical environment 708 (e.g., receives information from first electronic device 700 that is based on data captured via sensors 716*a* and/or 716*b*). In response to receiving the indication that first user 710 has contacted (e.g., a body part of first user 710 is within a predetermined distance of) water bottle 740, second electronic device 704 displays water bottle representation 742 corresponding to water bottle 740 in extended reality environment 715. In some embodiments, water bottle representation 742 is based on actual image and/or video data of water bottle 740 in first physical environment 708. In some embodiments, water bottle representation 742 is not based on actual image and/or video data of water bottle 740 in first physical environment 708. In some embodiments, water bottle representation 742 is a virtual object that is not representative of water bottle 740 (e.g., water bottle representation 742 includes a cup instead of a water bottle).

In addition, second electronic device 704 displays visual indication 742*a* in extended reality environment 715 in response to receiving the indication that first user 710 has contacted water bottle 740. At FIG. 7F, visual indication 742*a* includes highlighting and/or shadowing surrounding a perimeter of water bottle representation 742 indicating to second user 714 (e.g., the user viewing second electronic device 704) that first user 710 is contacting an object in first physical environment 708.

Figure 7G:
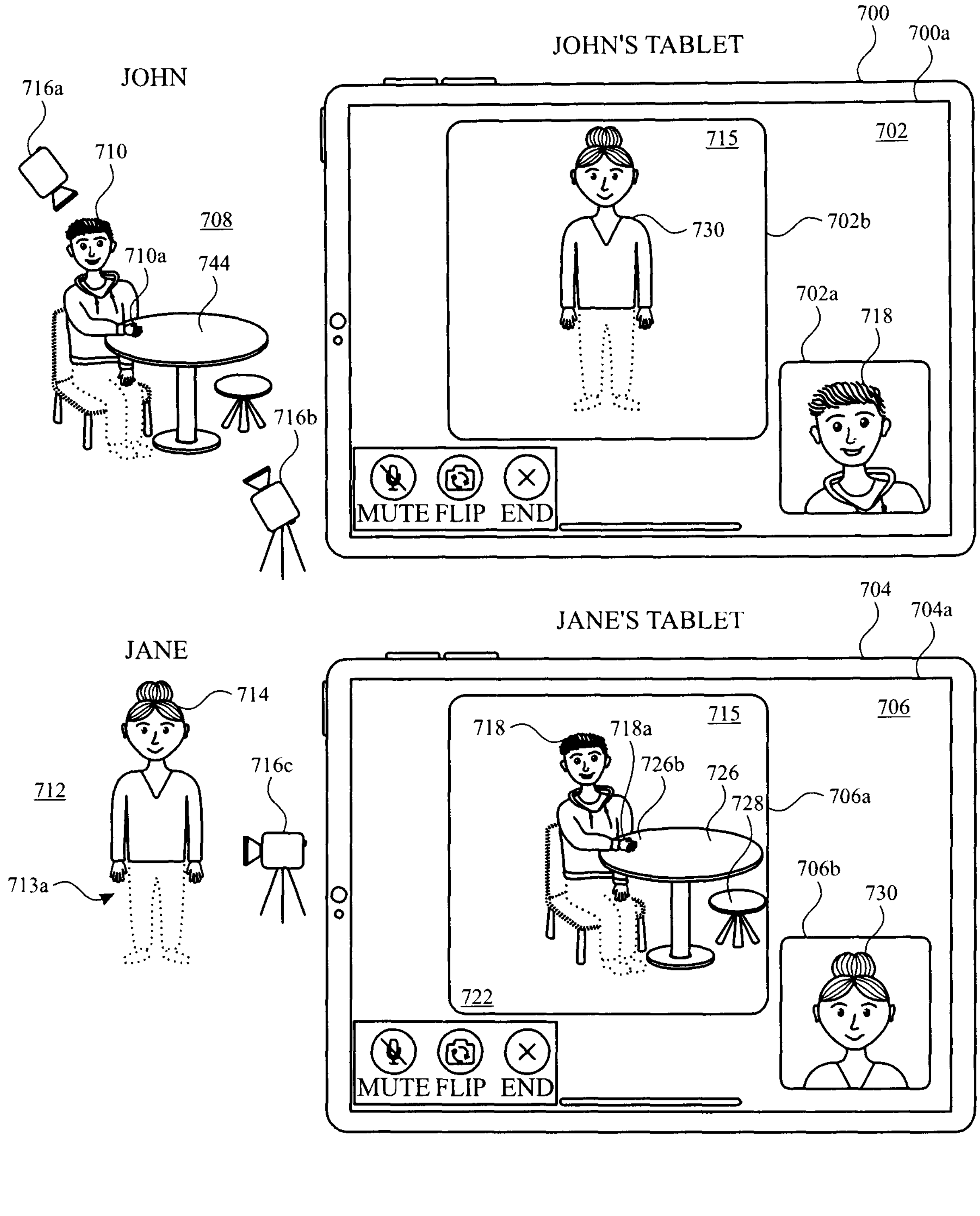

At FIG. 7G, second electronic device 704 receives an indication that first user 710 has contacted (e.g., touched and/or placed first hand 710*a* on) table 744 (e.g., a physical table) that is located in first physical environment 708 (e.g., receives information from first electronic device 700 based on data captured via sensors 716*a* and/or 716*b*). In response to receiving the indication that first user 710 has contacted (e.g., a body part of first user 710 is within a predetermined distance of) table 744, second electronic device 704 displays table 726 corresponding to table 744 in extended reality environment 715. In some embodiments, table 726 is based on actual image and/or video data of table 744 in first physical environment 708. In some embodiments, table 726 is not based on actual image and/or video data of table 744 in first physical environment 708. In some embodiments, table 726 is a virtual object that is not representative of table 744 (e.g., table 726 includes a square surface instead of a round surface).

In addition, second electronic device 704 displays visual indication 726*b* in extended reality environment 715 in response to receiving the indication that first user 710 has contacted table 744. At FIG. 7F, visual indication 726*b* includes highlighting and/or shadowing surrounding a portion of a surface of table 726 in which first representation 718 is contacting (e.g., first hand 718*a* is contacting), such that second electronic device 704 displays a visual indication to second user 714 (e.g., the user viewing second electronic device 704) that first user 710 is contacting an object in first physical environment 708.

Figure 7H:
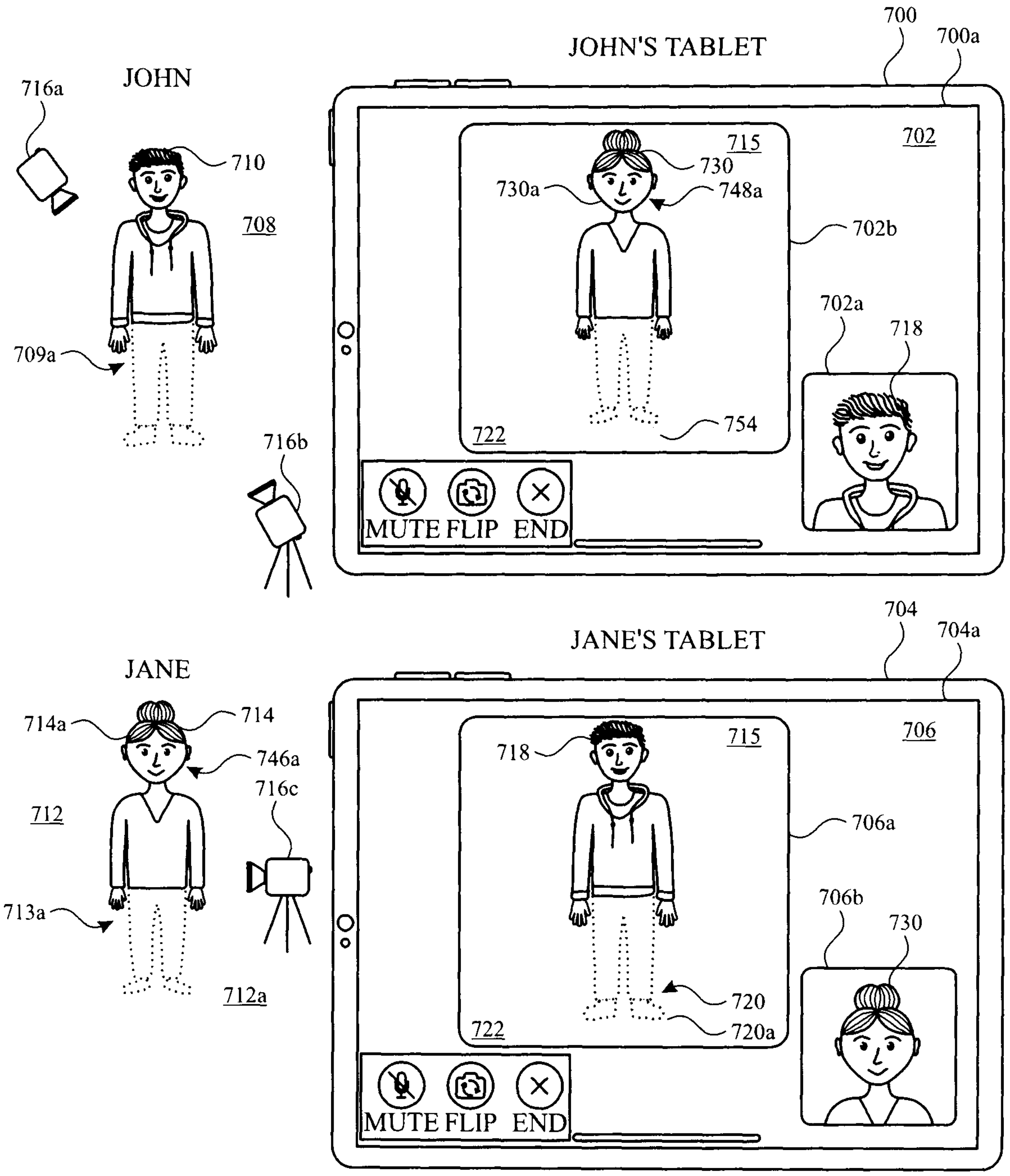

At FIG. 7H, first user 710 has returned to first position 709*a* within first physical environment 708 and second electronic device 704 displays first representation 718 and visual indication 720 based on information indicative of the current state of first user 710, as discussed above. First electronic device 700 is also configured to adjust an appearance of second representation 730 of second user 714 within extended reality environment 715 displayed on second participant region 702*b* of first electronic device 700. At FIG.

7H, first user 714 is at position 713*a* and is in a standing position, such that head 714*a* of first user 714 is at a first position 746*a* with respect to ground 712*a* of second physical environment 712. In response to receiving information corresponding to a state of second user 714, first electronic device 700 displays head 730*a* of second representation 730 at first position 748*a* with respect to ground 722 of extended reality environment 715 to reflect that second user 714 is in the standing position in second physical environment 712. At FIG. 7H, first electronic device 700 displays second representation 730 of second user 714 having visual indication 754 (e.g., a shadow). In response to receiving an information indicating that a state of second user 714 has changed within second physical environment 712, first electronic device 700 adjust an appearance of second representation 730 and/or visual indication 754 displayed in extended reality environment 715.

Figure 7I:
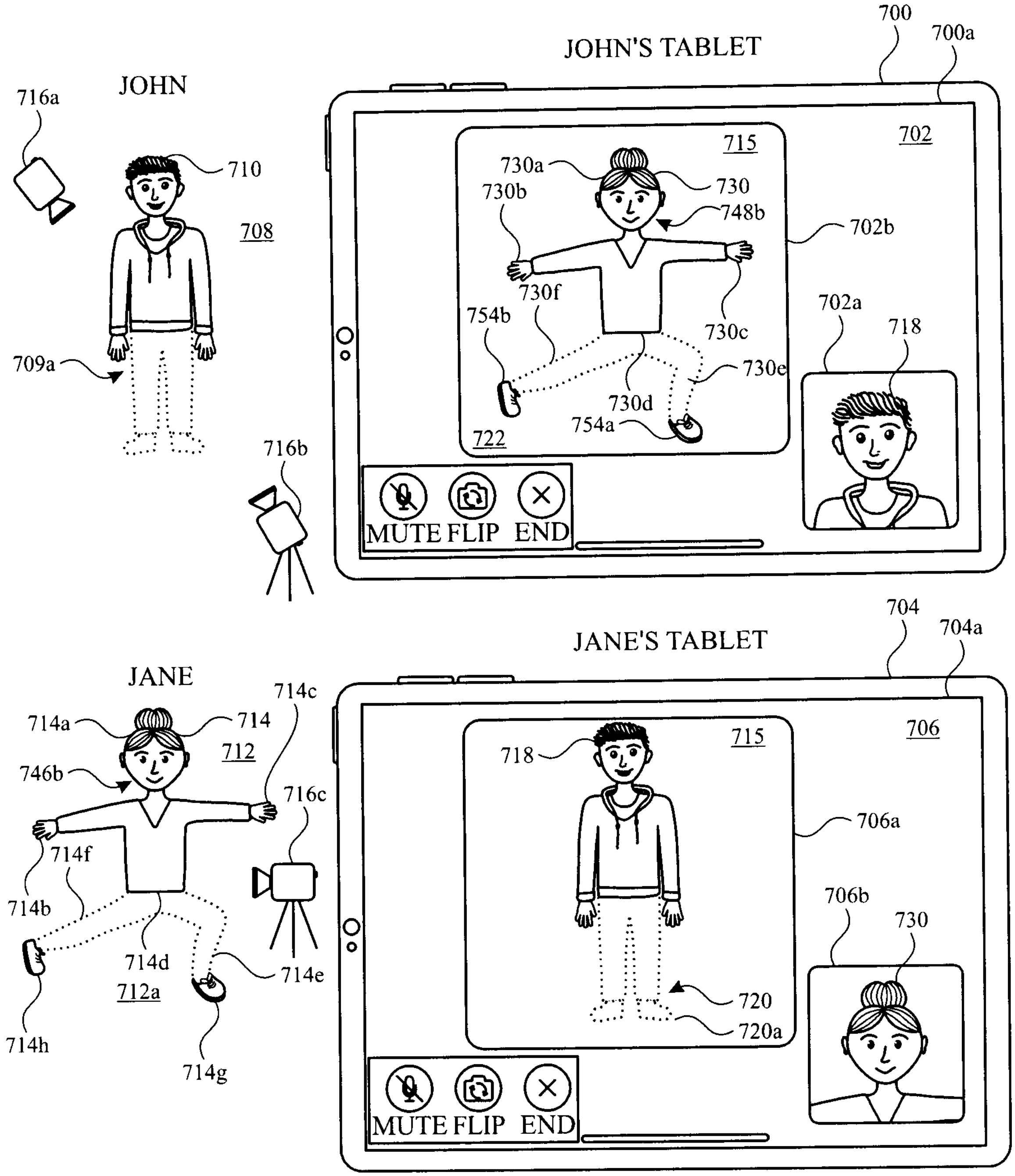

At FIG. 7I, first electronic device 700 receives an information indicating that second user 714 has moved from the standing position to a lunging position. For instance, first user 714 is in the lunging position and is crouched down and/or closer to ground 712*a* of second physical environment 712 as compared to the standing position. As such, head 714*a* of first user 714 is at second position 746*b* with respect to ground 712*a* of second physical environment 712. In addition, first hand 714*b* and second hand 714*c* of second user 714 are lifted and spread apart from waist 714*d* of second user 714. First leg 714*e* of second user 714 is also bent and second leg 714*f* of second user 714 is extended away from waist 714*d* to form the lunging pose.

In response to receiving the information indicating that second user 714 has moved from the standing position to the lunging position, first electronic device 700 adjusts an appearance of second representation 730 in extended reality environment 715. At FIG. 7I, second representation 730 includes head 730*a* at second position 748*b* with respect to ground 722 of extended reality environment 715, where second position 748*b* is lower than first position 748*a* with respect to ground 722 to reflect that second user 714 is in the lunging position. In addition, first hand 730*b* and second hand 730*c* are lifted and spread apart from waist 730*d* of second representation 730. In some embodiments, first electronic device 700 receives information that is based on direct data corresponding to a state of head 714*a*, first arm 714*b*, second arm 714*c*, and/or waist 714*d* of second user 714. Accordingly, first electronic device 700 displays second representation 730 with head 730*a*, first hand 730*b*, second hand 730*c*, and waist 730*d* in positions within extended reality environment 715 that imitate the positions of head 714*a*, first hand 714*b*, second hand 714*c*, and waist 714*d* of second user 714 within second physical environment 712.

In addition, first electronic device 700 adjusts an appearance of visual indication 754 to include first foot representation 754*a* and second foot representation 754*b*, as shown at FIG. 7I. In some embodiments, first electronic device 700 receives information that is based on indirect data corresponding to a state of first leg 714*e* (e.g., including first foot 714*g*) and second leg 714*f* (e.g., including second foot 714*h*) of second user 714. In some embodiments, when first electronic device 700 receives information that is based on indirect data corresponding to the state of first leg 714*e* and second leg 714*f*, first electronic device 700 is configured to estimate positions of first foot representation 754*a* and second foot representation 754*b* within extended reality environment 715 based at least partially on the information. In some embodiments, second electronic device 704 receives the indirect data corresponding to the state of first leg 714*e* and second leg 714*f* (e.g., via sensor 716*c*), estimates positions of first foot representation 754*a* and second foot representation 754*b* within extended reality environment 715, and directs (e.g., transmits) information based on the indirect data to first electronic device 700 (e.g., the information includes the estimated positions of first foot representation 754*a* and second foot representation 754*b*). At FIG. 7I, first electronic device 700 displays first foot representation 754*a* and second foot representation 754*b* at respective positions in extended reality environment 715 that are not identical to actual positions of first foot 714*g* and second foot 714*h* of second user 714 within second physical environment 712. However, the estimated positions of first foot representation 754*a* and second foot representation 754*b* are configured to provide first user 710 (e.g., the user viewing and/or using first electronic device 700) with an indication of the movement of second user 714 between the standing position and the lunging position.

Additional descriptions regarding FIGS. 7A-7I are provided below in reference to method 800 described with respect to FIGS. 7A-7I.

FIG. 8 is a flow diagram of an exemplary method 800 for displaying a visual indication of a portion of a user, in accordance with some embodiments. In some embodiments, method 800 is performed at a computer system (e.g., 101, 700, 704, and/or 944) including a display generation component (e.g., 120, 700*a*, 704*a*, and/or 944*a*) (e.g., visual output device, a 3D display, a display having at least a portion that is transparent or translucent on which images can be projected (e.g., a see-through display), a projector, a heads-up display, and/or a display controller) and an external computer system that is associated with a first user (e.g., 101, 700, 704, and/or 944) (e.g., that is being operated by the first user (e.g., a user that is in a communication session (e.g., an extended reality and/or video conference) with the user of the computer system)). In some embodiments, the method 800 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 800 are, optionally, combined and/or the order of some operations is, optionally, changed.

As described below, method 800 provides an intuitive way for displaying a visual indication of a portion of a user. The method reduces the cognitive burden on a user for participating in a real-time communication session, thereby creating a more efficient human-machine interface. For battery-operated computing devices, enabling a user communicate with another participant of the real-time communication session faster and more efficiently conserves power and increases the time between battery charges.

In response to receiving a request to display a representation (e.g., 718 and/or 730) (e.g., an avatar and/or a virtual representation of at least a portion of the first user) of the first user (e.g., 710 and/or 714) (e.g., a user of the external computer system) in an extended reality environment (802) (e.g., 715) (e.g., a wholly or partially simulated environment that people sense and/or interact with via an electronic system, where a subset of a person's physical motions, or representations thereof, are tracked, and, in response, one or more characteristics of one or more virtual objects simulated in the extend reality environment are adjusted in a manner that comports with at least one law of physics) (in some embodiments, the virtual avatar is displayed, in an extended reality environment, in lieu of the first user), the computer system (e.g., 101, 700, 704, and/or 944) displays (804) in the extended reality environment (e.g., 715), via the display generation component (e.g., 120, 700*a*, 704*a*, and/or 944*a*), the representation (e.g., 718 and/or 730) (e.g., an avatar; a virtual avatar (e.g., the avatar is a virtual representation of at least a portion of the first user)) of the first user (e.g., 710 and/or 714) (e.g., a user in a physical environment).

The representation of the first user includes (in some embodiments, the virtual avatar is displayed, in an extended reality environment, in lieu of the first user) a visual indication (806) (e.g., 720, 726*b*, 738, 742*a*, 754, 754*a*, and/or 754*b*) (e.g., a visual indication of at least one body part of the first user that is not an anatomically accurate representation of the at least one body part of the first user) of a portion (e.g., 711*b*) of the body of the first user (e.g., 710 and/or 714) (e.g., body parts of the first user that are below a waistline and/or other portion of the body of the first user and/or body parts of the first user that are not directly tracked and/or detected by the external computer system and/or the computer system) in the extended reality environment (e.g., 715).

The visual indication (808) (e.g., 720, 726*b*, 738, 742*a*, 754, 754*a*, and/or 754*b*) of the portion (e.g., 711*b*) of the body of the first user (e.g., 710 and/or 714) has an appearance that is determined based at least in part on (e.g., displayed on, overlaid on, occluded by, moving with respect to, and/or changing size and/or appearance with respect to) one or more objects (e.g., 722, 726, and/or 728) (e.g., virtual objects or representations of physical objects) (e.g., visual representations of surfaces, objects, avatars and/or representations of entities, and/or furniture) in the extended reality environment (e.g., 715) (e.g., the visual indication of the portion of the body moves, changes shape, changes position, changes size, changes in color, changes in brightness, changes in an amount of blur, and/or changes in orientation with respect to at least one visual element (e.g., a floor, a surface, a wall, a ceiling, and/or an object) included and/or displayed within the extended reality environment based on movement of the first user, movement of the computer system and/or the display generation component, and/or changes in the extended reality environment).

The visual indication (810) (e.g., 720, 726*b*, 738, 742*a*, 754, 754*a*, and/or 754*b*) of the portion (e.g., 711*b*) of the body of the first user (e.g., 710 and/or 714) represents an estimated state (e.g., position, orientation, and/or pose) of the portion (e.g., 711*b*) of the body that is estimated based on indirect information about a state of the portion (e.g., 711*b*) of the body when direct information about the state of the portion (e.g., 711*b*) of the body is not available to the computer system (e.g., 101, 700, 704, and/or 944) (e.g., a position with respect to a second portion of the body of the first user, a position with respect to the extended reality environment, and/or a position with respect to a physical environment surrounding the first user). In some embodiments, the visual indication (e.g., 720, 726*b*, 738, 742*a*, 754, 754*a*, and/or 754*b*) of the portion (e.g., 711*b*) of the body of the first user (e.g., 710 and/or 714) includes an obscured representation of the portion (e.g., 711*b*) of the body of the first user (e.g., 710 and/or 714), where the obscured representation is not an anatomically accurate depiction of the portion (e.g., 711*b*) of the body of the first user (e.g., 710 and/or 714). In some embodiments, the visual indication (e.g., 720, 726*b*, 738, 742*a*, 754, 754*a*, and/or 754*b*) of the portion (e.g., 711*b*) of the body of the user (e.g., 710 and/or 714) is a shadow (e.g., 720*a*) and/or a blurred visual element that is displayed in the extended reality environment (e.g., 715) and that represents the portion (e.g., 711*b*) of the body of the first user (e.g., 710 and/or 714). In some embodiments, the portion (e.g., 711*b*) of the body of the first user includes at least a lower portion (e.g., 711*b*) of the body of the first user, such as body parts below a waistline (e.g., 710*c*) of the first user (e.g., 710 and/or 714) (e.g., legs, knees, ankles, feet, and/or hips). In some embodiments, the portion (e.g., 711*b*) of the body of the first user (e.g., 710 and/or 714) includes body parts of the first user that are below a predetermined distance from a surface (e.g., 722) (e.g., a floor) of the extended reality environment (e.g., 715).

In some embodiments, the representation (e.g., 718 and/or 730) of the first user also includes a visual representation (e.g., a virtual representation of at least one body part of the first user, such as a head, face, shoulders, hands, arms, and/or torso) of a second portion (e.g., 711*a*) of the body of the first user (e.g., 710 and/or 714), where the visual representation of the second portion of the body of the first user is generated based on data indicative of a position of the second portion (e.g., 711*a*) of the body of the first user (e.g., 710 and/or 714) (e.g., with respect to the external computer system and/or with respect to the computer system). In some embodiments, the external computer system (e.g., 700 and/or 704) includes one or more sensors (e.g., 716*a*-716*c*) configured to detect and/or track one or more body parts of the first user (e.g., 710 and/or 714). The external computer system (e.g., 700 and/or 704) generates and/or collects the data indicative of the position of the second portion (e.g., 711*a*) of the body of the first user (e.g., 710 and/or 714) and transmits (e.g., directly and/or indirectly via another external computer system, such as a server) the data to the computer system (e.g., 101, 700, 704, and/or 944), such that the computer system (e.g., 101, 700, 704, and/or 944) generates the visual representation of the second portion (e.g., 711*a*) of the body of the first user (e.g., 710 and/or 714) based on the data. In some embodiments, the visual representation of the second portion (e.g., 711*a*) of the body of the first user (e.g., 710 and/or 714) includes a virtual representation of physical features of the first user (e.g., 710 and/or 714), such as facial features, head features, upper body features, clothing, and/or sizes of various body parts of the first user (e.g., 710 and/or 714). In some embodiments, the visual representation of the second portion (e.g., 711*a*) of the body of the first user (e.g., 710 and/or 714) is configured to move as the first user (e.g., 710 and/or 714) moves one or more body parts included in the second portion (e.g., 711*a*) of the body (e.g., head, shoulders, arms, and/or hands). In some embodiments, the visual representation of the second portion (e.g., 711*a*) of the body of the first user (e.g., 710 and/or 714) is an anatomically accurate representation and/or depiction of body parts of the second portion (e.g., 711*a*) of the body of the first user (e.g., 710 and/or 714).

In some embodiments, while displaying the representation (e.g., 718 and/or 730) of the first user (e.g., 710 and/or 714) including the visual indication (e.g., 720, 726*b*, 738, 742*a*, 754, 754*a*, and/or 754*b*) of the portion (e.g., 711*b*) of the body of the first user (e.g., 710 and/or 714) and in accordance with a determination that a set of criteria is satisfied (e.g., the set of criteria includes detecting movement of the first user (e.g., one or more sensors of the external computer system and/or one or more sensors of the computer system detect movement of the portion of the body of the first user and/or a different portion of the body of the first user), detecting movement of the computer system and/or the display generation component causing a change of position of the first user on the display generation component (e.g., a second user of the computer system adjusts a position of the display generation component (e.g., moves and/or tilts the display generation component) causing a position of the first user to be adjusted with respect to the display generation component), and/or detecting a change in one or more characteristics of the extended reality environment (e.g., a change in lighting in a physical environment of the computer system and/or the external computer system, a change in lighting of a virtual environment, and/or the extended reality environment transitioning between an AR environment and a VR environment)), the computer system (e.g., 101, 700, 704 and/or 944) displays, via the display generation component, movement of the visual indication (e.g., 720, 726*b*, 738, 742*a*, 754, 754*a*, and/or 754*b*) of the portion (e.g., 711*b*) of the body of the first user (e.g., 710 and/or 714) in the extended reality environment (e.g., 715). In some embodiments, movement of the visual indication (e.g., 720, 726*b*, 738, 742*a*, 754, 754*a*, and/or 754*b*) of the portion (e.g., 711*b*) of the body of the first user (e.g., 710 and/or 714) in the extended reality environment (e.g., 715) includes a transition from displaying the visual indication (e.g., 720, 726*b*, 738, 742*a*, 754, 754*a*, and/or 754*b*) of the portion (e.g., 711*b*) of the body of the first user (e.g., 710 and/or 714) at a first position (e.g., 719*a*) in the extended reality environment (e.g., 715) (e.g., a first position with respect to one or more visual elements of the extended reality environment) to displaying the visual indication (e.g., 720, 726*b*, 738, 742*a*, 754, 754*a*, and/or 754*b*) of the portion (e.g., 711*b*) of the body of the first user (e.g., 710 and/or 714) at a second position (e.g., 719*b*) in the extended reality environment (e.g., 715) (e.g., a second position with respect to one or more visual elements of the extended reality environment).

Displaying the visual indication of the portion of the body of the first user that represents an estimated state of the portion of the body of the first user enables the computer system to provide a more complete state of the body of the first user even when direct information about the portion of the body is not available, which provides improved visual feedback.

In some embodiments, the representation (e.g., 718 and/or 730) of the first user (e.g., 710 and/or 714) further includes a second visual indication (e.g., 724) (e.g., a second visual indication that is distinct from the visual indication and/or the second visual indication applies a first visual effect (e.g., an amount of blur) to a first portion of the representation and the visual indication applies a second visual effect (e.g., a shadow) to a second portion of the representation) of a second portion (e.g., 710*d* and/or 710*e*) of the body of the first user (e.g., 710 and/or 714) (e.g., a second portion of the body that is the same as the portion of the body, a second portion of the body that is at least partially distinct from the portion of the body, and/or a second portion of the body that is fully distinct from the portion of the body), and the second visual indication (e.g., 724) of the second portion (e.g., 710*d* and/or 710*e*) of the body of the first user (e.g., 710 and/or 714) includes a blurred extension of the second portion (e.g., 710*d* and/or 710*e*) of the body of the first user (e.g., 710 and/or 714) (e.g., an amount of blur is applied to the representation so that the second portion of the body of the first user appears obscured as compared to a third portion of the body of the first user). In some embodiments, the computer system (e.g., 101, 700, 704, and/or 944) does not receive direct information about a state of the second portion (e.g., 710*d* and/or 710*e*) of the body of the first user (e.g., 710 and/or 714), such that the second visual indication (e.g., 724) includes an estimated state of the second portion (e.g., 710*d* and/or 710*e*) of the body of the first user (e.g., 710 and/or 714).

Displaying the second visual indication of the second portion of the body of the first user enables the computer system to provide a more complete state of the body of the first user, which provides improved visual feedback.

In some embodiments, the visual indication (e.g., 720, 726*b*, 738, 742*a*, 754, 754*a*, and/or 754*b*) of the portion (e.g., 711*b*) of the body of the first user (e.g., 710 and/or 714) includes a shadow (e.g., 720*a*) (e.g., a projection within the extended reality environment that visually indicates a state of at least the portion of the body of the first user).

Displaying the visual indication of the portion of the body of the first user as including a shadow enables the computer system to provide a more complete state of the body of the first user in a familiar manner, which provides improved visual feedback.

In some embodiments, the shadow (e.g., 720*a*) represents a portion of the representation (e.g., 718 and/or 730) of the first user (e.g., 710 and/or 714) that is displayed at a visual fidelity (e.g., precision and/or accuracy of information received by the computer system to generate the representation) below a visual fidelity threshold amount (e.g., the shadow represents a portion of the first user for which the computer system does not have sufficient data to generate an accurate representation of the portion of the first user with more than a threshold amount of precision and/or accuracy of data received by the computer system). In some embodiments a second portion of the representation (e.g., 718 and/or 730) of the first user (e.g., 710 and/or 714) that is displayed at a visual fidelity above the visual fidelity threshold amount is not represented by the shadow (e.g., 720*a*).

Displaying the shadow to represent a portion of the representation of the first user that is displayed at a visual fidelity below a visual fidelity threshold amount enables the computer system to provide a more complete state of the body of the first user despite the portion of the representation of the user being displayed with less clarity, which provides improved visual feedback.

In some embodiments, the shadow (e.g., 720*a*) represents a portion of the representation (e.g., 718 and/or 730) of the first user (e.g., 710 and/or 714) that is not currently displayed via the display generation component (e.g., 120, 700*a*, 704*a*, and/or 944*a*) of the computer system (e.g., 101, 700, 704, and/or 944) (e.g., a portion of the body of the first user that is not included and/or otherwise indicated by the representation). In some embodiments, the portion of the representation (e.g., 718 and/or 730) of the first user (e.g., 710 and/or 714) that is not currently displayed includes a leg (e.g., 710*d* and/or 710*e*) of the user (e.g., 710 and/or 714) and the shadow (e.g., 720*a*) is optionally displayed to approximate and/or estimate a shadow that would result if the leg (e.g., 710*d* and/or 710*e*) of the user were included and displayed in the extended reality environment (e.g., 715).

Displaying the shadow to represent a portion of the representation of the first user that is not currently displayed enables the computer system to provide a more complete state of the body of the first user despite the portion of the representation of the user not being displayed, which provides improved visual feedback.

In some embodiments, the computer system (e.g., 101, 700, 704, and/or 944) displays in the extended reality environment (e.g., 715), via the display generation component (e.g., 120, 700*a*, 704*a*, and/or 944*a*), the shadow (e.g., 720*a*) at a first position (e.g., a position of shadow 720*a* shown at FIG. 7A) with respect to the one or more objects (e.g., 722) in the extended reality environment (e.g., 715) (e.g., a first position causing the shadow to have a first shape when the shadow is displayed on and/or with respect to the one or more objects in the extended reality environment). In response to detecting movement of the first user (e.g., 710 and/or 714) (e.g., detecting movement via one or more sensors in communication with the computer system), the computer system (e.g., 101, 700, 704, and/or 944) displays in the extended reality environment (e.g., 715), via the display generation component (e.g., 120, 700*a*, 704*a*, and/or 944*a*), the shadow (e.g., 720*a*) at a second position (e.g., a position of shadow 720*a* shown at FIG. 7B), different from the first position, with respect to the one or more objects (e.g., 722) in the extended reality environment (e.g., 715) (e.g., a second position causing the shadow to have a second shape when the shadow is displayed on and/or with respect to the one or more objects in the extended reality environment). In some embodiments, displaying the shadow (e.g., 720*a*) at the second position includes displaying the shadow (e.g., 720*a*) having an appearance and/or location in the extended reality environment (e.g., 715) that are based on the movement of the user (e.g., 710 and/or 714) and/or a position of the user (e.g., 710 and/or 714) in a physical environment (e.g., 708 and/or 712) (e.g., a position of the user in the physical environment after the movement).

Displaying the shadow at the second position in response to detecting movement of the first user provides improved visual feedback about the state of the body of the first user when the first user moves in a physical environment, which provides improved visual feedback.

In some embodiments, the computer system (e.g., 101, 700, 704, and/or 944) displays in the extended reality environment (e.g., 715), via the display generation component (e.g., 120, 700*a*, 704*a*, and/or 944*a*), the shadow (e.g., 720*a*) having a first shape (e.g., a shape of shadow 720*a* shown at FIG. 7A) in the extended reality environment (e.g., 715) (e.g., the computer system determines the first shape based at least partially on information indicating a state of one or more body parts of the first user). In response to detecting a change in position of the first user (e.g., 710 and/or 714) (e.g., detecting a change in position of at least one body part of the first user via one or more sensors in communication with the computer system), the computer system displays in the extended reality environment (e.g., 715), via the display generation component (e.g., 120, 700*a*, 704*a*, and/or 944*a*), the shadow (e.g., 720*a*) having a second shape (e.g., a shape of shadow show at FIG. 7B), different from the first shape, in the extended reality environment (e.g., 715) (e.g., the computer system determines the second shape based at least partially on information indicating a state (e.g., change in position of the first user) of one or more body parts of the first user).

Displaying the shadow as having the second shape in response to detecting a change in position of the first user provides improved visual feedback about the state of the body of the first user when the first user changes positions in a physical environment, which provides improved visual feedback.

In some embodiments, the extended reality environment (e.g., 715) includes a representation of a ground (e.g., 722) of a physical environment (e.g., 708 and/or 712) of the first user (e.g., 710 and/or 714) (e.g., the computer system displays the extended reality environment with a representation of a physical ground and/or floor included within a physical environment in which the first user is located), and the shadow (e.g., 720*a*) is displayed on the ground (e.g., 722) of the physical environment (e.g., 708 and/or 712) (e.g., at least partially displayed on, such as overlaid on, the first ground).

Displaying the shadow on the ground of the physical environment provides improved visual feedback about the state of the body of the first user with respect to the physical environment, which provides improved visual feedback.

In some embodiments, the extended reality environment (e.g., 715) includes a representation of a ground (e.g., 722) of a virtual environment (e.g., the computer system displays the extended reality environment with a representation of a virtual ground that is not a representation and/or depiction of a physical ground in a physical environment in which the first user and/or another user is located), and the shadow (e.g., 720*a*) is displayed on the ground (e.g., 722) of the virtual environment (e.g., at least partially displayed on, such as overlaid on, the second ground).

Displaying the shadow on the ground of the virtual environment provides improved visual feedback about the state of the body of the first user with respect to the extended reality environment, which provides improved visual feedback.

In some embodiments, the extended reality environment (e.g., 715) includes a representation of lighting (e.g., 732) from a light source that is illuminating at least a portion of a physical environment (e.g., 708 and/or 712) that corresponds to the extended reality environment (e.g., 715) (e.g., the computer system displays the extended reality environment with a representation of actual lighting from an actual light source (e.g., a lamp, a light bulb, and/or the sun) that is within a physical environment in which the first user is located), and the shadow (e.g., 720*a*) has an appearance that is determined based at least in part on the lighting (e.g., 732) from the light source that is illuminating the portion of the physical environment (e.g., 708 and/or 712) (e.g., the computer system determines a shape, size, and/or other appearance of the shadow based at least partially on a direction and/or an angle at which light is emitted via the actual light source in the physical environment in which the first user is located).

Displaying the shadow as having an appearance that is determined based at least in part on the lighting from the light source that is illuminating the portion of the physical environment enables the computer system to provide a more complete state of the body of the first user in a familiar manner, which provides improved visual feedback.

In some embodiments, the extended reality environment (e.g., 715) includes a representation of virtual light (e.g., 732) that is illuminating at least a portion of the extended reality environment (e.g., 715) (e.g., the computer system displays the extended reality environment with a representation of virtual lighting from a virtual light source (e.g., a lamp, a light bulb, and/or the sun) that is not within a physical environment in which the first user and/or another user is located), and the shadow (e.g., 720*a*) has an appearance that is determined based at least in part on the representation of the virtual light (e.g., 732) that is illuminating the portion of the extended reality environment (e.g., 715) (e.g., the computer system determines a shape, size, and/or other appearance of the shadow based at least partially on a direction and/or an angle at which light is emitted via the virtual light source).

Displaying the shadow as having an appearance that is determined based at least in part on the representation of the virtual light that is illuminating the portion of the extended reality environment enables the computer system to provide a more complete state of the body of the first user in a familiar manner, which provides improved visual feedback.

In some embodiments, the representation (e.g., 718 and/or 730) of the first user (e.g., 710 and/or 714) includes a third visual indication (e.g., 754*a* and/or 754*b*) of a foot (e.g., 714*g* and/or 714*h*) of the body of the first user (e.g., 710 and/or 714) (e.g., a representation of a foot and/or a shoe that is not an anatomically accurate representation of a foot of the first user). While displaying the representation (e.g., 718 and/or 730) of the first user (e.g., 710 and/or 714) at a third position (e.g., 748*a*) in the extended reality environment (e.g., 715) (e.g., a third position that is determined based at least partially on information indicative of a state of the first user), the computer system (e.g., 101, 700, 704, and/or 944) displays in the extended reality environment (e.g., 715), via the display generation component (e.g., 120, 700*a*, 704*a*, and/or 944*a*), the third visual indication (e.g., 754*a* and/or 754*b*) of the foot (e.g., 714*g* and/or 714*h*) of the body of the first user (e.g., 710 and/or 714) at a fourth position (e.g., a position of representation 730 shown at FIG. 7H) in the extended reality environment (e.g., the fourth position of the third visual indication of the foot is determined based at least partially on a state of a physical foot of the first user and/or on a state of another portion of the body of the first user without being based on the state of the physical foot of the first user). In response to detecting movement of the first user (e.g., 710 and/or 714) (e.g., detecting upward and/or downward movement of at least one body part (e.g., the head, the eyes, and/or the shoulders) of the first user via one or more sensors in communication with the computer system), the computer system (e.g., 101, 700, 704, and/or 944) displays in the extended reality environment (e.g., 715), via the display generation component (e.g., 120, 700*a*, 704*a*, and/or 944*a*), the representation (e.g., 718 and/or 730) of the first user (e.g., 710 and/or 714) at a fifth position (e.g., 748*b*) in the extended reality environment (e.g., 715) (e.g., a fifth position that is determined based at least partially on information indicative of a state of the first user), where the fifth position is determined based at least in part on the movement of the first user (e.g., 710 and/or 714), and where the fifth position (e.g., 748*b*) is above or below the third position (e.g., 748*a*) (e.g., with respect to the one or more objects in the extended reality environment). In response to detecting movement of the first user (e.g., 710 and/or 714) (e.g., detecting upward and/or downward movement of at least one body part (e.g., the head, the eyes, and/or the shoulders) of the first user via one or more sensors in communication with the computer system), the computer system (e.g., 101, 700, 704, and/or 944) displays in the extended reality environment (e.g., 715), via the display generation component (e.g., 120, 700*a*, 704*a*, and/or 944*a*), the third visual indication (e.g., 754*a* and/or 754*b*) of the foot (e.g., 714*g* and/or 714*h*) of the body of the first user (e.g., 710 and/or 714) at a sixth position (e.g., a position of representation 730 shown at FIG. 7I) in the extended reality environment (e.g., 715) (e.g., the sixth position of the third visual indication of the foot is determined based at least partially on the detected movement of the first user, a state of a physical foot of the first user, and/or a state of another portion of the body of the first user without being based on the state of the physical foot of the first user).

Displaying the third visual indication of the foot of the body of the first user at the sixth position in response to detecting movement of the first user provides improved visual feedback about a state of the body of the first user as the first user moves within a physical environment, which provides improved visual feedback.

In some embodiments, the computer system (e.g., 101, 700, 704, and/or 944) displays, in the extended reality environment (e.g., 715), the representation (e.g., 718 and/or 730) of the first user (e.g., 710 and/or 714), which includes: in accordance with a determination that a set of one or more criteria is met (e.g., the first user is determined to be in a sitting position and/or at least one body part of the first user is determined to be touching and/or in contact with a piece of furniture (e.g., a chair, a table, and/or a desk)), the visual indication (e.g., 720, 726*b*, 738, 742*a*, 754, 754*a*, and/or 754*b*) of the portion (e.g., 711*b*) of the body of the first user (e.g., 710 and/or 714) includes a piece of furniture (e.g., 738) (e.g., a representation of a piece of furniture positioned in a physical environment in which the first user is located and/or a virtual piece of furniture that is not based on a physical piece of furniture in the physical environment in which the first user is located) in the extended reality environment (e.g., 715) (e.g., displaying the visual indication of the portion of the body of the first user including the piece of furniture includes displaying the piece of furniture having a position and/or orientation based on the position and/or orientation of the representation of the first user in the extended reality environment), and in accordance with a determination that the set of one or more criteria is not met (e.g., the first user is determined to not be in a sitting position and/or at least one body part of the first user is not determined to be touching and/or in contact with a piece of furniture (e.g., a chair, a table, and/or a desk)), the visual indication (e.g., 720, 726*b*, 738, 742*a*, 754, 754*a*, and/or 754*b*) of the portion (e.g., 711*b*) of the body of the first user (e.g., 710 and/or 714) is without the piece of furniture (e.g., 738) in the extended reality environment (e.g., 715) (e.g., maintaining displaying the representation of the first user with the visual indication).

Displaying the visual indication as including a piece of furniture in accordance with the determination that the set of one or more criteria is met provides improved visual feedback when the first user is in a sitting position, which provides improved visual feedback.

In some embodiments, the set of one or more criteria includes a criterion that is met when the computer system (e.g., 101, 700, 704, and/or 944) receives an indication that the first user (e.g., 710 and/or 714) is in a sitting position (e.g., the computer system detects and/or receives an indication that one or more portions of the body of the first user (e.g., legs, knees, feet, and/or torso) is in a position indicative of the first user sitting down), and the piece of furniture (e.g., 738) in the extended reality is a representation of a chair (e.g., 738) (e.g., a representation of a chair positioned in a physical environment in which the first user is located (e.g., the representation of the chair includes an appearance resembling the chair in the physical environment) and/or a virtual chair having an appearance that is not based on a physical piece of furniture in the physical environment in which the first user is located).

Displaying the visual indication as including a representation of a chair when the computer system receives an indication that the first user is in a sitting position provides improved visual feedback when the first user is in a sitting position, which provides improved visual feedback.

In some embodiments, the representation of the chair (e.g., 738) includes a parametric chair (e.g., a two-dimensional virtual object that includes a chair-like appearance and is positioned beneath the first user with respect to a ground of the extended reality environment to indicate that the parametric chair is supporting the first user in the sitting position) having an appearance that has one or more properties (e.g., color, number of legs, simulated material, and/or shape) that are independent of (e.g., is not determined based on) a physical object supporting the first user (e.g., 710 and/or 714) in the sitting position in a physical environment (e.g., 708 and/or 712) in which the first user (e.g., 710 and/or 714) is located (e.g., the appearance of the parametric chair is not determined based on actual image data of a chair and/or other object on which the first user is sitting).

Displaying the representation of the chair to include a parametric chair provides improved visual feedback as to a state of the body of the first user in a familiar manner, which provides improved visual feedback.

In some embodiments, while the computer system (e.g., 101, 700, 704, and/or 944) displays, in the extended reality environment (e.g., 715), the representation (e.g., 718 and/or 730) of the first user (e.g., 710 and/or 714), the computer system (e.g., 101, 700, 704, and/or 944) detects that the first user (e.g., 710 and/or 714) is touching a surface of an object (e.g., 744) in a physical environment (e.g., 708 and/or 712) in which the first user (e.g., 710 and/or 714) is located (e.g., detecting that at least one portion of the body of the first user (e.g., hands) is within a predetermined distance (e.g., less than 5 centimeters (cm), less than 3 cm, less than 2 cm, or less than 1 cm) of a physical surface in a physical environment in which the user is located). In response to detecting that the first user (e.g., 710 and/or 714) is touching the surface of the object (e.g., 744) in the physical environment (e.g., 708 and/or 712), the computer system (e.g., 101, 700, 704, and/or 944) displays (e.g., concurrently with the representation of the first user) a representation of the surface (e.g., 726 and/or **726*b*) (e.g., a representation of a surface positioned in the physical environment in which the first user is located (e.g., the representation of the surface includes an appearance that is based on the surface positioned in the physical environment) and/or a virtual surface having an appearance that is not based on a physical surface in the physical environment in which the first user is located) in the extended reality environment (e.g., 715**).

Displaying the representation of the surface in response to detecting that the first user is touching the surface of the object provides improved visual feedback when the first user contacts a surface in a physical environment, which provides improved visual feedback.

In some embodiments, while the computer system (e.g., 101, 700, 704, and/or 944) displays, in the extended reality environment (e.g., 715), the representation (e.g., 718 and/or 730) of the first user (e.g., 710 and/or 714), the computer system (e.g., 101, 700, 704, and/or 944) detects that the first user (e.g., 710 and/or 714) is touching an object (e.g., 740) in a physical environment (e.g., 708 and/or 712) in which the first user (e.g., 710 and/or 714) is located (e.g., detecting that at least one portion of the body of the first user (e.g., hands) is within a predetermined distance (e.g., less than 5 centimeters (cm), less than 3 cm, less than 2 cm, or less than 1 cm) of a physical object in a physical environment in which the user is located). In response to detecting that the first user (e.g., 710 and/or 714) is touching the object (e.g., 740) in the physical environment (e.g., 708 and/or 712), the computer system (e.g., 101, 700, 704, and/or 944) displays (e.g., concurrently with the representation of the first user) a representation of the object (e.g., 742 and/or **742*b*) (e.g., a representation of an object positioned in a physical environment in which the first user is located (e.g., the representation of the object includes an appearance that is based on the object positioned in the physical environment) and/or a virtual object having an appearance that is not based on a physical object in the physical environment in which the first user is located) in the extended reality environment (e.g., 715**).

Displaying the representation of the object in response to detecting that the first user is touching the object provides improved visual feedback when the first user contacts an object in a physical environment, which provides improved visual feedback.

In some embodiments, while the computer system (e.g., 101, 700, 704, and/or 944) displays the visual indication (e.g., 720, **726*b*, 738, 742*a*, 754, 754*a*, and/or 754*b*) of the first user (e.g., 710 and/or 714) at a seventh position (e.g., a position of visual indication 720 shown at FIG. 7A) with respect to the one or more objects (e.g., 722) in the extended in reality environment (e.g., 715) (e.g., the computer system determines the seventh position based at least partially on information indicating a state of the portion of the body of the first user), the computer system (e.g., 101, 700, 704, and/or 944) detects movement of a second portion of the body of first user (e.g., 710 and/or 714) (e.g., detecting movement of a second portion of the body of the first user (e.g., the portion and/or a different portion of the body of the first user) via one or more sensors in communication with the computer system) In response to detecting movement of the second portion of the body the first user (e.g., 710 and/or 714), the computer system (e.g., 101, 700, 704, and/or 944) displays the visual indication (e.g., 720, 726*b*, 738, 742*a*, 754, 754*a*, and/or 754*b*) of the first user (e.g., 710 and/or 714) at an eighth position (e.g., a position of visual indication 720 shown at FIG. 7B), different from the seventh position, with respect to the one or more objects (e.g., 722) in the extended reality environment (e.g., 715**) (e.g., an eighth position that causes the visual indication to change appearance with respect to the one or more objects in the extended reality environment as a result of the movement of the portion of the body of the first user).

Displaying the visual indication at the eighth position in response to detecting movement of the first user provides improved visual feedback about the state of the body of the first user when the first user moves in a physical environment, which provides improved visual feedback.

In some embodiments, aspects/operations of methods 800 and 1000 may be interchanged, substituted, and/or added between these methods. For example, the representations displayed by the computer systems performing method 1000 can include the visual indication of the portion of the body of the first user. For brevity, these details are not repeated here.

FIGS. 9A-9H illustrate examples of displaying representations of different portions of a user with different amounts of visual fidelity. FIG. 10 is a flow diagram of an exemplary method 1000 for displaying representations of different portions of a user with different amounts of visual fidelity. The user interfaces in FIGS. 9A-9H are used to illustrate the processes described below, including the processes in FIG. 10.

FIGS. 9A-9H illustrate examples of electronic device 944 displaying a representation of one or more portions of a body of user 900 with different appearances based on a position and/or location of the one or more portions of the body of the user 900 with respect to one or more regions that are defined with respect to the body of user 900. When a portion of a body (e.g., one or more body parts and/or one or more particular body parts) of user 900 is positioned in a region (e.g., a region corresponding to the portion of the body of user 900), electronic device 944 displays a representation of user 900 having a first appearance. For instance, electronic device 944 displays a portion of the representation corresponding to the portion of the body of user 900 with a reduced amount of visual fidelity (e.g., less precision, less clarity, less visibility, and/or an increased amount of blurring) based on the portion of the body of user 900 being positioned within the region. When the portion of the body of user 900 is positioned outside of the region, electronic device 944 displays the representation of user 900 having a second appearance (e.g., an increased amount of visual fidelity and/or a reduced amount of blurring), different from the first appearance.

Figure 9A:
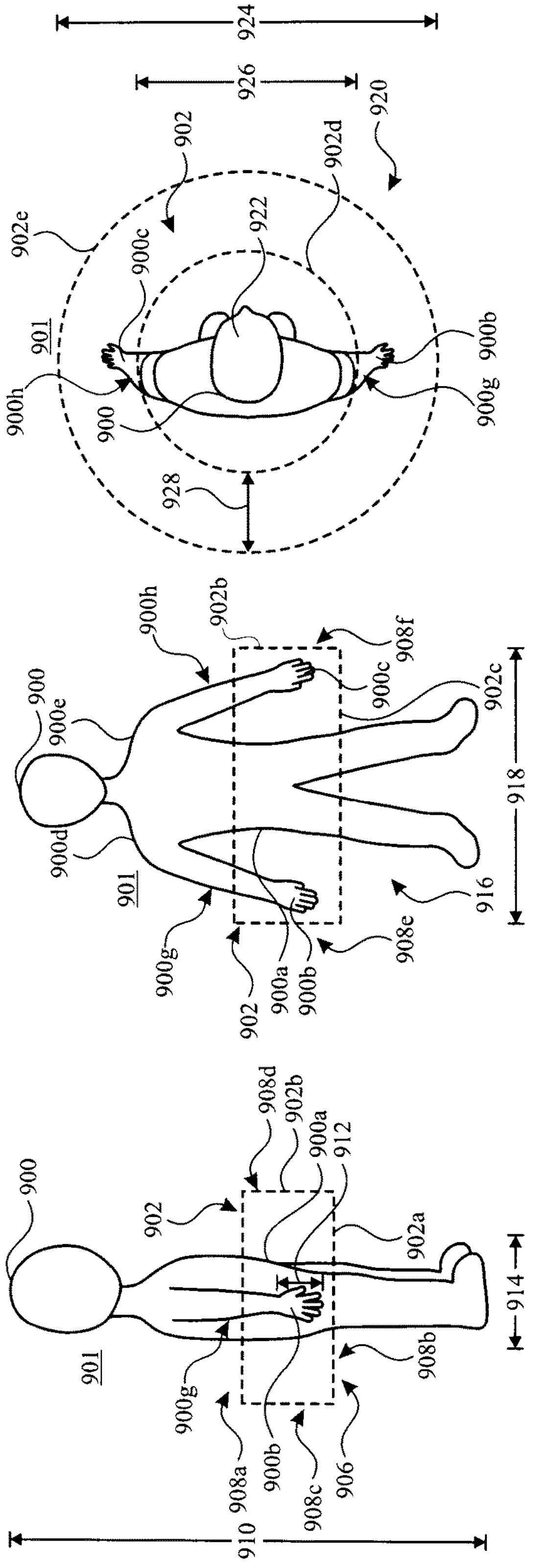
FIGS. 9A-9H illustrate example techniques for displaying representations of different portions of a user with different amounts of visual fidelity, in accordance with some embodiments.
Figure 9B:
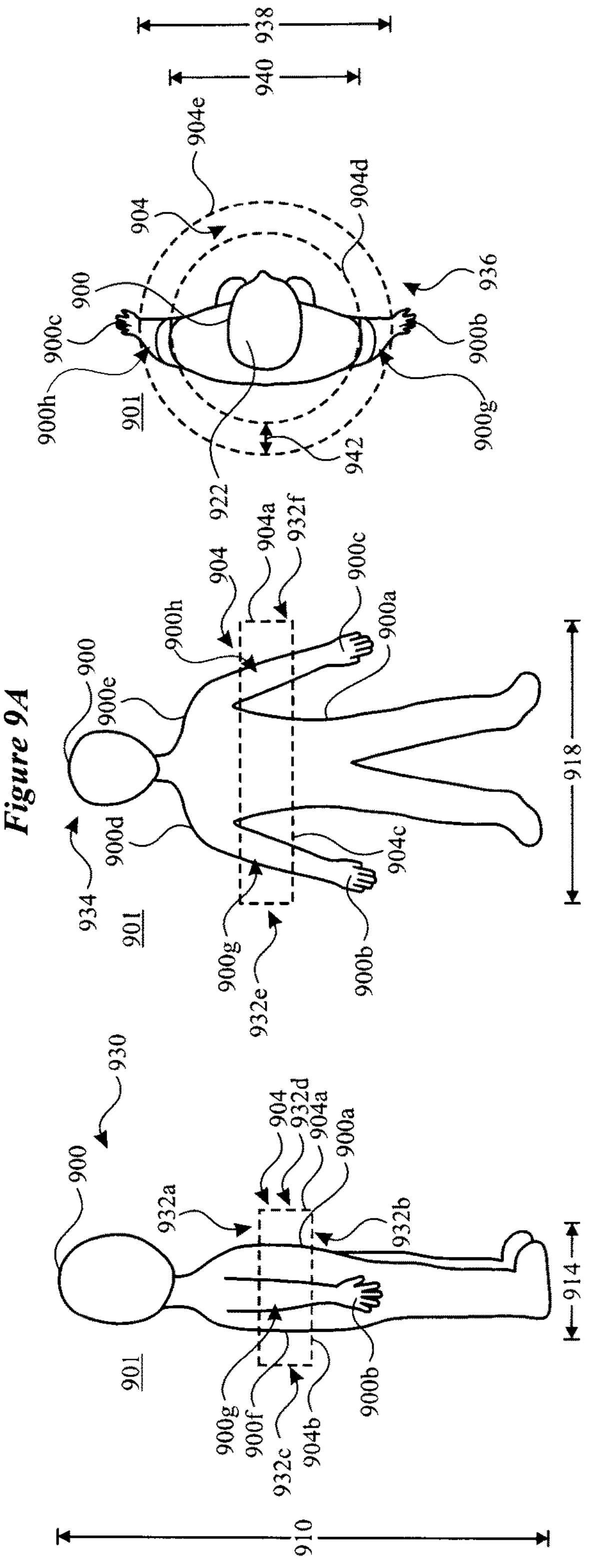

FIGS. 9A and 9B illustrate examples of first region 902 and second region 904, respectively, within physical environment 901 and as defined with respect to the body of user 900. Electronic device 944 associates first region 902 with hand 900*b* and/or hand 900*c* of user 900. For instance, electronic device 944 receives information indicative of a state (e.g., position, orientation, shape, and/or pose) of hand 900*b* and/or hand 900*c* of user 900 within physical environment 901. In some embodiments, the information indicative of the state of hand 900*b* and/or hand 900*c* indicates whether hand 900*b* and/or hand 900*c* is positioned within first region 902. Electronic device 944 displays a representation of hand 900*b* and/or hand 900*c* having a first appearance, such as a first amount of visual fidelity (e.g., a reduced amount of visual fidelity (e.g., less precision and/or less clarity) and/or an increased amount of blur), based on the information indicating that hand 900*b* and/or hand 900*c* is within first region 902. Electronic device 944 displays the representation of hand 900*b* and/or hand 900*c* having a second appearance, such as a second amount of visual fidelity (e.g., an increased amount of visual fidelity (e.g., more precision and/or more clarity) when compared to the first amount of visual fidelity and/or a reduced amount of blur), based on the information indicating that hand 900*b* and/or hand 900*c* is positioned outside of first region 902.

Similarly, electronic device 944 associates second region 904 with elbow 900*g* and/or elbow 900*h* of user 900. For instance, electronic device 944 receives information indicative of a state (e.g., position, orientation, shape, and/or pose) of elbow 900*h* and/or elbow 900*h* of user 900 within physical environment 901. In some embodiments, the information indicative of the state of elbow 900*h* and/or elbow 900*h* indicates whether elbow 900*h* and/or elbow 900*h* is positioned within second region 904. Electronic device 944 displays a representation of elbow 900*h* and/or elbow 900*h* having a first appearance, such as a first amount of visual fidelity (e.g., a reduced amount of visual fidelity (e.g., less precision and/or less clarity) and/or an increased amount of blur), based on the information indicating that elbow 900*h* and/or elbow 900*h* is positioned within second region 904. Electronic device 944 displays the representation of elbow 900*h* and/or elbow 900*h* having a second appearance, such as a second amount of visual fidelity (e.g., an increased amount of visual fidelity (e.g., more precision and/or more clarity) when compared to the first amount of visual fidelity and/or a reduced amount of blur), based on the information indicating that elbow 900*h* and/or elbow 900*h* is positioned outside of second region 904.

In some embodiments, electronic device 944 does not display representations of other body parts other than hand 900*b* and/or hand 900*b* with the first appearance based on the other body parts being within first region 902. Similarly, in some embodiments, electronic device 944 does not display representations of other body other than elbow 900*g* and/or elbow 900*h* with the first appearance based on the other body parts being within second region 904. As such, electronic device 944 does not adjust an appearance of and/or otherwise display a different appearance of a representation of body parts that do not correspond to first region 902 and second region 904.

At FIG. 9A, first perspective 906 of user 900 includes a side view of the body of user 900 and first region 902, which is illustrated, for example, as a box that extends depth 902*a* and height 902*b* with respect to the body of the user 900 (e.g., waist 900*a* of user 900). In particular, depth 902*a* extends from first position 908*a* to second position 908*b* through waist 900*a* of user 900, where first position 908*a* and second position 908*b* are not located on the physical body of user 900 (e.g., first position 908*a* and second position 908*b* are located in areas of physical environment 901 that are determined based on a position of the body (e.g., waist 900*a*) of user 900). In addition, height 902*b* extends from third position 908*c* to fourth position 908*d*. In some embodiments, height 902*b* includes a distance that is determined based on height 910 of user 900 and/or size 912 of hand 900*b* of user 900. In some embodiments, depth 902*a* includes a distance that is determined based on width 914 of user 900 (e.g., a width of waist 900*a* of user 900). In some embodiments, a position and/or location of first region 902 with respect to the body of first user 900 is determined based on a location of a pocket and/or other feature of an article of clothing in which user 900 is wearing, such that when hand 900*b* and/or hand 900*c* are near the pocket and/or other feature, hand 900*b* and/or hand 900*c* are within first region 902.

At FIG. 9A, second perspective 916 of user 900 includes a front facing view of user 900 and first region 902 is illustrated, for example, as a box that extends height 902*b* and length 902*c*. Length 902*c* extends from fifth position 908*e* to sixth position 908*f* through hand 900*b*, waist 900*a*, and hand 900*c* of user 900. In some embodiments, length 902*c* includes a distance that is equal to depth 902*a*. In some embodiments, length 902*c* includes a distance that is determined based on width 918 of user 900 (e.g., width 918 is a distance between hand 900*b* and hand 900*c* when hand 900*b* and hand 900*c* are placed at the sides of user 900 and/or a distance between shoulder 900*d* and shoulder 900*e* of user 900). As shown at FIG. 9A, depth 902*a*, height 902*b*, and length 902*c* each extend along three different axes within physical environment 901, such that first region 902 extends in three dimensions around (e.g., at least partially around) the body of user 900.

For instance, third perspective 920 of user 900 includes a bird's eye and/or overhead view of user 900 and first region 902 is illustrated, for example, as an area between first circle 902*d* and second circle 902*e* (e.g., first region 902 does not include areas of physical environment 901 inside of first circle 902*d* and outside of second circle 902*e*). While FIG. 9A illustrates first region 902 as being the area between first circle 902*d* and circle 902*e*, in some embodiments, first region 902 is defined as being an area between two non-circular shapes extending outward from center 922 of user 900. At FIG. 9A, diameter 924 of second circle 902*e* includes a length that is substantially the same as depth 902*a* and length 902*c*. In addition, first circle 902*d* and second circle 902*e* do not extend the full height of the body of user 900, but extend a distance that is substantially equal to height 902*b*. In some embodiments, diameter 926 of first circle 902*d* includes a distance that is based on width 914 and/or width 918 of user 900. In some embodiments, distance 928 between first circle 902*d* and second circle 902*e* is based on a position of hand 900*b* and/or a position of hand 900*c* when placed at and/or near waist 900*a* of user 900.

Similarly, at FIG. 9B, first perspective 930 of user 900 includes a side view of the body of user 900 and second region 904 is illustrated, for example, as a box that extends depth 904*a* and height 904*b* with respect to the body of the user 900 (e.g., waist 900*a* and/or back 900*f* of user 900). In particular, depth 904*a* extends from first position 932*a* to second position 932*b* through waist 900*a* of user 900, where first position 932*a* and second position 932*b* are not located on the physical body of user 900 (e.g., first position 932*a* and second position 932*b* are located in areas of physical environment 901 that are determined based on a position of the body (e.g., waist 900*a* and/or back 900*f*) of user 900). In addition, height 904*b* extends from third position 932*c* to fourth position 932*d*. In some embodiments, height 904*b* includes a distance that is determined based on height 910 of user 900. In some embodiments, depth 904*a* includes a distance that is determined based on width 914 of user 900. In some embodiments, depth 904*a* and height 904*b* are less than depth 902*a* and height 902*b*.

At FIG. 9B, second perspective 934 of user 900 includes a front facing view of user 900 and second region 904 is illustrated, for example, as a box that extends height 904*b* and length 904*c*. Length 904*c* extends from fifth position 932*e* to sixth position 932*f* through elbow 900*g*, waist 900*a*, and elbow 900*h* of user 900. In some embodiments, length 904*c* includes a distance that is equal to depth 904*a*. In some embodiments, length 904*c* includes a distance that is determined based on width 918 of user 900 (e.g., width 918 is a distance between hand 900*b* and hand 900*c* when hand 900*b* and hand 900*c* are placed at the sides of user 900 and/or a distance between shoulder 900*d* and shoulder 900*e* of user 900). As shown at FIG. 9B, depth 904*a*, height 904*b*, and length 904*c* each extend along three different axes within physical environment 901, such that second region 904 extends in three dimensions around (e.g., at least partially around) the body of user 900.

For instance, third perspective 936 of user 900 includes a bird's eye and/or overhead view of user 900 and second region 904 is illustrated, for example, as an area between first circle 904*d* and second circle 904*e* (e.g., second region 904 does not include areas of physical environment 901 inside of first circle 904*d* and outside of second circle 904*e*). While FIG. 9B illustrates second region 904 as being the area between first circle 904*d* and circle 904*e*, in some embodiments, second region 904 is defined as being an area between two non-circular shapes extending outward from center 922 of user 900. At FIG. 9B, diameter 938 of second circle 904*e* includes a length that is substantially the same as depth 904*a* and length 904*c*. In addition, first circle 904*d* and second circle 904*e* do not extend the full height of the body of user 900, but extend a distance that is substantially equal to height 904*b*. In some embodiments, diameter 940 of first circle 904*d* includes a distance that is based on width 914 and/or width 918 of user 900. In some embodiments, distance 942 between first circle 904*d* and second circle 904*e* is based on a position of elbow 900*g* and/or a position of elbow 900*h* when placed at and/or near the sides of the body of user 900.

As discussed below, first region 902 and second region 904 are substantially fixed with respect to one or more portions of the body of user 900 (e.g., waist 900*a*, shoulder 900*d*, shoulder 900*e*, and/or back 900*f* of user 900), such that a corresponding portion of the body of user 900 is determined to be within first region 902 (e.g., hand 900*b* and/or hand 900*c*) and/or second region 904 (e.g., elbow 900*g* and/or elbow 900*h*) despite movement of user 900.

FIGS. 9C-9H illustrate examples of electronic device 944 displaying, via display 944*a*, communication interface 946, which includes first participant region 946*a* corresponding to user 900 and second participant region 946*b* corresponding to a second user (e.g., a second user associated with and/or using electronic device 944). At FIG. 9C, first participant region 946*a* includes extended reality environment 948, as well as first representation 950 of user 900 and table representation 952 (e.g., an image representative of a virtual table and/or representative of table 958 within physical environment 901) within extended reality environment 948. In addition, second participant region 946*b* includes second representation 954 (e.g., an avatar and/or an image representative of) of second user.

FIGS. 9C-9H also illustrate user 900 within physical environment 901 (e.g., an actual environment in which user 900 is physically located), where physical environment 901 includes user 900 and table 958 (e.g., a physical table). Electronic device 944 is in communication with (e.g., wireless communication via an external electronic device that user 900 is associated with and/or using) sensor 960*a* and sensor 960*b* that are positioned within physical environment 901. In some embodiments, sensors 960*a* and 960*b* include a camera, an image sensor, a light sensor, a depth sensor, a tactile sensor, an orientation sensor, a proximity sensor, a temperature sensor, a location sensor, a motion sensor, and/or a velocity sensor. Sensors 960*a* and 960*b* are configured to capture data and/or information related to a state (e.g., position, orientation, posture, and/or pose) of user 900 within physical environment 901. For example, sensors 960*a* and 960*b* are configured to detect and capture information related to a positon and/or movement of various body parts of user 900 within physical environment 901. While FIGS. 9C-9H illustrate electronic device 944 being in communication with two sensors (e.g., sensor 960*a* and sensor 960*b*), in some embodiments, electronic device 944 is in communication with any suitable number of sensors (e.g., via an external electronic device associated with user 900).

Figure 9C:
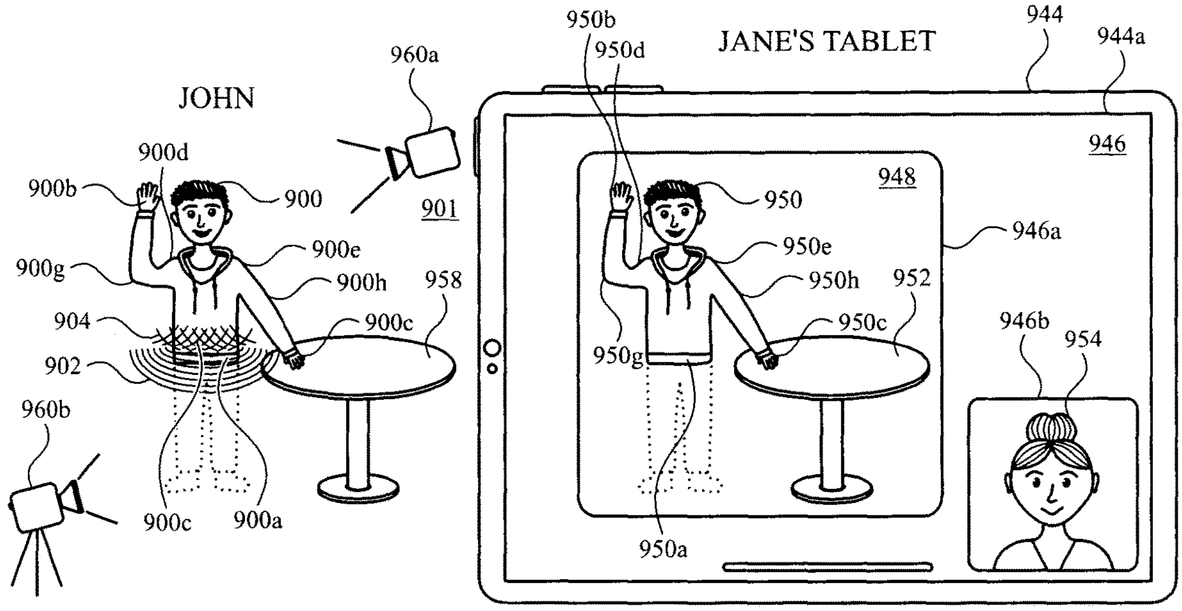

At FIG. 9C, electronic device 944 receives information indicative of a state of one or more body parts of user 900 within physical environment 901 (e.g., via sensors 960*a* and/or 960*b* and/or via an external device). In response to receiving the information, electronic device 944 displays first representation 950 within extended reality environment 948 of first participant region 946*a*. As shown at FIG. 9C, first representation 950 includes an appearance that imitates a physical appearance of user 900 in physical environment 901. For instance, first representation 950 includes waist 950*a*, hand 950*b*, hand 950*c*, shoulder 950*d*, shoulder 950*e*, elbow 950*g*, and elbow 950*h* corresponding to waist 900*a*, hand 900*b*, hand 900*c*, shoulder 900*d*, shoulder 900*e*, elbow 900*g*, and elbow 900*h* of user 900. In particular, hand 950*b* of first representation 950 is raised above waist 950*a* within extended reality environment 948 similar to hand 900*b* of user 900 in physical environment 901. Hand 950*c* of first representation 950 is positioned on and/or near table representation 952 within extended reality environment 948 similar to hand 900*c* of user 900 that is positioned on and/or near table 958 in physical environment 901.

At FIG. 9C, first region 902 and second region 904 are illustrated within physical environment 901 in which user 900 is located. First region 902 is represented by semi-circles surrounding an area of physical environment 901 near waist 900*a* of user 900 and second region 904 is represented by hatched lines surrounding an area near stomach 900*i* of user 900. While first region 902 and second region 904 are illustrated within physical environment 901, first region 902 and second region 904 are not physically visible to user 900 and/or distinguishable within physical environment. In addition, electronic device 944 does not display, via display 944*a*, first region 902 and/or second region 904 on communication user interface 946 and/or in extended reality environment 948.

At FIG. 9C, hand 900*b* and hand 900*c* of user 900 are both positioned outside of first region 904 within physical environment 901. Similarly, elbow 900*g* and elbow 900*h* are both positioned outside of second region 906 within physical environment 901. Electronic device 944 receives information indicative of the state (e.g., position, orientation, posture, and/or pose) of hand 900*b* and hand 900*c* being outside of first region 902 and elbow 900*g* and elbow 900*h* being outside of second region 904. Based on the received information that hand 900*b* and hand 900*c* are outside of first region 902, electronic device 944 displays hand 950*b* and hand 950*c* of first representation 950 as having a first appearance within extended reality environment 948 (e.g., as indicated by solid lines illustrated in FIG. 9C). At FIG. 9C, electronic device 944 displays hand 950*b* and hand 950*c* of first representation 950 with a first amount of visual fidelity and/or without blur applied to hand 950*b* and hand 950*c*. In some embodiments, electronic device 944 displays hand 950*b* and hand 950*c* as anatomically accurate representations of hand 900*b* and hand 900*c* without applying any amount of blur to hand 950*b* and hand 950*c* based on the information indicating that hand 900*b* and hand 900*c* are outside of first region 902. In some embodiments, electronic device 944 displays hand 950*b* and hand 950*c* with the first appearance (e.g., the first amount of visual fidelity) because hand 900*b* and hand 900*c* of user 900 are outside of first region 902, thereby indicating that user 900 is using hand 900*b* and/or hand 900*c* for communication with the second user.

Similarly, based on the received information indicating that elbow 900*g* and elbow 900*h* are outside of second region 904, electronic device 944 displays elbow 950*g* and elbow 950*h* of first representation 950 as having a first appearance within extended reality environment 948 (e.g., as indicated by solid lines illustrated in FIG. 9C). At FIG. 9C, electronic device 944 displays elbow 950*g* and elbow 950*h* of first representation 950 with a first amount of visual fidelity and/or without blur applied to elbow 950*g* and/or elbow 950*h*. In some embodiments, electronic device 944 displays elbow 950*g* and elbow 950*h* as anatomically accurate representations of elbow 900*g* and elbow 900*h* without applying any amount of blur to elbow 950*g* and elbow 950*h* based on the information indicating that elbow 900*g* and elbow 900*h* are outside of second region 904.

Figure 9D:
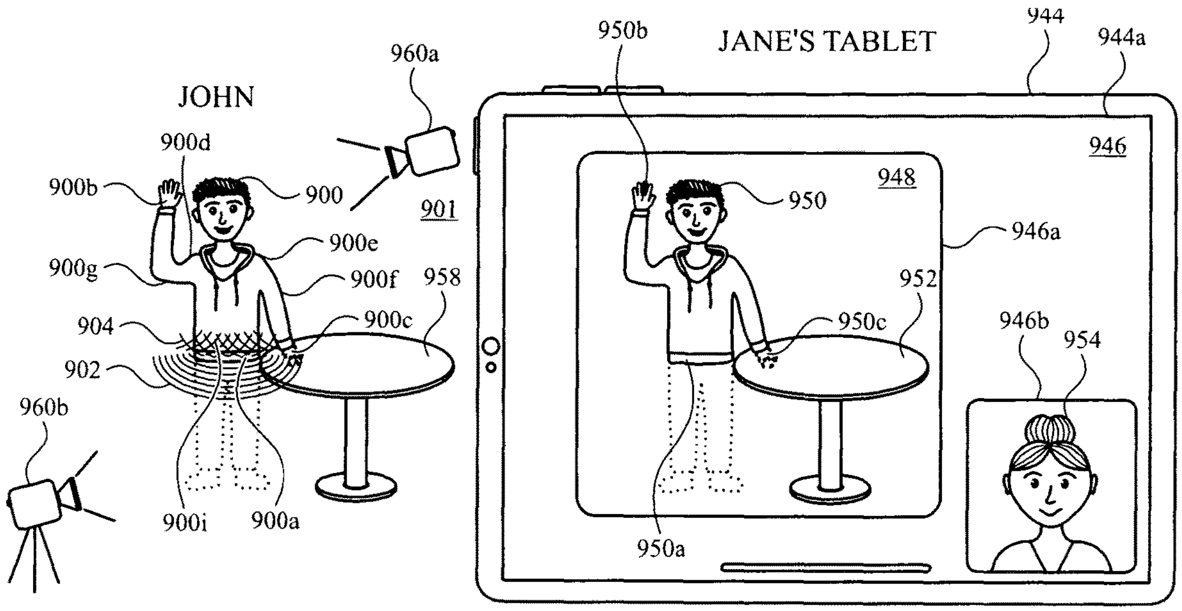

At FIG. 9D, user 900 has moved toward table 958 in physical environment 901. For instance, user 900 is positioned closer to table 958 in FIG. 9D when compared to the location of user 900 in FIG. 9C. In particular, waist 900*a* of user 900 moves toward table 958, while hand 900*c* of user 900 remains located on and/or near table 958. At FIG. 9D, electronic device 944 receives information indicative of the state of user 900 within physical environment 901 including the position of waist 900*a* and hand 900*c*. The information indicative of the state of user 900 indicates that hand 900*c* is inside of first region 902, as shown at FIG. 9D. Based on the received information indicating that hand 900*c* is inside of first region 902, electronic device 944 displays hand 950*c* of first representation 950 as having a second appearance. For instance, at FIG. 9D, hand 950*c* is shown as being displayed by electronic device 944 with dashed lines to indicate that electronic device is displaying hand 950*c* with the second appearance. In some embodiments, the second appearance includes displaying hand 950*c* with a second amount of visual fidelity (e.g., precision and/or clarity) and/or with an increased amount of blur. In some embodiments, the second appearances includes displaying hand 950*c* as a blurred orb and/or other non-anatomically accurate representation of hand 900*c* of user 900. In some embodiments, electronic device 944 displays hand 950*c* with the second appearance (e.g., the second amount of visual fidelity) because hand 900*c* of user 900 is inside of first region 902, thereby indicating that user 900 is not using hand 900*c* for communication with the second user. In some embodiments, electronic device 944 displays hand 950*c* with the second appearance even when electronic device 944 receives information indicative of a state of hand 900*c* within physical environment 901 (e.g., direct data captured and/or detected via sensor 960*a* and/or 960*b*).

As shown at FIG. 9D, first region 902 and second region 904 are illustrated with respect to user 900. First region 902 and second region 904 include the substantially same position and/or location with respect to waist 900*a* and/or stomach 900*i* of user 900 as compared to the position and/or location shown in FIG. 9C, despite user 900 moving toward table 958. Thus, the positions and/or locations of first region 902 and second region 904 within physical environment 901 are maintained with respect to at least a portion of the body of user 900 (e.g., waist 900*a*) even as user 900 moves in physical environment 901.

Figure 9E:
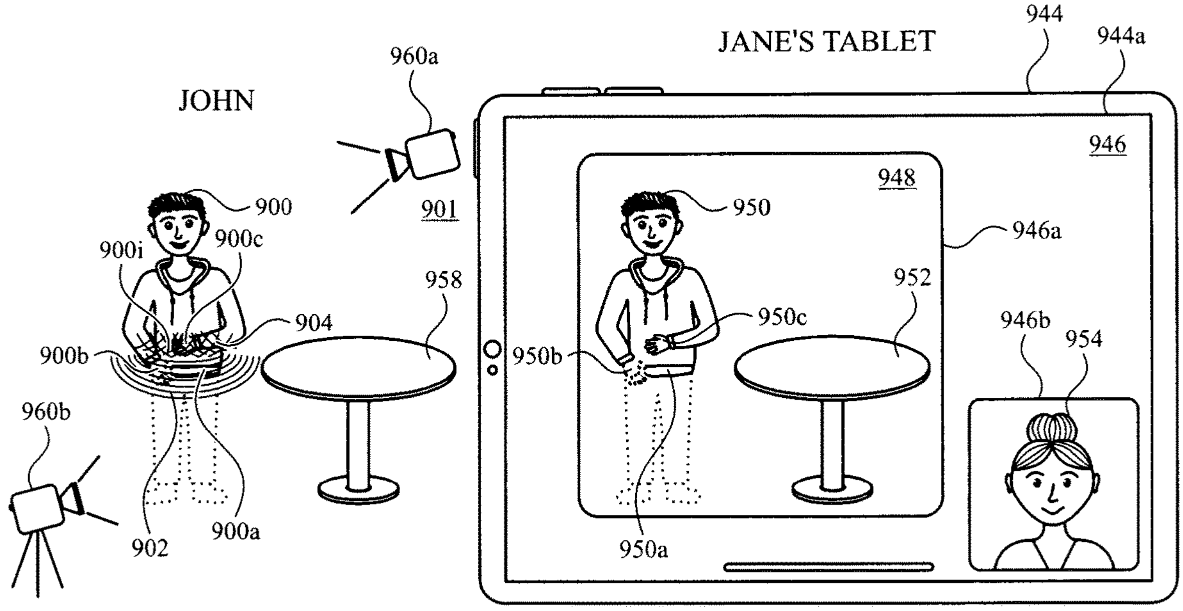

At FIG. 9E, user 900 has moved away from table 958 (e.g., as compared to the position of user 900 at FIG. 9D) and has moved hand 900*b* and hand 900*c* (e.g., with respect to waist 900*a* of user 900). User 900 has moved hand 900*b* to a location and/or position near waist 900*a* of user 900 and/or near a pocket of a jacket in which user 900 is wearing. User 900 has also moved hand 900*c* to a location and/or position near stomach 900*i* of user 900. Accordingly, hand 900*b* is within first region 902, while hand 900*c* is within second region 904 but outside of first region 902. At FIG. 9E, electronic device [900] 944 receives information indicative of the state of user 900 within physical environment 901 including the position of waist 900*a*, hand 900*b*, and hand 900*c*. The received information indicates that hand 900*b* is inside of first region 902 and hand 900*c* is outside of first region 902, as shown at FIG. 9E. Based on the received information, electronic device 944 displays hand 950*b* of first representation 950 as having the second appearance. For instance, at FIG. 9E, hand 950*b* is shown as being displayed by electronic device 944 with dashed lines to indicate that electronic device is displaying hand 950*b* with the second appearance. In some embodiments, the second appearance includes displaying hand 950*b* with a second amount of visual fidelity (e.g., precision and/or clarity) and/or with an increased amount of blur. In some embodiments, the second appearances includes displaying hand 950*b* as a blurred orb and/or other non-anatomically accurate representation of hand 900*b* of user 900. In some embodiments, electronic device 944 displays hand 950*b* with the second appearance (e.g., the second amount of visual fidelity) because hand 900*b* of user 900 is inside of first region 902, thereby indicating that user 900 is not using hand 900*b* for communication with the second user.

At FIG. 9E, electronic device 944 displays hand 950*c* of first representation 950 with the first appearance (e.g., indicated by solid lines illustrated at FIG. 9E) based on the received information indicating that hand 900*c* of user 900 is outside of first region 902. Even though hand 900*c* is within second region 904, electronic device 944 displays hand 950*c* with the first appearance because the received information indicates that hand 900*c* is outside of first region 902. Thus, electronic device 944 is configured to display hand 950*b* and/or hand 950*c* with the first appearance and/or the second appearance based the information indicating whether hand 900*b* and/or hand 900*c* are inside of and/or outside of first region 902, and not inside of and/or outside of second region 904. In other words, electronic device 944 does not modify an appearance of hand 950*b* and/or hand 950*c* based on the information indicating that hand 900*b* and/or hand 900*c* are positioned inside of second region 904.

As shown at FIG. 9E, first region 902 and second region 904 are illustrated with respect to user 900. First region 902 and second region 904 include substantially the same position and/or location with respect to waist 900*a* and/or stomach 900*i* of user 900 as compared to the position and/or location shown in FIGS. 9C and 9D, despite user 900 moving toward table 958. Thus, the positions and/or locations of first region 902 and second region 904 within physical environment 901 are maintained with respect to at least a portion of the body of user 900 (e.g., waist 900*a*) even as user 900 moves in physical environment 901.

Figure 9F:
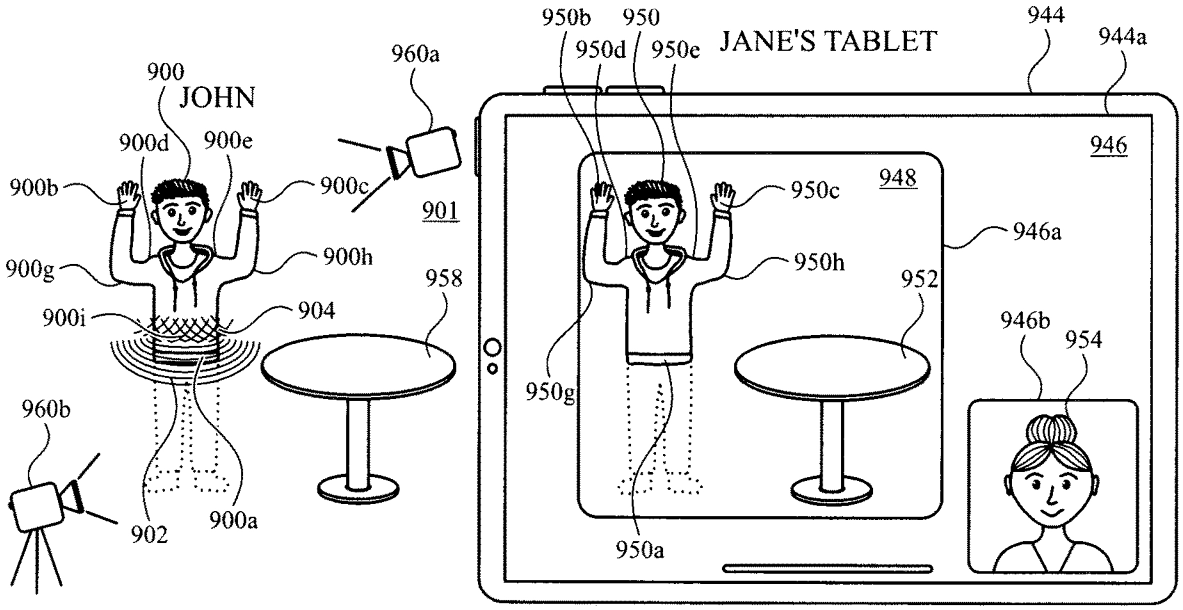

At FIG. 9F, user 900 has moved hand 900*b* and hand 900*c* above shoulder 900*d* and shoulder 900*c*, respectively. Accordingly, hand 900*b* and hand 900*c* are both positioned outside of first region 902. At FIG. 9F, electronic device 900 receives information indicative of the state of user 900 within physical environment 901 including the position of hand 900*b*, hand 900*c*, elbow 900*g*, and elbow 900*h*. The received information indicates that hand 900*b* and hand 900*c* are both positioned outside of first region 902. Based on the information indicating that 900*b* and hand 900*c* are both outside of first region 902, electronic device 944 displays hand 950*b* and hand 950*c* of first representation 950 as having the first appearance. In addition, the received information indicates that elbow 900*g* and elbow 900*h* are both positioned outside of second region 904. Based on the information indicating that elbow 900*g* and elbow 900*h* are both outside of second region 904, electronic device 944 displays elbow 950*g* and elbow 950*h* of first representation 950 as having the first appearance.

Figure 9G:
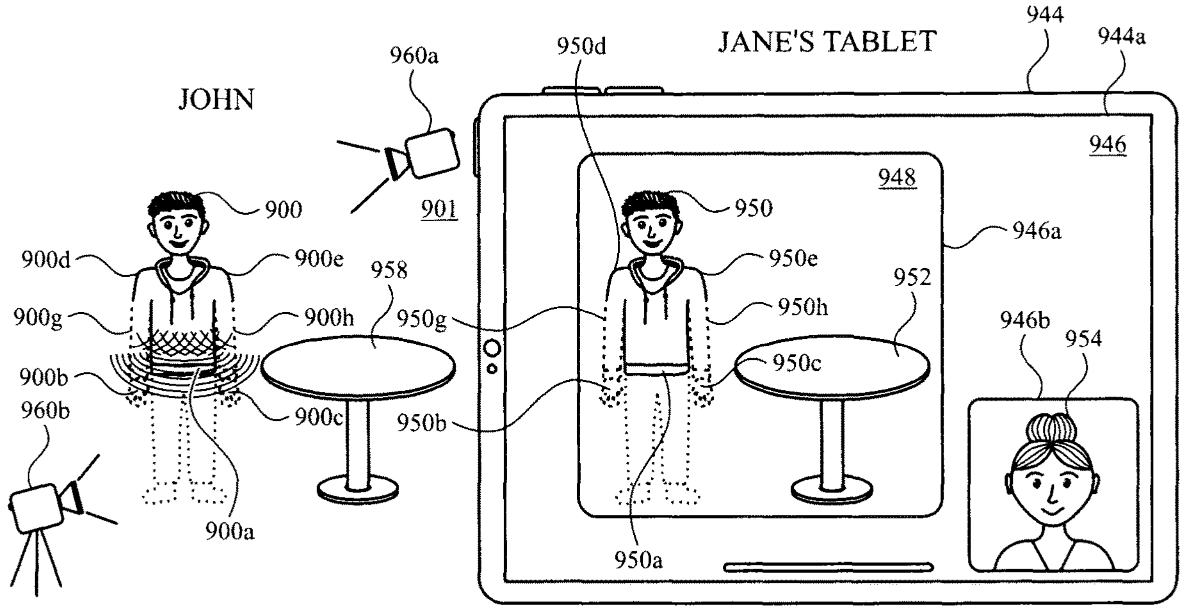

At FIG. 9G, user 900 has moved hand 900*b*, hand 900*c*, elbow 900*g*, and elbow 900*h* at the sides of user 900. Accordingly, hand 900*b* and hand 900*c* are both positioned inside of first region 902 and elbow 900*g* and elbow 900*h* are both positioned inside of second region 904. At FIG. 9F, electronic device 900 receives information indicative of the state of user 900 within physical environment 901 including the position of hand 900*b*, hand 900*c*, elbow 900*g*, and elbow 900*h*. The received information indicates that hand 900*b* and hand 900*c* are both positioned inside of first region 902. Based on the received information indicating that hand 900*b* and hand 900*c* are both inside of first region 902, electronic device 944 displays hand 950*b* and hand 950*c* of first representation 950 as having the second appearance (e.g., as indicated by hand 950*b* and hand 950*c* having dashed lines). In addition, the received information indicates that elbow 900*g* and elbow 900*h* are both positioned inside of second region 904. Based on the information indicating that elbow 900*g* and elbow 900*h* are both inside of second region 904, electronic device 944 displays elbow 950*g* and elbow 950*h* of first representation 950 as having the second appearance (e.g., as indicated by elbow 950*g* and elbow 950*h* having dashed lines).

As set forth above, electronic device 944 is configured to adjust an appearance of hand 950*b* and/or hand 950*c* based on whether the received information indicates that hand 900*b* and/or hand 900*c* are inside of and/or outside of first region 902. In addition, electronic device 944 is configured to adjust an appearance of elbow 950*g* and elbow 950*h* based on whether the received information indicates that elbow 900*g* and elbow 900*h* are positioned inside of and/or outside of second region 904. Electronic device 944 does not adjust and/or modify an appearance of hand 950*b* and/or hand 950*c* when the received information indicates that hand 900*b* and/or hand 900*c* are positioned inside of second region 904. Similarly, electronic device 944 does not adjust and/or modify an appearance of elbow 950*g* and/or elbow 950*h* when the received information indicates that elbow 900*g* and/or elbow 900*h* are positioned within first region 902.

Figure 9H:
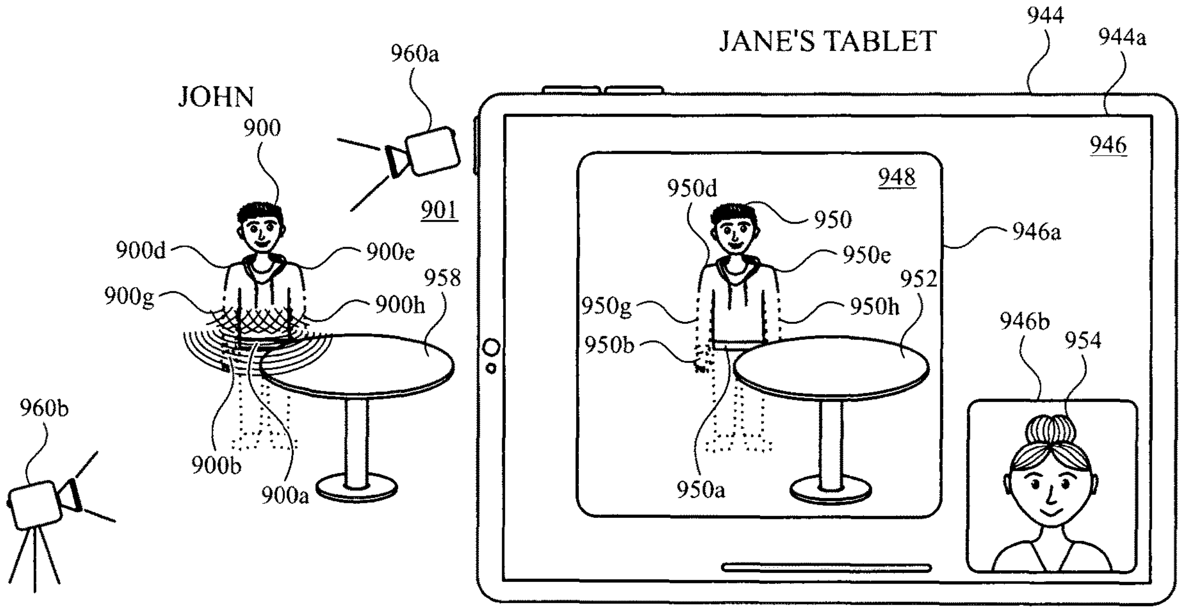

At FIG. 9H, user 900 has moved toward table 958 in physical environment 901. For instance, user 900 is positioned closer to table 958 in FIG. 9H when compared to the location of user 900 in FIG. 9G. In particular, waist 900*a* of user 900 moves toward table 958, while hand 900*b* and hand 900*c* of user 900 remain located near the sides (e.g., waist 900*a*) of user 900. In addition, elbow 900*g* and 900*h* of user 900 remain located near the sides of user 900, as shown at FIG. 9H. Electronic device 944 receives information indicative of the state of user 900 within physical environment 901 including the position of waist 900*a*, hand 900*b*, hand 900*c*, elbow 900*g*, and/or elbow 900*h*. The received information indicates that hand 900*b* and hand 900*b* are both inside of first region 902. Based on the received information indicating that hand 900*b* and hand 900*c* are inside of first region 902, electronic device 944 displays hand 950*b* and hand 950*c* of first representation 950 as having the second appearance. The received information also indicates that elbow 900*g* and elbow 900*h* are both inside of second region 904. Based on the received information indicating that elbow 900*g* and elbow 900*h* are inside of second region 904, electronic device 944 displays elbow 950*g* and elbow 950*h* with the second appearance.

At FIG. 9H, first region 902 and second region 904 are illustrated with respect to user 900. First region 902 and second region 904 include the substantially same position and/or location with respect to waist 900*a* of user 900 as compared to the position and/or location shown in FIGS. 9C-9G, despite user 900 moving toward table 958. Thus, the positions and/or locations of first region 902 and second region 904 within physical environment 901 are maintained with respect to at least a portion of the body of user 900 (e.g., waist 900*a*) even as user 900 moves in physical environment 901.

Additional descriptions regarding FIGS. 9A-9H are provided below in reference to method 1000 described with respect to FIGS. 9A-9H.

FIG. 10 is a flow diagram of an exemplary method 1000 for displaying representations of different portions of a user with different amounts of visual fidelity, in accordance with some embodiments. In some embodiments, method 1000 is performed at a computer system (e.g., computer system 101 in FIG. 1) including a display generation component (e.g., display generation component 120 in FIGS. 1, 3, and 4) (e.g., a visual output device, a 3D display, a display having at least a portion that is transparent or translucent on which images can be projected (e.g., a see-through display), a projector, a heads-up display, a display controller) and an external computer system that is associated with a first user (e.g., that is being operated by the first user (e.g., a user that is in a communication session (e.g., an extended reality and/or video conference) with the user of the computer system)). In some embodiments, the method 1000 is governed by instructions that are stored in a non-transitory (or transitory) computer-readable storage medium and that are executed by one or more processors of a computer system, such as the one or more processors 202 of computer system

101 (e.g., controller 110 in FIG. 1). Some operations in method 1000 are, optionally, combined and/or the order of some operations is, optionally, changed.

As described below, method 1000 provides an intuitive way for displaying representations of different portions of a user with different amounts of visual fidelity. The method reduces the cognitive burden on a user for participating in a real-time communication session, thereby creating a more efficient human-machine interface. For battery-operated computing devices, enabling a user communicate with another participant of the real-time communication session faster and more efficiently conserves power and increases the time between battery charges.

The computer system (e.g., 101, 700, 704, and/or 944), in response to receiving (e.g., based on user input at the computer system) a request to display a representation (e.g., 950) (e.g., an avatar; a virtual avatar (e.g., the avatar is a virtual representation of at least a portion of the first user)) of the first user (e.g., 900) (e.g., a user of the external computer system) in an extended reality environment (1002) (e.g., 948) (in some embodiments, the virtual avatar is displayed, in an extended reality environment, in lieu of the first user), displays (1004) in the extended reality environment (e.g., 948), via the display generation component (e.g., 120, 700*a*, 704*a*, and/or 944*a*), the representation (e.g., 950) (e.g., an avatar and/or a virtual representation of at least a portion of the first user) of the first user (e.g., a user in a physical environment)

Displaying the representation (e.g., 950) of the first user (e.g., 900) includes (in some embodiments, the virtual avatar is displayed, in an extended reality environment, in lieu of the first user): in accordance with a determination that a first portion (e.g., 900*b*, 900*c*, 900*g*, and/or 900*h*) of a body of the first user (e.g., 900) (e.g., hands, forearms, and/or elbows) is in a first region (e.g., 902 and/or 904) of a physical environment (e.g., 901) in which the first user (e.g., 900) is located, where the first region (e.g., 902 and/or 904) is defined relative to the body of the first user (e.g., 900) (e.g., the first portion of the body of the first user is positioned within a predetermined area with respect to a second portion of the body of the first user (e.g., hips, waist, torso, and/or abdominal region)), the computer system (e.g., 101, 700, 704, and/or 944) displays (1006), via the display generation component (e.g., 120, 700*a*, 704*a*, and/or 944*a*), a first visual indication (e.g., 950*b*, 950*c*, 950*g*, and/or 950*h*) of the first portion (e.g., 900*b*, 900*c*, 900*g*, and/or 900*h*) of the body of the first user (e.g., 900) (e.g., an obscured representation of the first portion of the body of the first user, where the obscured representation is not an anatomically accurate depiction and/or representation of the first portion of the body of the first user), where the first visual indication (e.g., 950*b*, 950*c*, 950*g*, and/or 950*h*) of the first portion (e.g., 900*b*, 900*c*, 900*g*, and/or 900*h*) of the body of the first user (e.g., 900) includes a first amount of visual fidelity (and/or precision) (e.g., a low amount of fidelity causing the first visual indication of the first portion of the body to include an obscured representation of the first portion of the body (e.g., a blurred, transparent, and/or other visual indication of the first portion of the body that is not an anatomically accurate depiction and/or representation of the first portion of the body)). In some embodiments, the predetermined area includes a three-dimensional area with respect to the second portion of the body of the first user (e.g., extending around and/or extending partially around the second portion of the body of the first user) that indicates that the first portion of the body of the first user is inactive and/or not moving (e.g., hands in pockets, hands resting on the hips, hands at the sides of the first user, arms crossed).

Displaying the representation (e.g., 950) of the first user (e.g., 900) includes (in some embodiments, the virtual avatar is displayed, in an extended reality environment, in lieu of the first user): in accordance with a determination that the first portion (e.g., 900*b*, 900*c*, 900*g*, and/or 900*h*) of the body of the first user (e.g., 900) (e.g., hands, forearms, and/or elbows) is in a second region (e.g., a region of physical environment 901 outside of region 902 and/or region 904) of the physical environment (e.g., 901), where the second region is separate from the first region (e.g., 902 and/or 904) (e.g., the first portion of the body of the first user is positioned outside of the predetermined area with respect to the second portion of the body of the first user (e.g., hips, waist, torso, and/or abdominal region)), the computer system (e.g., 101, 700, 704, and/or 944) displays (1008), via the display generation component (e.g., 120, 700*a*, 704*a*, and/or 944*a*), a second visual indication (e.g., 950*b*, 950*c*, 950*g*, and/or 950*h*) of the first portion (e.g., 900*b*, 900*c*, 900*g*, and/or 900*h*) of the body of the first user (e.g., 900) (e.g., a representation of the first portion of the body of the first user that is an anatomically accurate representation and/or depiction of the first portion of the body of the first user), where the second visual indication (e.g., 950*b*, 950*c*, 950*g*, and/or 950*h*) of the first portion (e.g., 900*b*, 900*c*, 900*g*, and/or 900*h*) of the body of the first user (e.g., 900) includes a second amount of visual fidelity (and/or precision) (e.g., a high amount of fidelity causing the first visual indication of the first portion of the body to include an accurate depiction of the first portion of the body), different from the first amount of visual fidelity.

Displaying the first visual indication and/or the second visual indication based the determination that the first portion of the body of the first user is in a first region and/or a second region provides improved visual feedback by displaying portions of the representation with increased clarity when the first user is likely using the first portion of the body to communicate during a real-time communication session, which provides improved visual feedback.

In some embodiments, displaying the representation (e.g., 950) of the first user (e.g., 900) includes, in accordance with a determination that a second portion (e.g., 900*b*, 900*c*, 900*g*, and/or 900*h*) of the body of the first user (e.g., 900) (e.g., hands, forearms, and/or elbows; a second portion of the body that is different from the first portion of the body of the first user) is in a third region (e.g., 902 and/or 904) of the physical environment (e.g., 901) in which the first user (e.g., 900) is located (e.g., the third region of the physical environment in which the first user is located is different from the first region of the physical environment in which the first user is located), where the third region (e.g., 902 and/or 904) is defined relative to the body of the first user (e.g., 900) (e.g., the second portion of the body of the first user is positioned within a predetermined area with respect to a third portion of the body of the first user (e.g., hips, waist, torso, and/or abdominal region)), the computer system (e.g., 101, 700, 704, and/or 944) displays, via the display generation component (e.g., 120, 700*a*, 704*a*, and/or 944*a*), a third visual indication (e.g., 950*b*, 950*c*, 950*g*, and/or 950*h*) of the second portion (e.g., 900*b*, 900*c*, 900*g*, and/or 900*h*) of the body of the first user (e.g., 900) (e.g., the third visual indication of the second portion of the body of the first user is different from the first visual indication and the second visual indication of the first portion of the body of the first user), where the third visual indication (e.g., 950*b*, 950*c*, 950*g*, and/or 950*h*) of the second portion (e.g.,

900*b*, 900*c*, 900*g*, and/or 900*h*) of the body of the first user (e.g., 900) includes the first amount of visual fidelity (and/or precision) (e.g., a low amount of fidelity causing the third visual indication of the second portion of the body to include an obscured representation of the second portion of the body (e.g., a blurred, transparent, and/or other visual indication of the second portion of the body that is not an anatomically accurate depiction and/or representation of the second portion of the body)).

Displaying the third visual indication based the determination that the second portion of the body of the first user is in a third region provides improved visual feedback by displaying portions of the representation with increased clarity when the first user is likely using a particular portion of the body to communicate during a real-time communication session, which provides improved visual feedback.

In some embodiments, the first region (e.g., 902 and/or 904) surrounds a predetermined portion (e.g., 900*a*, 900*f*, and/or 900*i*) of the body of the first user (e.g., 900) (e.g., the first region includes a predetermined area with respect to the second portion of the body of the first user (e.g., hips, waist, torso, and/or abdominal region) that extends at least partially around the second portion of the body of the first user).

The first region surrounding a predetermined portion of the body of the first user enables a determination to be made as to whether the first portion of the body of the first user is within an area where the first portion of the body is unlikely to be used by the first user for communicating during the real-time communication session, which provides improved visual feedback.

In some embodiments, the first region (e.g., 902 and/or 904) extends in three dimensions with respect to the physical environment (e.g., 901) in which the first user (e.g., 900) is located (e.g., the first region extends into areas of space in the physical environment in which the first user is located along three different axes).

The first region extending in three dimensions with respect to the physical environment enables a determination to be made as to whether the first portion of the body of the first user is within an area where the first portion of the body is unlikely to be used by the first user for communicating during the real-time communication session, which provides improved visual feedback.

In some embodiments, the first region (e.g., 902) of the physical environment (e.g., 901) in which the first user (e.g., 900) is located corresponds to the first portion (e.g., 900*b* and/or 900*c*) of the body of the user (e.g., 900) (e.g., the first region of the physical environment in which the first user is located corresponds to only the first portion of the body of the first user, such that when a second portion of the body of the first user is in determined to be positioned in the first region, an amount of visual fidelity and/or other appearance of a representation and/or visual indication of the second portion of the body of the first user is unchanged and/or maintained), and a third region (e.g., 904) of the physical environment (e.g., 901) in which the first user (e.g., 900) is located corresponds to a second portion (e.g., 900*g* and/or 900*h*) of the body of the first user (e.g., 900), different from the first portion (e.g., 900*b* and/or 900*c*) of the body of the first user (e.g., 900) (e.g., the third region of the physical environment in which the first user is located corresponds to only the second portion of the body of the first user, such that when the first portion of the body of the first user is in determined to be positioned in the third region, an amount of visual fidelity and/or other appearance of a representation and/or visual indication of the first portion of the body of the first user is unchanged and/or maintained) (e.g., different portions of the body of the first user correspond to different regions of the physical environment).

The first region corresponding to the first portion of the body of the first user and the third region corresponding to the second portion of the body of the first user provides improved visual feedback by displaying different portions of the representation that are likely to be used by the first user for communicating during a real-time communication session, which provides improved visual feedback.

In some embodiments, while the computer system (e.g., 101, 700, 704, and/or 944) displays, in the extended reality environment, the representation (e.g., 950) of the first user (e.g., 900), the computer system (e.g., 101, 700, 704, and/or 944) receives an indication of a state (e.g., position, orientation, and/or pose) of the first portion (e.g., 900*b*, 900*c*, 900*g*, and/or 900*h*) of the body of the first user (e.g., 900) within the physical environment (e.g., 901) in which the first user (e.g., 900) is located (e.g., receiving information and/or data indicative of a position and/or movement of the first portion of the body of the first user in the physical environment in which the first user is located). In response to receiving the indication of the state of the first portion (e.g., 900*b*, 900*c*, 900*g*, and/or 900*h*) of the body of the first user (e.g., 900) within the physical environment (e.g., 901) in which the first user (e.g., 900) is located and in accordance with the determination that the first portion (e.g., 900*b*, 900*c*, 900*g*, and/or 900*h*) of the body of the first user (e.g., 900) is in the first region (e.g., 902 and/or 904) of the physical environment (e.g., 901) in which the first user (e.g., 900) is located, the computer system (e.g., 101, 700, 704, and/or 944) maintains display of the first visual indication (e.g., 950*b*, 950*c*, 950*g*, and/or 950*h*) of the first portion (e.g., 900*b*, 900*c*, 900*g*, and/or 900*h*) of the body of the first user (e.g., 900) including the first amount of visual fidelity (e.g., continuing to display the first visual indication of the first portion of the body of the first user with the first amount of visual fidelity when the first portion of the body of the first user is positioned in the first region despite receiving the indication of the state of the first portion of the body within the physical environment in which the first user is located). In some embodiments, in response to receiving the indication of the state of the first portion of the body of the first user within the physical environment in which the first user is located and in accordance with the determination that the first portion of the body of the first user is in the second region of the physical environment in which the first user is located, the computer system (e.g., 101, 700, 704, and/or 944) maintains display of the second visual indication of the first portion of the body of the first user including the second amount of visual fidelity.

Maintaining display of the first visual indication of the first portion of the body of the first user in response to receiving the indication of the state of the first portion of the body of the first user provides improved visual feedback by displaying the first portion of the body of the first user with less clarity when the first user is unlikely to be using the first portion of the body for communicating despite a position of the first portion of the body of the first user being detected, which improves visual feedback.

In some embodiments, the first portion (e.g., 900*b* and/or 900*c*) of the body of the first user (e.g., 900) includes a hand (e.g., 900*b* and/or 900*c*) of the first user (e.g., 900), the first region (e.g., 902) of the physical environment (e.g., 901) in which the first user (e.g., 900) is located includes an area of the physical environment (e.g., 901) corresponding to pockets of an article of clothing that the first user (e.g., 900) is wearing (e.g., the first region at least partially surrounds a portion of the body of the first user that includes pockets of pants and/or a jacket in which the first user is wearing in the physical environment), and the first visual indication (e.g., 950*b* and/or 950*c*) of the first portion (e.g., 900*b* and/or 900*c*) of the body of the first user (e.g., 900) that includes the first amount of visual fidelity includes a blurred representation of the hand (e.g., 900*b* and/or 900*c*) of the first user (e.g., 900) (e.g., the first amount of visual fidelity applies a predetermined amount of blurring that is greater than an amount of blurring applied by the second amount of visual fidelity).

Displaying a blurred representation of the hand when the hand is in an area corresponding to pockets of an article of clothing that the user is wearing enables provides improved visual feedback by displaying the hand with less clarity when the first user is unlikely to be using the hand to communication, which improves visual feedback.

In some embodiments, the first portion (e.g., 900*b* and/or 900*c*) of the body of the first user (e.g., 900) includes a hand (e.g., 900*b* and/or 900*c*) of the first user (e.g., 900), the first region (e.g., 902) of the physical environment (e.g., 901) in which the first user (e.g., 900) is located includes an area of the physical environment (e.g., 901) near a waist (e.g., 900*a*) of the user (e.g., 900) (e.g., below the waist and near the body of the user in a region typically occupied by pockets in pants) (e.g., the first region at least partially surrounds a portion of the body of the first user that includes pockets of pants and/or a jacket in which the first user is wearing in the physical environment), and the first visual indication (e.g., 950*b* and/or 950*c*) of the first portion (e.g., 900*b* and/or 900*c*) of the body of the first user (e.g., 900) that includes the first amount of visual fidelity includes a blurred representation of the hand (e.g., 900*b* and/or 900*c*) of the first user (e.g., 900) (e.g., the first amount of visual fidelity applies a predetermined amount of blurring that is greater than an amount of blurring applied by the second amount of visual fidelity).

Displaying a blurred representation of the hand when the hand is in an area near a waist of the user provides improved visual feedback by displaying the hand with less clarity when the first user is unlikely to be using the hand to communication, which improves visual feedback.

In some embodiments, the first portion (e.g., 900*g* and/or 900*h*) of the body of the first user (e.g., 900) includes an elbow (e.g., 900*g* and/or 900*h*) of the first user (e.g., 900), the first region (e.g., 904) of the physical environment (e.g., 901) in which the first user (e.g., 900) is located includes an area surrounding a torso (e.g., 900*a*, 900*f* and/or 900*i*) of the body of the first user (e.g., 900) (e.g., the first region at least partially surrounds a portion of the body of the first user that includes a torso of the first user and/or above a waist of the user), and the first visual indication (e.g., 950*g* and/or 950*h*) of the first portion (e.g., 900*g* and/or 900*h*) of the body of the first user (e.g., 900) that includes the first amount of visual fidelity includes a blurred representation of the elbow (e.g., 900*g* and/or 900*h*) of the first user (e.g., 900) (e.g., the first amount of visual fidelity applies a predetermined amount of blurring that is greater than an amount of blurring applied by the second amount of visual fidelity).

Displaying a blurred representation of the elbow when the elbow is in an area near a torso of the body of the first user provides improved visual feedback by displaying the elbow with less clarity when the first user is unlikely to be using the elbow to communication, which improves visual feedback.

In some embodiments, while displaying the representation (e.g., 950) of the first user (e.g., 900), the computer system (e.g., 101, 700, 704, and/or 944) detects movement of the first user (e.g., 900) within the physical environment (e.g., 901) in which the first user (e.g., 900) is located (e.g., detecting movement of at least one portion of the body of the first user via one or more sensors in communication with the computer system). After detecting the movement of the first user (e.g., 900) within the physical environment (e.g., 901) in which the first user (e.g., 900) is located, the computer system (e.g., 101, 700, 704, and/or 944) displays at least a portion of the representation (e.g., 950) of the first user (e.g., 900) with an appearance (e.g., an amount of visual fidelity, such as the first amount of visual fidelity and/or the second amount of visual fidelity) that is determined based on a location of the first region (e.g., 902 and/or 904) in the physical environment (e.g., 901), where the first region (e.g., 902 and/or 904) is moved so as to maintain a position of the first region (e.g., 902 and/or 904) relative to the body of the first user (e.g., 900) (e.g., the first region of the physical environment in which the first user is located moves with the first user, such that the first region of the physical environment in which the first user is located remains substantially stationary with respect to at least one body part of the first user as the first user moves about the physical environment).

Maintaining a position of the first region relative to the body of the first user improves visual feedback by displaying portions of the representation of the first user with increased clarity when the user is likely to be using the first portion of the body for communicating despite movement of the first user in the physical environment, which improves visual feedback.

In some embodiments, while displaying the representation (e.g., 950) of the first user (e.g., 900), the computer system (e.g., 101, 700, 704, and/or 944) detects movement of the first user (e.g., 900) within the physical environment (e.g., 901) in which the first user (e.g., 900) is located (e.g., detecting movement of at least one portion of the body of the first user via one or more sensors in communication with the computer system). After detecting the movement of the first user (e.g., 900) within the physical environment (e.g., 901) in which the first user (e.g., 900) is located, the computer system (e.g., 101, 700, 704, and/or 944) displays at least a portion of the representation (e.g., 950) of the first user with an appearance (e.g., an amount of visual fidelity, such as the first amount of visual fidelity and/or the second amount of visual fidelity) that is determined based on a location of the second region (e.g., a region of physical environment outside of regions 902 and/or 904) in the physical environment (e.g., 901), where, the second region is moved so as to maintain a position of the second region relative to the body of the first user (e.g., 900) (e.g., the second region of the physical environment in which the first user is located moves with the first user, such that the second region of the physical environment in which the first user is located remains substantially stationary with respect to at least one body part of the first user as the first user moves about the physical environment).

Maintaining a position of the second region relative to the body of the first user improves visual feedback by displaying portions of the representation of the first user with increased clarity when the user is likely to be using the first portion of the body for communicating despite movement of the first user in the physical environment, which improves visual feedback.

In some embodiments, aspects/operations of methods 800 and 1000 may be interchanged, substituted, and/or added between these methods. For example, the appearances of portions of the representations displayed by the computer systems performing method 800 can be adjusted based on a position and/or location of one or more body parts of the first user with respect to regions of the physical environment in which first user is located. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services and/or generating representations of the users. In yet another example, users can select to limit the length of time data is maintained or entirely prohibit the development of a customized service and/or generation of representations of the users. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, representations of users can be generated based on non-personal information data or a bare minimum amount of personal information, such as the content being requested by the device associated with a user, other non-personal information available to the service, or publicly available information.

What is claimed is:

1. A computer system that is in communication with a display generation component and in communication with an external computer system that is associated with a first user, the computer system comprising:

one or more processors; and memory storing one or more programs configured to be executed by the one or more processors, the one or more programs including instructions for:

in response to receiving a request to display a representation of the first user in an extended reality environment:

displaying in the extended reality environment, via the display generation component, the representation of the first user, wherein displaying the representation of the first user includes:

in accordance with a determination that a first portion of a body of the first user is in a first region of a physical environment in which the first user is located, wherein the first region is defined relative to the body of the first user, displaying, via the display generation component, a first visual indication of the first portion of the body of the first user, wherein the first visual indication of the first portion of the body of the first user includes a first amount of visual fidelity; and in accordance with a determination that the first portion of the body of the first user is in a second region of the physical environment, wherein the second region is separate from the first region, displaying, via the display generation component, a second visual indication of the first portion of the body of the first user, wherein the second visual indication of the first portion of the body of the first user includes a second amount of visual fidelity, different from the first amount of visual fidelity.

2. The computer system of claim 1, wherein displaying the representation of the first user includes:

in accordance with a determination that a second portion of the body of the first user is in a third region of the physical environment in which the first user is located, wherein the third region is defined relative to the body of the first user, displaying, via the display generation component, a third visual indication of the second portion of the body of the first user, wherein the third visual indication of the second portion of the body of the first user includes the first amount of visual fidelity.

3. The computer system of claim 1, wherein the first region surrounds a predetermined portion of the body of the first user.

4. The computer system of claim 1, wherein the first region extends in three dimensions with respect to the physical environment in which the first user is located.

5. The computer system of claim 1, wherein:

the first region of the physical environment in which the first user is located corresponds to the first portion of the body of the first user; and a third region of the physical environment in which the first user is located corresponds to a second portion of the body of the first user, different from the first portion of the body of the first user.

6. The computer system of claim 1, wherein the one or more programs further include instructions for:

while displaying, in the extended reality environment, the representation of the first user, receiving an indication of a state of the first portion of the body of the first user within the physical environment in which the first user is located; and in response to receiving the indication of the state of the first portion of the body of the first user within the physical environment in which the first user is located:

in accordance with the determination that the first portion of the body of the first user is in the first region of the physical environment in which the first user is located, maintaining display of the first visual indication of the first portion of the body of the first user including the first amount of visual fidelity.

7. The computer system of claim 1, wherein:

the first portion of the body of the first user includes a hand of the first user;

the first region of the physical environment in which the first user is located includes an area of the physical environment corresponding to pockets of an article of clothing that the first user is wearing; and the first visual indication of the first portion of the body of the first user that includes the first amount of visual fidelity includes a blurred representation of the hand of the first user.

8. The computer system of claim 1, wherein:

the first portion of the body of the first user includes a hand of the first user;

the first region of the physical environment in which the first user is located includes an area of the physical environment near a waist of the first user; and the first visual indication of the first portion of the body of the first user that includes the first amount of visual fidelity includes a blurred representation of the hand of the first user.

9. The computer system of claim 1, wherein:

the first portion of the body of the first user includes an elbow of the first user;

the first region of the physical environment in which the first user is located includes an area surrounding a torso of the body of the first user; and the first visual indication of the first portion of the body of the first user that includes the first amount of visual fidelity includes a blurred representation of the elbow of the first user.

10. The computer system of claim 1, wherein the one or more programs further include instructions for:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the first region in the physical environment, wherein the first region is moved so as to maintain a position of the first region relative to the body of the first user.

11. The computer system of claim 1, wherein the one or more programs further include instructions for:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the second region in the physical environment, wherein, the second region is moved so as to maintain a position of the second region relative to the body of the first user.

12. A non-transitory computer-readable storage medium storing one or more programs configured to be executed by one or more processors of a computer system that is in communication with a display generation component and in communication with an external computer system that is associated with a first user, the one or more programs including instructions for:

in response to receiving a request to display a representation of the first user in an extended reality environment:

displaying in the extended reality environment, via the display generation component, the representation of the first user, wherein displaying the representation of the first user includes:

in accordance with a determination that a first portion of a body of the first user is in a first region of a physical environment in which the first user is located, wherein the first region is defined relative to the body of the first user, displaying, via the display generation component, a first visual indication of the first portion of the body of the first user, wherein the first visual indication of the first portion of the body of the first user includes a first amount of visual fidelity; and in accordance with a determination that the first portion of the body of the first user is in a second region of the physical environment, wherein the second region is separate from the first region, displaying, via the display generation component, a second visual indication of the first portion of the body of the first user, wherein the second visual indication of the first portion of the body of the first user includes a second amount of visual fidelity, different from the first amount of visual fidelity.

13. The non-transitory computer-readable storage medium of claim 12, wherein displaying the representation of the first user includes:

in accordance with a determination that a second portion of the body of the first user is in a third region of the physical environment in which the first user is located, wherein the third region is defined relative to the body of the first user, displaying, via the display generation component, a third visual indication of the second portion of the body of the first user, wherein the third visual indication of the second portion of the body of the first user includes the first amount of visual fidelity.

14. The non-transitory computer-readable storage medium of claim 12, wherein the first region surrounds a predetermined portion of the body of the first user.

15. The non-transitory computer-readable storage medium of claim 12, wherein the first region extends in three dimensions with respect to the physical environment in which the first user is located.

16. The non-transitory computer-readable storage medium of claim 12, wherein:

the first region of the physical environment in which the first user is located corresponds to the first portion of the body of the first user; and a third region of the physical environment in which the first user is located corresponds to a second portion of the body of the first user, different from the first portion of the body of the first user.

17. The non-transitory computer-readable storage medium of claim 12, wherein the one or more programs further include instructions for:

while displaying, in the extended reality environment, the representation of the first user, receiving an indication of a state of the first portion of the body of the first user within the physical environment in which the first user is located; and in response to receiving the indication of the state of the first portion of the body of the first user within the physical environment in which the first user is located:

in accordance with the determination that the first portion of the body of the first user is in the first region of the physical environment in which the first user is located, maintaining display of the first visual indication of the first portion of the body of the first user including the first amount of visual fidelity.

18. The non-transitory computer-readable storage medium of claim 12, wherein:

the first portion of the body of the first user includes a hand of the first user;

the first region of the physical environment in which the first user is located includes an area of the physical environment corresponding to pockets of an article of clothing that the first user is wearing; and the first visual indication of the first portion of the body of the first user that includes the first amount of visual fidelity includes a blurred representation of the hand of the first user.

19. The non-transitory computer-readable storage medium of claim 12, wherein:

the first portion of the body of the first user includes a hand of the first user;

the first region of the physical environment in which the first user is located includes an area of the physical environment near a waist of the first user; and the first visual indication of the first portion of the body of the first user that includes the first amount of visual fidelity includes a blurred representation of the hand of the first user.

20. The non-transitory computer-readable storage medium of claim 12, wherein:

the first portion of the body of the first user includes an elbow of the first user;

the first region of the physical environment in which the first user is located includes an area surrounding a torso of the body of the first user; and the first visual indication of the first portion of the body of the first user that includes the first amount of visual fidelity includes a blurred representation of the elbow of the first user.

21. The non-transitory computer-readable storage medium of claim 12, wherein the one or more programs further include instructions for:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the first region in the physical environment, wherein the first region is moved so as to maintain a position of the first region relative to the body of the first user.

22. The non-transitory computer-readable storage medium of claim 12, wherein the one or more programs further include instructions for:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the second region in the physical environment, wherein, the second region is moved so as to maintain a position of the second region relative to the body of the first user.

23. A method, comprising:

at a computer system that is in communication with a display generation component and in communication with an external computer system that is associated with a first user:

in response to receiving a request to display a representation of the first user in an extended reality environment:

displaying in the extended reality environment, via the display generation component, the representation of the first user, wherein displaying the representation of the first user includes:

in accordance with a determination that a first portion of a body of the first user is in a first region of a physical environment in which the first user is located, wherein the first region is defined relative to the body of the first user, displaying, via the display generation component, a first visual indication of the first portion of the body of the first user, wherein the first visual indication of the first portion of the body of the first user includes a first amount of visual fidelity; and in accordance with a determination that the first portion of the body of the first user is in a second region of the physical environment, wherein the second region is separate from the first region, displaying, via the display generation component, a second visual indication of the first portion of the body of the first user, wherein the second visual indication of the first portion of the body of the first user includes a second amount of visual fidelity, different from the first amount of visual fidelity.

24. The method of claim 23, wherein displaying the representation of the first user includes:

in accordance with a determination that a second portion of the body of the first user is in a third region of the physical environment in which the first user is located, wherein the third region is defined relative to the body of the first user, displaying, via the display generation component, a third visual indication of the second portion of the body of the first user, wherein the third visual indication of the second portion of the body of the first user includes the first amount of visual fidelity.

25. The method of claim 23, wherein the first region surrounds a predetermined portion of the body of the first user.

26. The method of claim 23, wherein the first region extends in three dimensions with respect to the physical environment in which the first user is located.

27. The method of claim 23, wherein:

the first region of the physical environment in which the first user is located corresponds to the first portion of the body of the first user; and a third region of the physical environment in which the first user is located corresponds to a second portion of the body of the first user, different from the first portion of the body of the first user.

28. The method of claim 23, further comprising:

while displaying, in the extended reality environment, the representation of the first user, receiving an indication of a state of the first portion of the body of the first user within the physical environment in which the first user is located; and in response to receiving the indication of the state of the first portion of the body of the first user within the physical environment in which the first user is located:

in accordance with the determination that the first portion of the body of the first user is in the first region of the physical environment in which the first user is located, maintaining display of the first visual indication of the first portion of the body of the first user including the first amount of visual fidelity.

29. The method of claim 23, wherein:

the first portion of the body of the first user includes a hand of the first user;

the first region of the physical environment in which the first user is located includes an area of the physical environment corresponding to pockets of an article of clothing that the first user is wearing; and the first visual indication of the first portion of the body of the first user that includes the first amount of visual fidelity includes a blurred representation of the hand of the first user.

30. The method of claim 23, wherein:

the first portion of the body of the first user includes a hand of the first user;

the first region of the physical environment in which the first user is located includes an area of the physical environment near a waist of the first user; and the first visual indication of the first portion of the body of the first user that includes the first amount of visual fidelity includes a blurred representation of the hand of the first user.

31. The method of claim 23, wherein:

the first portion of the body of the first user includes an elbow of the first user;

the first region of the physical environment in which the first user is located includes an area surrounding a torso of the body of the first user; and the first visual indication of the first portion of the body of the first user that includes the first amount of visual fidelity includes a blurred representation of the elbow of the first user.

32. The method of claim 23, further comprising:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the first region in the physical environment, wherein the first region is moved so as to maintain a position of the first region relative to the body of the first user.

33. The method of claim 23, further comprising:

while displaying the representation of the first user, detecting movement of the first user within the physical environment in which the first user is located; and after detecting the movement of the first user within the physical environment in which the first user is located, displaying at least a portion of the representation of the first user with an appearance that is determined based on a location of the second region in the physical environment, wherein, the second region is moved so as to maintain a position of the second region relative to the body of the first user.

* * * * *